US006685767B2

(12) United States Patent
Noro et al.

(10) Patent No.: US 6,685,767 B2
(45) Date of Patent: Feb. 3, 2004

(54) METHINE COMPOUND, A RECORDING LIQUID FOR INK JET, AND AN INK JET RECORDING METHOD

(75) Inventors: Masaki Noro, Kanagawa (JP); Yoshiharu Yabuki, Kanagawa (JP); Makoto Yamada, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 103 days.

(21) Appl. No.: 09/824,184

(22) Filed: Apr. 3, 2001

(65) Prior Publication Data

US 2002/0046680 A1 Apr. 25, 2002

(30) Foreign Application Priority Data

Apr. 3, 2000 (JP) ....................................... 2000-100912
Mar. 28, 2001 (JP) ....................................... 2001-094191

(51) Int. Cl.$^7$ ................................................ C09D 11/02

(52) U.S. Cl. ................................ 106/31.27; 106/31.46; 106/31.47; 106/31.49; 106/31.6; 106/31.76; 106/31.77; 106/31.78

(58) Field of Search ........................... 106/31.27, 31.46, 106/31.47, 31.49, 31.6, 31.76, 31.77, 31.78

(56) References Cited

U.S. PATENT DOCUMENTS

| | | | | | |
|---|---|---|---|---|---|
| 5,282,894 | A | * | 2/1994 | Albert et al. | 106/31.46 |
| 5,451,494 | A | * | 9/1995 | Diehl et al. | 430/522 |
| 5,459,265 | A | * | 10/1995 | Wariishi et al. | 544/300 |
| 5,641,617 | A | * | 6/1997 | Nishio | 430/522 |
| 5,723,272 | A | * | 3/1998 | Barber et al. | 430/522 |
| 5,965,333 | A | | 10/1999 | Chen et al. | 430/351 |
| 6,136,079 | A | * | 10/2000 | Evans et al. | 106/31.27 |

FOREIGN PATENT DOCUMENTS

| | | | | |
|---|---|---|---|---|
| EP | 582000 A1 * | 2/1994 | G03C/1/83 |
| EP | 0 778 493 A1 | 6/1997 | |
| EP | 0 778 493 | 6/1997 | |
| EP | 0 822 444 A1 | 2/1998 | |
| EP | 0 822 444 | 2/1998 | |
| JP | 58-12916 | 3/1983 | |
| JP | 6-332112 | 12/1994 | |

* cited by examiner

*Primary Examiner*—Helene Klemanski
(74) *Attorney, Agent, or Firm*—Burns, Doane, Swecker & Mathis, LLP

(57) ABSTRACT

A recording liquid for ink jet containing a solid fine particle dispersion obtained by dispersing in a medium a compound represented by the following general formula (I) or (II), and an ink jet recording method of recording using the recording liquid for ink jet containing the solid fine particle dispersion obtained by dispersing in a medium a compound represented by the following general formula (I) or (II):

General formula (I)

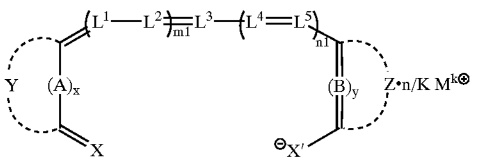

General formula (II)

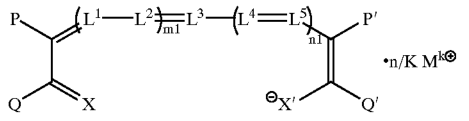

18 Claims, No Drawings

METHINE COMPOUND, A RECORDING LIQUID FOR INK JET, AND AN INK JET RECORDING METHOD

BACKGROUND OF THE INVENTION

1. Field of the Invention

The present invention relates to a novel methine compound, a recording liquid for ink jet which recording liquid contains the methine compound, and an ink jet recording method using the recording liquid for ink jet.

2. Description of the Related Art

When a colorant is used for various inks, it is severely desired that the fastness of an image is high. From the viewpoint, it is preferable to disperse a solid fine particle colorant such as a pigment in a medium than to dissolve a colorant in a medium. Currently commercially available pigments has high fastness, however, hue is inferior to that of a dye which is used by being dissolved in a medium. For example, although quinacridone pigments (e.g., C. I. Pigment Red 122, Pigment Red 202, etc.) described in "Industrial Organic Pigments, Second Completely Revised Edition" (W. Herbst, K. Hunger, VCH, 1997) pp. 454 to 474, are fast, an improvement in hue has been desired.

Oxonol compounds which are a kind of methine compound are important as dyes, sensitizing colorants for photography, colorants for optical information recording, dyeing agents for an organism sample such as a cell or the like, or medicines, and are characteristic in that there are many those whose absorption spectra in a solution are sharp.

However, although the oxonol compounds manifest sharp absorption in a solution, the absorption is different when the solution is used as a recording liquid, and sometimes the absorption is broad.

Further, since a chromophore thereof has negative charge and is hydrophilic, the compound is water-soluble. Therefore, the compound has insufficient fastness to light, humidity and heat when it is used as a colorant. Therefore, in order to use an oxonol compound as a fast colorant, it has been desired to develop an oxonol compound capable of realizing a preferable hue, when it is used as a colorant in the recording liquid, and having high fastness to light, humidity and heat.

European patent Nos. 778,493 and 822,444, and JPA No. 6-332112 disclose an association product of an oxonol compound used as a filter dyestuff of a photographic system. Moreover, U.S. Pat. No. 5,965,333 discloses a heat-sensitive recording material containing an aggregate of an oxonol compound. However, until now, there has been no ink jet ink containing an aggregate of an oxonol compound.

On the other hand, there have been known lake pigments which was obtained by making a water-soluble colorant having a carboxyl group or a sulfo group into an insoluble metal salt having a valency of 2 or more, as means for making a water-soluble colorant fast. For example, there are descriptions regarding lake pigments using calcium, barium, strontium and aluminium as a metal cation in "Industrial Organic Pigments, Second Completely Revised Edition" (W. Herbst, K. Hunger, VCH, 1997) pp. 315 to 345. However, these pigments are not sufficient in hue and light-resistance, and further improvements have been desired.

Further, materials for forming a color image in particular have been mainly used as image recording materials in recent years. Specifically, there are vigorously utilized an ink jet recording material, a thermal transcription type image recording material, a recording material using electrophotography, a transcription type silver halide photosensitive material, a printing ink, a recording pen and the like. Further, a color filter is used in LCD and PDP for displays, and an image pickup device such as CCD or the like for photography instruments.

Colorants (dye and pigment) having the so-called three primary colors for an additive process and a subtractive process are used in these color image recording material and color filter in order to reproduce or record a full color image, but with the status quo there is no fast colorant whose absorption property allows it to obtain a reproducing region having a favorable color, and which is capable of enduring various conditions during use. Thus improvements are strongly desired.

Since material cost is cheap, high speed recording is possible, noise at recording is little, and color recording is further easy in an ink jet recording method, it is being rapidly spread and further developed.

There are a continuous system by which drops of a liquid are continuously flown, and a on-demand system by which drops of a liquid are flown in accordance with image information signals in the ink jet recording method. As discharging systems thereof, there are a system of discharging drops of a liquid by adding pressure by a piezo device, a system of generating foams in an ink by heat and discharging drops of a liquid, a system using ultrasonic, or a system of inhaling and discharging drops of a liquid by static electricity. Further, as an ink for ink jet recording, an aqueous ink, an oleaginous ink, or a solid (melt type) ink is used.

It is required for a colorant used for the ink for ink jet recording that solubility or dispersiveness in a solvent is good, high density recording is possible, hue is good, it is fast to light, heat, and active gases ($So_x$ and the like in addition to oxidative gases such as $No_x$, ozone, and the like) in environment, fastness to water and chemicals is excellent, fixation property to a image-receiving material is good and it is not easily soaked, preservation property as an ink is excellent, it has no toxicity, purity is high, and further, it can be obtained at low cost.

However, it is extremely difficult to find a colorant which satisfies these demands at a high level. Particularly, a colorant having good magenta or cyan hue and being fast to light, active gases in an atmosphere, particularly, oxidative gases such as ozone and the like is highly desired.

SUMMARY OF THE INVENTION

The object of the present invention is to solve the above-described problems and provide a recording liquid for ink jet containing a solid fine particle dispersion of a methine compound having good hue and simultaneously excellent fastness to light, humidity, heat, and oxidative gases, and an ink jet recording method according to said recording liquid.

Another object of the present invention is to provide a methine compound which has good hue and a cation having a valency of 2 or more as a counter cation.

The above object of the present invention can be achieved by a recording liquid for ink jet containing a solid fine particle dispersion obtained by dispersing in a medium a compound represented by the general formula (I) or (II):

General formula (I)

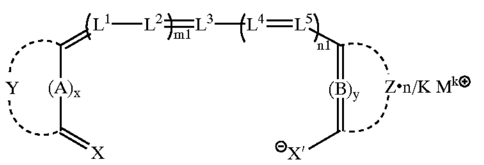

wherein each of A and B represents an atomic group required to complete a conjugated double bond chain, and each of Y and Z represents an atomic group required to form a carbocyclic ring or heterocyclic ring; each of $L^1$, $L^2$, $L^3$, $L^4$ and $L^5$ represents a methine group which may be substituted, and each of X and X' represents an oxygen atom, a sulfur atom or —$C(CN)_2$; each of m1 and n1 represents 0, 1 or 2, and each of x and y represents 0 or 1; $M^{k+}$ represents a k-valent cation, k represents an integer of 1 or more, and n represents a figure required to equalize the positive charge number with the negative charge number in the general formula (I).

General formula (II)

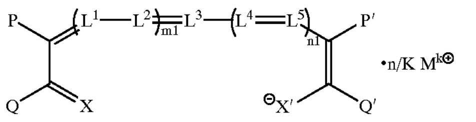

wherein each of $L^1$, $L^2$, $L^3$, $L^4$ and $L^5$ represents a methine group which may be substituted, each of P, P', Q, and Q' represents a substituted group, and each of X and X' represents an oxygen atom, a sulfur atom or —$C(CN)_2$. Each of m1 and n1 represents 0, 1 or 2; $M^{k+}$ represents a k-valent cation, k represents an integer of 1 or more, and n represents a figure required to equalize the positive charge number with the negative charge number in the general formula (II).

Another aspect of the present invention is a methine compound represented by the general formula (III) or (IV):

General formula (III)

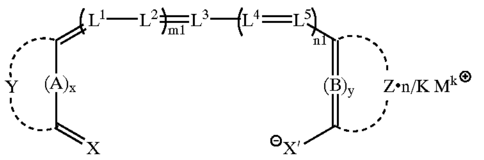

wherein each of A and B represents an atomic group required to complete a conjugated double bond chain, and each of Y and Z represents an atomic group required to form a carbocyclic ring or heterocyclic ring; each of $L^1$, $L^2$, $L^3$, $L^4$ and $L^5$ represents a methine group which may be substituted, $M^{k+}$ represents a metal cation, and each of X and X' represents an oxygen atom, a sulfur atom or —$C(CN)_2$; each of m1 and n1 represents 0, 1 or 2, and each of x and y represents 0 or 1; $M^{k+}$ represents a k-valent metal cation, k represents an integer of 2 or more, and n represents a figure required to equalize the positive charge number with the negative charge number in the general formula (III).

(General formula IV)

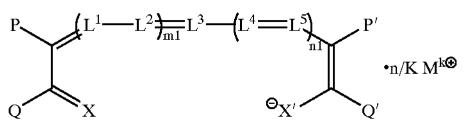

wherein each of $L^1$, $L^2$, $L^3$, $L^4$ and $L^5$ represents a methine group which may be substituted, each of P, P', Q, and Q' represents a substituted group, and each of X and X' represents an oxygen atom, a sulfur atom or —$C(CN)_2$. Each of m1 and n1 represents 0, 1 or 2; $M^{k+}$ represents a k-valent metal cation, k represents an integer of 2 or more, and n represents a figure required to equalize the positive charge number with the negative charge number in the general formula (IV).

A further aspect of the present invention is an ink jet recording method of recording using a recording liquid for ink jet containing the solid fine particle dispersion obtained by dispersing a compound represented by the general formula (I) or (II) in an aqueous medium.

DESCRIPTION OF THE PREFERRED EMBODIMENT

Recording Liquid for Ink Jet

The methine compound represented by the general formula (I) or general formula (II) and being contained in the ink for ink jet recording of the present invention is a compound in which by forming an aggregate λ max can shift by 20 nm or more with respect to λ max of the compound when it is a state in which the molecules are dispersed in a solution (for example, dimethylformamide or dimethylsulfoxide). The detail of the aggregate of a colorant is described in "Theory of Photography Process" (edited by T. H. James), pp216 to 222.

Among colorants forming an aggregate, it is preferable to use a colorant in which the difference between λ max of the colorant in a state in which the molecules are dispersed and λ max of the aggregate is 20 nm or more to 150 nm or less, and more preferably, 30 nm or more to 120 nm or less, in view of the fact that hue and color reproducibility of a formed image become favorable under these conditions.

Further, it is possible to use both a methine compound forming an H-aggregate in which the λ max of the aggregate is shorter than the λ max of the methine compound in a state in which the molecules are dispersed, and a methine compound forming a J-aggregate in which the λ max of the aggregate is longer than the λ max of the methine compound in a state in which the molecules are dispersed. Among them, when the methine compound forming a J-aggregate is used, an absorption spectrum shown by the aggregate becomes sharper, and the hue and color reproducibility is improved further.

Further, in the ink for ink jet recording of the present invention, "forming an aggregate" not only indicates that a methine compound forms an aggregate in the aqueous medium of an ink, but also includes that it does not form an aggregate in the above-described aqueous medium, and forms an aggregate in a process in which it becomes drops of a liquid and reaches on an image-receiving material, or after reaching on an image-receiving material. Accordingly, in the ink for ink jet recording of the present invention, the methine compound may form an aggregate in the aqueous medium, or may form an aggregate on an image-receiving material without forming an aggregate in the aqueous medium. Further, a portion of the methine compound may form an aggregate in the aqueous medium, and the ratio of an aggregate on an image-receiving material such as a paper and the like may be high. Further, it is unnecessary that all of the colorant form the aggregate, and a colorant in the aggregate condition and a colorant in the molecular dispersion condition may exist in mixture.

Methine Compound

Methine Compounds of the General Formula (I)

In the general formula (I), —C—(A)$_x$—C(=X)— which is bonded with Y, and —C=(B)$_y$=C(—X'—)— which is bonded with Z are in a conjugated condition, respectively. Therefore, a carbocyclic ring or heterocyclic ring represented by Y and —C—(A)$_x$—C(=X)— which is to be bonded with Y, and a carbocyclic ring or heterocyclic ring represented by Z and —C=(B)$_y$=C(—X'—)— which is to be bonded with Z may be each considered to constitute one resonance structure. The carbocyclic rings and heterocyclic rings represented by Y and Z, and —C—(A)$_x$—C(=X)— and —C=(B)$_y$=C(—X'—)— to be bonded with Y and Z respectively (hereinafter, sometimes referred to as "carbocyclic ring having a resonance structure" and "heterocyclic ring having a resonance structure", respectively) will be summarized below.

The carbocyclic ring or heterocyclic ring having a resonance structure are preferably, 4 to 7-membered carbocyclic rings or heterocyclic rings. Particularly preferable are 5 or 6-membered carbocyclic rings or heterocyclic rings. These rings may further be condensed with other rings, and the rings to be condensed are preferably, 4 to 7-membered rings. Further, the above-mentioned carbocyclic ring or heterocyclic ring may have a substituent.

Examples of the substituent include: halogen atoms, alkyl groups including cycloalkyl groups and bicycloalkyl groups, alkenyl groups including cycloaklenyl groups and bicycloalkenyl groups, alkynyl groups, aryl groups, heterocyclic groups, cyano group, hydroxyl group, nitro group, carboxyl group, alkoxy groups, aryloxy groups, silyloxy group, heterocyclic oxy groups, acyloxy groups, carbamoyloxy groups, alkoxycarbonyloxy groups, aryloxycarbonyloxy groups, amino groups including an anilino group, acylamino groups, aminocarbonylamino groups, alkoxycarbonylamino groups, aryloxycarbonylamino groups, sulfamoylamino groups, alkylsulfonylamino groups, arylsulfonylamino groups, mercapto group, alkylthio groups, arylthio groups, heterocyclic thio groups, sulfamoyl group, sulfo group, alkylsulfinyl groups, arylsulfinyl groups, alkylsulfonyl groups, arylsulfonyl groups, acyl groups, aryloxycarbonyl groups, alkoxycarbonyl groups, carbamoyl group, aryl azo groups, heterocyclic azo groups, imide groups, phosphino groups, phosphinyl groups, phosphinyloxy groups, phosphinylamino groups and silyl group.

More specific examples of the above-mentioned substituent include halogen atoms (e.g., a chlorine atom, bromine atom and iodine atom), alkyl groups [Alkyl groups are straight, branched and cyclic substituted or unsubstituted alkyl groups. Alkyl groups are preferably, alkyl groups having 1 to 30 carbon atoms, for example, methyl, ethyl, n-propyl, isopropyl, t-butyl, n-octyl, eicosyl, 2-chloroethyl, 2-cyanoethyl and 2-ethylhexyl, cycloalkyl groups are preferably, substituted or unsubstituted cycloalkyl groups having 3 to 30 carbon atoms, for example, cyclohexyl, cyclopentyl and 4-n-dodecylcyclohexyl, and bicycloalkyl groups are preferably, substituted or unsubstituted bicycloalkyl groups having 5 to 30 carbon atoms, namely, mono-valent groups obtained by removing one hydrogen atom from bicycloalkanes having 5 to 30 carbon atoms, for example, bicyclo[1,2,2]heptan-2-yl and bicyclo[2,2,2]octan-3-yl. Further, a tricyclo structure and the like having many ring structures are also included. The same definition for these alkyl groups is applied also to alkyl groups in substituents described below (e.g., alkyl groups on alkylthio groups).], alkenyl groups [Alkenyl groups are straight, branched and cyclic substituted or unsubstituted alkenyl groups. Alkenyl groups are preferably, substituted or unsubstituted alkenyl groups having 2 to 30 carbon atoms, for example, vinyl, allyl, prenyl, geranyl and oleyl, cycloalkenyl groups are preferably, substituted or unsubstituted cycloalkenyl groups having 3 to 30 carbon atoms, namely, mono-valent groups obtained by removing one hydrogen atom from cycloalkenes having 3 to 30 carbon atoms, for example, 2-cyclopenten-1-yl and 2-cyclohexen-1-yl, and bicycloalkenyl groups (substituted or unsubstituted bicycloalkenyl groups) are preferably, substituted or unsubstituted bicycloalkenyl groups having 5 to 30 carbon atoms, namely, mono-valent groups obtained by removing one hydrogen atom from bicycloalkenes having one double bond, for example, bicyclo[2,2,1]hept-2-en-1-yl and bicyclo[2,2,2]oct-2-en-4-yl.], alkynyl groups (preferably, substituted or unsubstituted alkynyl groups having 2 to 30 carbon atoms, for example, ethynyl, propargyl and trimethylsilylethynyl group), aryl groups (preferably, substituted or unsubstituted aryl groups having 6 to 30 carbon atoms, for example, phenyl, p-tolyl, naphthyl, m-chlorophenyl and o-hexadecanoylaminophenyl), heterocyclic groups (preferably, mono-valent groups obtained by removing one hydrogen atom from 5- or 6-membered substituted or unsubstituted aromatic or non-aromatic heterocyclic compounds, more preferably, 5- or 6-membered aromatic heterocyclic groups having 3 to 30 carbon atoms, for example, 2-furyl, 2-thienyl, 2-pyrimidinyl and 2-benzothiazolyl), cyano group, hydroxyl group, nitro group, carboxyl group, alkoxy groups (preferably, substituted or unsubstituted alkoxy groups having 1 to 30 carbon atoms, for example, methoxy, ethoxy, isopropoxy, t-butoxy, n-octyloxy and 2-methoxyethoxy), aryloxy groups (preferably, substituted or unsubstituted aryloxy groups having 6 to 30 carbon atoms, for example, phenoxy, 2-methylphenoxy, 4-t-butylphenoxy, 3-nitrophenoxy and 2-tetradecanoylaminophenoxy), silyloxy groups (preferably, silyloxy groups having 3 to 20 carbon atoms, for example, trimethylsilyloxy and t-butyldimethylsilyloxy), heterocyclic oxy groups (preferably, substituted or unsubstituted heterocyclic oxy groups having 2 to 30 carbon atoms, for example, 1-phenyltetrazole-5-oxy and 2-tetrahydropyranyloxy), acyloxy groups (preferably, a formyloxy group, substituted or unsubstituted alkylcarbonyloxy groups having 2 to 30 carbon atoms, and substituted or unsubstituted arylcarbonyloxy groups having 6 to 30 carbon atoms, for example, formyloxy, acetyloxy, pivaloyloxy, stearoyloxy, benzoyloxy and p-methoxyphenylcarbonyloxy), carbamoyloxy groups (preferably, substituted or unsubstituted carbamoyloxy groups having 1 to 30 carbon atoms, for example, N,N-dimethylcarbamoyloxy, N,N-diethylcarbamoyloxy, morpholinocarbonyloxy, N,N-di-n-octylaminocarbonyloxy and N-n-octylcarbamoyloxy), alkoxycarbonyloxy groups (preferably, substituted or unsubstituted alkoxycarbonyloxy groups having 2 to 30 carbon atoms, for example, methoxycarbonyloxy, ethoxycarbonyloxy, t-butoxycarbonyloxy and n-octylcarbonyloxy), aryloxycarbonyloxy groups (preferably, substituted or unsubstituted aryloxycarbonyloxy groups having 7 to 30 carbon atoms, for example, phenoxycarbonyloxy, p-methoxyphenoxycarbonyloxy and p-n-hexadecyloxyphenoxycarbonyloxy), amino groups (preferably, amino group, substituted or unsubstituted alkylamino groups having 1 to 30 carbon atoms, and substituted or unsubstituted anilino groups having 6 to 30 carbon atoms, for example, amino, methylamino, dimethylamino, anilino, N-methylanilino and diphenylamino), acylamino groups (preferably, formylamino group, substituted or unsubstituted alkylcarbonylamino groups having 1 to 30 carbon atoms, and substituted or unsubstituted arylcarbonylamino groups having 6 to 30 carbon atoms, for example, formylamino, acetylamino, pivaloylamino, lauroylmino, benzoylamino and 3,4,5-tri-n-octyloxyphenylcarbonylamino), aminocarbonylamino groups (preferably, substituted or unsubstituted aminocarbonylamino groups having 1 to 30 carbon atoms, for example, carbamoylamino, N,N-dimethylaminocarbonylamino, N,N-diethylaminocarbonylamino and morpholinocarbonylamino), alkoxycarbonylamino groups (preferably, substituted or unsubstituted alkoxycarbonylamino groups having 2 to 30 carbon atoms, for example, methoxycarbonylamino, ethoxycarbonylamino, t-butoxycarbonylamino, n-octadecyloxycarbonylamino and N-methyl-methoxycarbonylamino), aryloxycarbonylamino groups (preferably, substituted or unsubstituted aryloxycarbonylamino groups having 7 to 30 carbon atoms, for example, phenoxycarbonylamino, p-chlorophenoxycarbonylamino and m-n-octyloxyphenoxycarbonylamino), sulfamoylamino groups (preferably, substituted or unsubstituted sulfamoylamino groups having 0 to 30 carbon atoms, for example, sulfamoylamino, N,N-dimethylaminosulfonylamino and N-n-octylaminosulfonylamino), alkylsulfonylamino groups and arylsulfonylamino groups (preferably, substituted or unsubstituted alkylsulfonylamino groups having 1 to 30 carbon atoms, and substituted or unsubstituted arylsulfonylamino groups having 6 to 30 carbon atoms, for example, methylsulfonylamino, butylsulfonylamino, phenylsulfonylamino, 2,3,5-trichlorophenylsulfonylamino and p-methylphenylsulfonylamino), mercapto group, alkylthio groups (preferably, substituted or unsubstituted alkylthio groups having 1 to 30 carbon atoms, for example, methylthio, ethylthio and n-hexadecylthio), arylthio groups (preferably, substituted or unsubstituted arylthio groups having 6 to 30 carbon atoms, for example, phenylthio, p-chlorophenylthio and m-methoxyphenylthio), heterocyclic thio groups (preferably, substituted or unsubstituted heterocyclic thio groups having 2 to 30 carbon atoms, for example, 2-benzothiazolylthio and 1-phenyltetrazol-5-ylthio), sulfamoyl groups (preferably, substituted or unsubstituted sulfamoyl groups having 0 to 30 carbon atoms, for example, N-ethylsulfamoyl, N-(3-dodecyloxypropyl) sulfamoyl, N,N-dimethylsulfamoyl, N-acetylsulfamoyl, N-benzoylsulfamoyl and N-(N'-phenylcarbamoyl) sulfamoyl), sulfo group, alkylsulfinyl groups and arylsulfinyl groups (preferably, substituted or unsubstituted alkylsulfinyl groups having 1 to 30 carbon atoms, and substituted or unsubstituted arylsulfinyl groups having 6 to 30 carbon atoms, for example, methylsulfinyl, ethylsulfinyl, phenylsulfinyl and p-methylphenylsulfinyl), alkylsulfonyl groups and arylsulfonyl groups (preferably, substituted or unsubstituted alkylsulfonyl groups having 1 to 30 carbon atoms, and substituted or unsubstituted arylsulfonyl groups having 6 to 30 carbon atoms, for example, methylsulfonyl, ethylsulfonyl, phenylsulfonyl and p-methylphenylsulfonyl), acyl groups (preferably, formyl group, substituted or unsubstituted alkylcarbonyl groups having 2 to 30 carbon atoms, and substituted or unsubstituted arylcarbonyl groups having 7 to 30 carbon atoms, for example, acetyl, pivaloyl, 2-chloroacetyl, stearoyl, benzoyl and p-n-octyloxyphenylcarbonyl), aryloxycarbonyl groups (preferably, substituted or unsubstituted aryloxycarbonyl groups having 7 to 30 carbon atoms, for example, phenoxycarbonyl, o-chlorophenoxycarbonyl, m-nitrophenoxycarbonyl and p-t-butylphenoxycarbonyl), alkoxycarbonyl groups (preferably, substituted or unsubstituted alkoxycarbonyl groups having 2 to 30 carbon atoms, for example, methoxycarbonyl, ethoxycarbonyl, t-butoxycarbonyl and n-octadecyloxycarbonyl), carbamoyl groups (preferably, substituted or unsubstituted carbamoyl groups having 1 to 30 carbon atoms, for example, carbamoyl, N-methylcarbamoyl, N,N-dimethylcarbamoyl, N,N-di-n-octylcarbamoyl and N-(methylsulfonyl) carbamoyl), aryl azo groups and heterocyclic azo groups (preferably, substituted or unsubstituted aryl azo groups having 6 to 30 carbon atoms, and substituted or unsubstituted heterocyclic azo groups having 3 to 30 carbon atoms, for example, phenyl azo, p-chlorophenyl azo and 5-ethylthio-1,3,4-thiadiazol-2-yl azo), imide groups (preferably, N-succineimide and N-phthalimide), phosphino groups (preferably, substituted or unsubstituted phosphino groups having 2 to 30 carbon atoms, for example, dimethylphosphino, diphenylphosphino and methylphenoxyphosphino), phosphinyl groups (preferably, substituted or unsubstituted phosphinyl groups having 2 to 30 carbon atoms, for example, phosphinyl, dioctyloxyphosphinyl and diethoxyphosphinyl), phosphinyloxy groups (preferably, substituted or unsubstituted phosphinyloxy groups having 2 to 30 carbon atoms, for example, diphenoxyphosphinyloxy and dioctyloxyphosphinyloxy), phosphinylamino groups (preferably, substituted or unsubstituted phosphinylamino groups having 2 to 30 carbon atoms, for example, dimethoxyphosphinylamino and dimethylaminophosphinylamino), silyl groups (preferably, substituted or unsubstituted silyl groups having 3 to 30 carbon atoms, for example, trimethylsilyl, t-butyldimethylsilyl and phenyldimethylsilyl)

Of the above substituents given as examples, in those having a hydrogen atom, a hydrogen atom contained in the substituent may also be removed and further substituted by the above substituents. Examples of the substituent containing a hydrogen atom include alkylcarbonylaminosulfonyl groups, arylcarbonylaminosulfonyl groups, alkylsulfonylaminocarbonyl groups, and arylsulfonylaminocarbonyl groups, and examples of those substituents in which a hydrogen atom is removed and further substituted with a substituent include methylsulfonylaminocarbonyl, p-methylphenylsulfonylaminocarbonyl, acetylaminosulfonyl, benzoylaminosulfonyl groups. Further, of the above substituents, in those having a dissociable hydrogen atom, a dissociable hydrogen atom contained in the substituent may be removed and the resulting residue may form a salt with a cation represented by n/k $M^{k+}$ (details of n, k and M will be described later). As examples of the substituent having a dissociable hydrogen atom, hydroxyl group, carboxyl group, imide groups, sulfo group, carbamoyl groups (acylcarbamoyl group, sulfonylcarbamoyl group and the like) are exemplified.

The above-mentioned heterocyclic rings may contain one kind of hetero atom, or may contain two or more kinds of hetero atoms which are different from each other. As the hetero atoms forming a heterocyclic ring having a resonance structure, preferable are atoms selected from a boron atom, nitrogen atom, oxygen atom, sulfur atom, selenium atom and tellurium atom. Among them, atoms selected from a nitrogen atom, oxygen atom and sulfur atom are preferable.

In the above-mentioned general formula (I), each of x and y independently represents 0 or 1, and preferably is 0.

In the above-mentioned general formula (I), X and X' represent an oxygen atom, sulfur atom or —$C(CN)_2$. Of them, an oxygen atom is preferable.

As the above-mentioned carbocyclic rings having a resonance structure, the following carbocyclic rings I-1 to I-4 are exemplified.

I-1
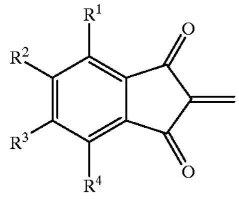
I-2
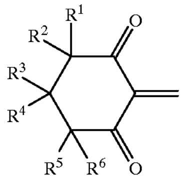
I-3
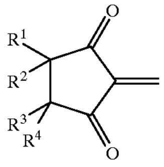
I-4
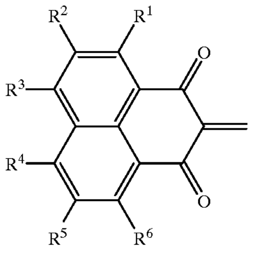
Among them, as the carbocyclic rings having a resonance structure, the carbocyclic rings I-1 and I-4 are preferable.
Examples of the above-mentioned heterocyclic rings having a resonance structure are the following heterocyclic rings I-5 to I-41.
I-5
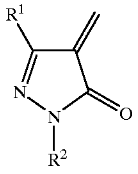
I-6
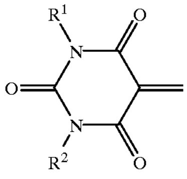
-continued
I-7
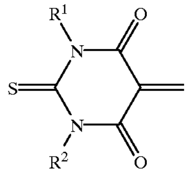
I-8
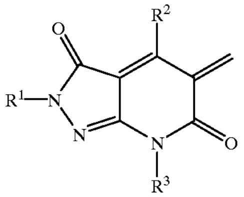
I-9
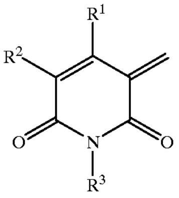
I-10
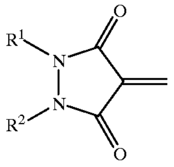
I-11
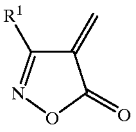
I-12
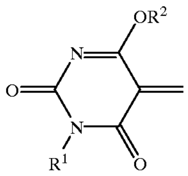
I-13
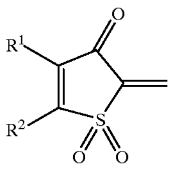
I-14
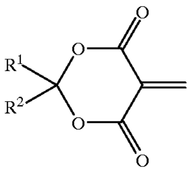

-continued
I-15
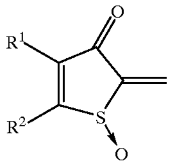
I-16
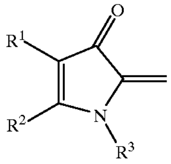
I-17
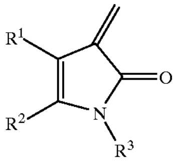
I-18
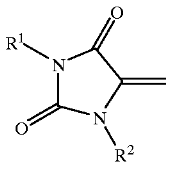
I-19
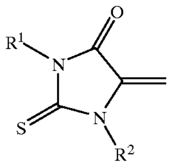
I-20
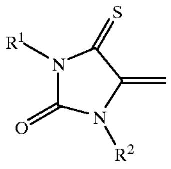
I-21
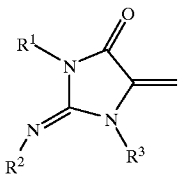
I-22
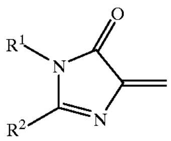
-continued
I-23
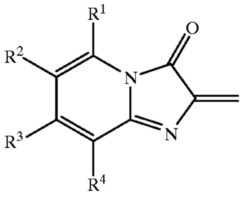
I-24
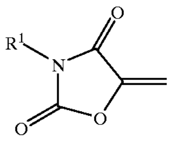
I-25
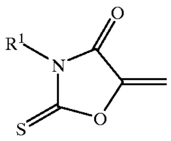
I-26
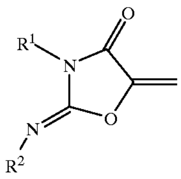
I-27
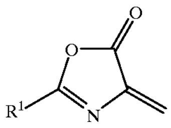
I-28
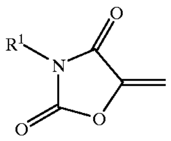
I-29
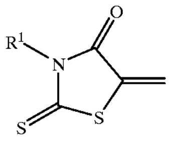
I-30
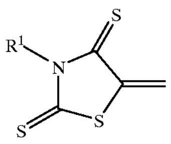

-continued

I-31

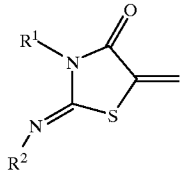

I-32

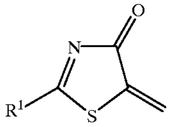

I-33

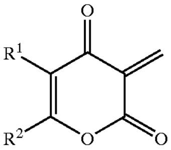

I-34

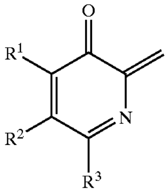

I-35

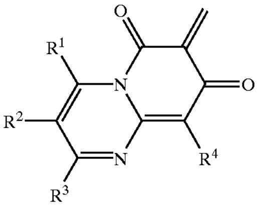

I-36

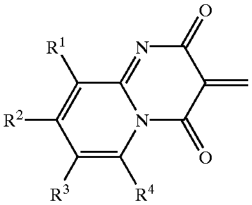

I-37

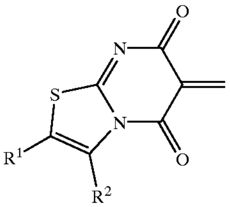

I-38

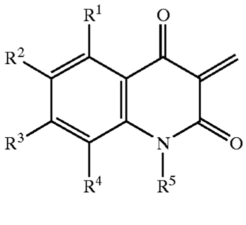

-continued

I-39

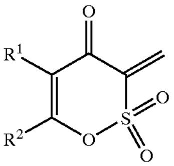

I-40

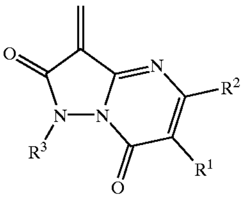

I-41

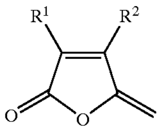

Among them, as the heterocyclic rings having a resonance structure, I-5, I-6, I-7, I-8, I-9, I-13, I-18, I-35, I-36 and I-40 are preferable, I-5, I-6, I-7 and I-13 are more preferable, and I-6 is most preferable.

In the above-mentioned carbocyclic rings and heterocyclic rings, each of $R^1$, $R^2$, $R^3$, $R^4$, $R^5$ and $R^6$ represents a hydrogen atom or substituent, this substituent has the same definition as for the substituent on the above-mentioned carbocyclic ring and heterocyclic ring having a resonance structure. Further, any two of $R^1$, $R^2$, $R^3$, $R^4$, $R^5$ and $R^6$ may be connected to form a condensed ring.

In the above-mentioned general formula (I), methine groups represented by $L^1$, $L^2$, $L^3$, $L^4$ and $L^5$ may be the same or different. The above-mentioned methine groups include unsubstituted methine groups and methine groups having a substituent. This substituent has the same definition as for the substituent on the above-mentioned carbocyclic ring and heterocyclic ring having a resonance structure. Among them, preferable substituents are alkyl groups, aryl groups, alkoxy groups, aryloxy groups, acylamino groups, alkylthio groups, arylthio groups, halogen atoms, amino groups, carbamoyl groups or heterocyclic groups. Further, two or more substituents may be connected to form a 5- to 7-membered ring (e.g., a cyclopentene ring, 1-dimethylaminocyclopentene ring, 1-diphenylaminocyclopentene ring, cyclohexane ring, 1-chlorocyclohexane ring, isophorone ring, 1-morpholinocyclopentene ring, cycloheptene ring and the like).

In the above-mentioned general formula (I), each of m1 and n1 represents 0, 1 or 2. Of them, it is preferable that the sum of m1 and n1 is 0, 1, 2 or 3, and it is particularly preferable that the sum of m1 and n1 is 0, 1 or 2.

In the general formula (I), $M^{k+}$ represents a k-valent cation, k represents an integer of 1 or more, and n represents a figure required to equalize the positive charge number with the negative charge number in the general formula (I). The cation represented by $M^k$ may be a proton, a metal cation, and an organic cation. As the metal cation represented by $M^k$, any of a typical metal ion of the Group 1, the Group 2, and the Group 12 to the Group 15, and a transition metal ion of the Group 3 to the Group 11 can be utilized. Among these, a typical metal ion of the Group 1, the Group 2, and the Group 12 and the Group 13 is more preferable, lithium, sodium, potassium, magnesium, calcium, strontium, barium, zinc and aluminum ion are more preferable, and lithium, sodium, magnesium, calcium, zinc and aluminum ion are most preferable. Further, as the organic cation represented by $M^{k+}$, a quatery ammonium ion, a pyridinium ion, an imidazorium ion, a pipyridinium ion, a bispyridinium ion and the like are listed.

k represents an integer of 1 or more, 1 to 6 is preferable, 1 to 4 is more preferable, and 1 to 3 is most preferable.

Among the colorant represented by the general formula (I), the compound represented by the general formula (I') is preferable in particular.

(General formula I')

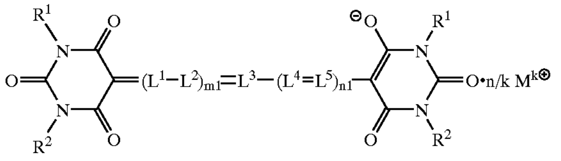

In the above-mentioned general formula (I'), the definitions and preferable ranges of $L^1$, $L^2$, $L^3$, $L^4$, $L^5$, $M^{k+}$, k and n are the same as in the above-mentioned general formula (I).

It is preferable that either of $R^1$ or $R^2$ is a hydrogen atom, and another is a substituted aryl group.

As a substituent of the substituted aryl group, a hydrogen bonding group or a substituted group containing a hydrogen bonding group is preferable. As the hydrogen bonding group, an amide group, a carbamoyl group, an ureido group, an imide group, a carbamoyloxy group, an alkoxycarbonylamino group, a sulfonamido group, a sulfamoyl group and the like are exemplified, and they may be a circular ring. Among these, an amide group, a carbamoyl group, an ureido group, and an imide group are preferable. Further, the substituted position of a substituent of the above-described substituted aryl group is preferably meta-position viewed from the connection position with a barbituric aid nuclei.

Each of m1 and n1 represents 0, 1 or 2. Among these, the sum of m1 and n1 is preferably 0, 1, 2, and 3, more preferably 0, 1 and 2, and most preferably 1.

Compounds of the General Formula (II)

In the general formula (II), substituents represented by P, P', Q and Q' have the same definitions as for the substituents on the above-mentioned carbocyclic ring and heterocyclic ring having a resonance structure.

As the substituent represented by P or P', one having a Hammett's substituent constant σp value of 0.2 or more is preferable. The Hammett's substituent constant is described, for example, in Chem. Rev. 91, 165 (1991). Examples of a particularly preferable substituent include a cyano group, nitro group, alkoxycarbonyl group, acyl group, carbamoyl group, sulfamoyl group and sulfonyl group.

Examples of the preferable substituent represented by Q or Q' are alkyl groups, aryl groups, alkoxy groups and amino groups.

In the above-mentioned general formula (II), the definitions of $L^1$, $L^2$, $L^3$, $L^4$, $L^5$, X, X', m1, n1, $M^{k+}$, k and n are the same as in the above-mentioned general formula (I), and the preferable ranges thereof are also the same.

Compounds Represented by the General Formula (III)

In the general formula (III), the definition and preferable range of A, B, Y, Z, $L^1$, $L^2$, $L^3$, $L^4$, $L^5$, X, X', m1, n1, x, y and n are the same as each of those illustrated in the general formula (I).

In the general formula (III), $M^{k+}$ represents a k-valent metal cation. The polyvalent metal cation represented by $M^{k+}$ may be any metal which can take a condition of a valency of 2 or more. Any of a typical metal ion of the Group 2, and the Group 12 to the Group 15, and a transition metal ion of the Group 3 to the Group 11 can be utilized. Among these, a typical metal ion of the Group 2, the Group 12 and the Group 13 is preferable, magnesium, calcium, strontium, barium, zinc and aluminum ions are more preferable, and magnesium, calcium, zinc and aluminum ions are most preferable.

k represents an integer of 2 or more, 2 to 6 is preferable, 2 to 4 is more preferable, and 2 or 3 is most preferable.

Among the compound represented by the general formula (III), the compound represented by the following general formula (III') is most preferable.

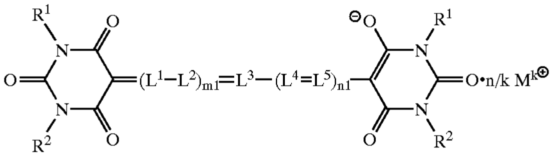

In the general formula (III'), the definition and preferable range of $R^1$, $R^2$, $L^1$, $L^2$, $L^3$, $L^4$, $L^5$, m1, n1, $M^{k+}$, k and n are the same as each of those illustrated in the general formula (I').

Compounds Represented by the General Formula (IV)

In the general formula (IV), the definition and preferable range of $L^1$, $L^2$, $L^3$, $L^4$, $L^5$, P, P', Q, Q', X, X', m1, n1, and n are the same as each of those illustrated in the general formula (II), and the definition and preferable range of $M^{k+}$ and k are the same as each of those illustrated in the general formula (III).

Specific examples of the compound represented by the general formulae (I) to (IV) are shown below together with the exemplary compound No., but these do not limit the present invention.

(D1-1)

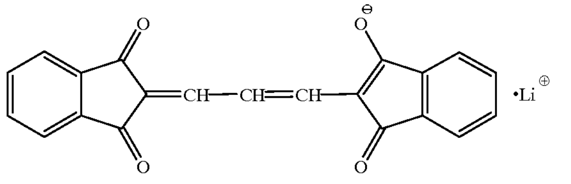

(D1-2)

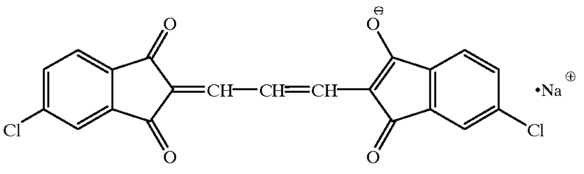

-continued
(D1-3)
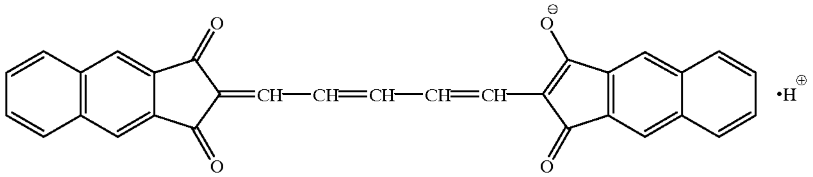
(D4-1)
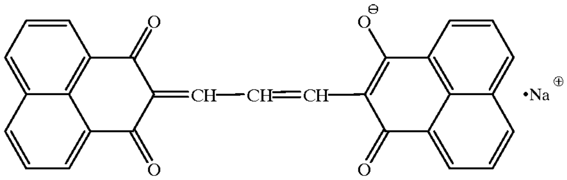
(D2-1)
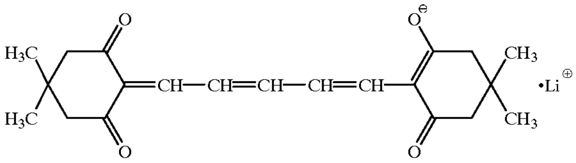
(D3-1)
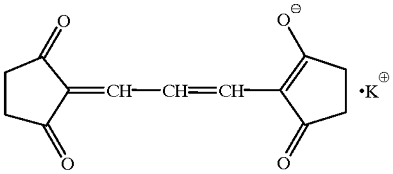
(D3-2)
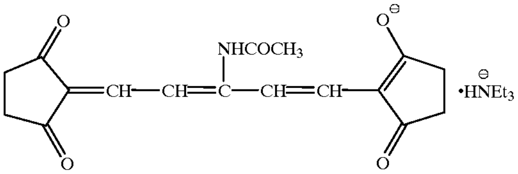
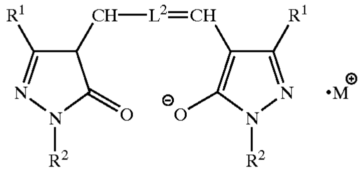
(n = 1, k = 1)
| Exemplified compound No. | $R^1$ | $R^2$ | $—L^2═$ | $M^{\oplus}$ |
|---|---|---|---|---|
| D5-1 | $—CH_3$ | H | —CH═ | $Li^{\oplus}$ |
| D5-2 | $—CH_3$ | $—CONH_2$ | —CH═ | $Na^{\oplus}$ |
| D5-3 | $—CH_3$ | $—CONH_2$ | 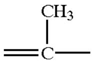 | $H^{\oplus}$ |
| D5-4 | $—C_2H_5$ | $—CONH_2$ | 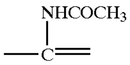 | $K^{\oplus}$ |
| D5-5 | $—C_2H_5$ | $—CONH_2$ | —CH═ | 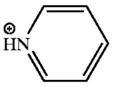 |
| D5-6 | 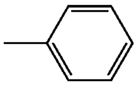 | $—CONH_2$ | 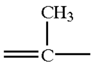 | $\overset{\oplus}{HNEt_3}$ |
| D5-7 | 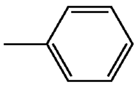 | $—CONH_2$ | —CH═ | $Na^{\oplus}$ |
| D5-8 | 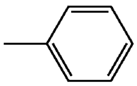 | H | —CH═ | $K^{\oplus}$ |

-continued
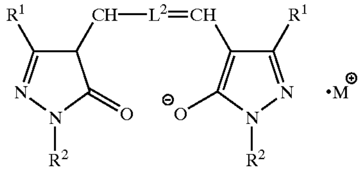
(n = 1, k = 1)
| Exemplified compound No. | $R^1$ | $R^2$ | $—L^2=$ | $M^\oplus$ |
|---|---|---|---|---|
| D5-9 | 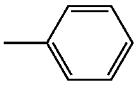 | $—CH_3$ | 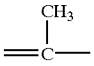 | $Li^\oplus$ |
| D5-10 | 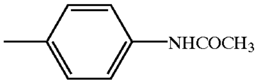 | H | 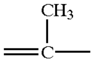 | 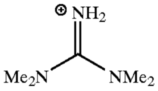 |
| D5-11 | 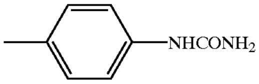 | $—CH_3$ | —CH= | $Li^\oplus$ |
| D5-12 | $—CONH_2$ | H | 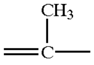 | $Na^\oplus$ |
| D5-13 | $—CONH_2$ | $—CH_3$ | —CH= | $K^\oplus$ |
| D5-14 | $—CONH_2$ | 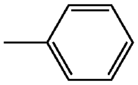 | —CH= | 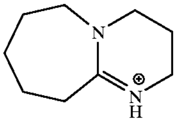 |
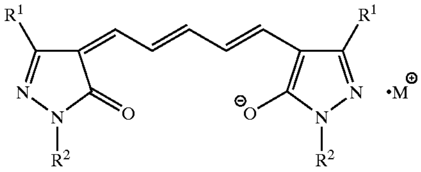
(n = 1, k = 1)
| Exemplified compound No. | $R^1$ | $R^2$ | $M^\oplus$ |
|---|---|---|---|
| D5-15 | $—CONH_2$ | H | $Li^\oplus$ |
| D5-16 | 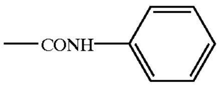 | H | $Na^\oplus$ |
| D5-17 | 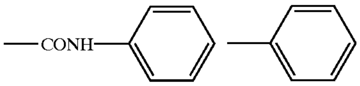 | | $K^\oplus$ |
| D5-18 | $—CO_2C_2H_5$ | H | $Na^\oplus$ |
| D5-19 | $—CO_2C_2H_5$ | 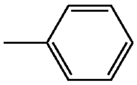 | 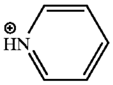 |

-continued
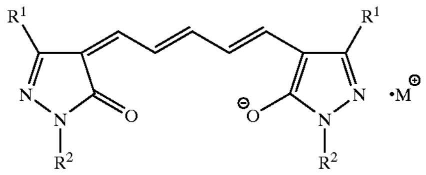
(n = 1, k = 1)
| Exemplified compound No. | $R^1$ | $R^2$ | $M^{\oplus}$ |
|---|---|---|---|
| D5-20 | $—CO_2C_2H_5$ | 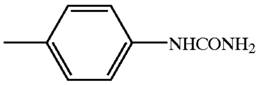 | 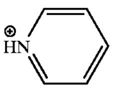 |
| D5-21 | —CN | H | $Na^{\oplus}$ |
| D5-22 | —CN | 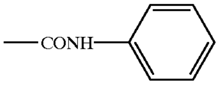 | $\overset{\oplus}{HNEt_3}$ |
| D5-23 | —CN | $—CONHCH_3$ | $Li^{\oplus}$ |
| D5-24 | $—COCH_3$ | H | $K^{\oplus}$ |
| D5-25 | $—CF_3$ | 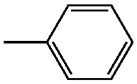 | $H^{\oplus}$ |
| D5-26 | $—CONHCH_3$ | H | $Li^{\oplus}$ |
| D5-27 | 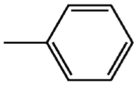 | $—CONH_2$ | $Na^{\oplus}$ |
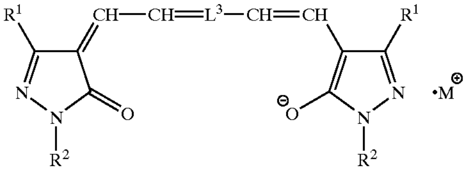
(n = 1, k = 1)
| Exemplified compound No. | $R^1$ | $R^2$ | $=L^3—$ | $M^{\oplus}$ |
|---|---|---|---|---|
| D5-28 | 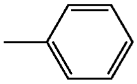 | H | =CH— | $Li^{\oplus}$ |

-continued
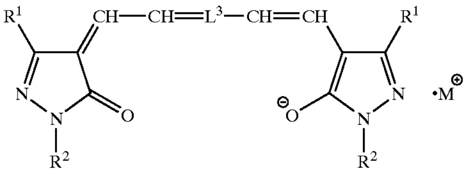
(n = 1, k = 1)
| Exemplified compound No. | $R^1$ | $R^2$ | $=L^3—$ | $M^{\oplus}$ |
|---|---|---|---|---|
| D5-29 | 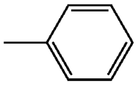 | | 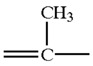 | $H^{\oplus}$ |
| D5-30 | 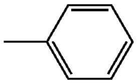 | $—CONH_2$ | 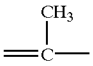 | $Na^{\oplus}$ |
| D5-31 | 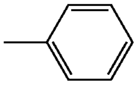 | $—CH_3$ | 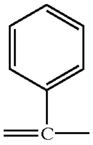 | $K^{\oplus}$ |
| D5-32 | 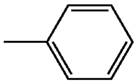 | H | 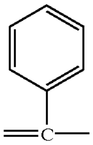 | 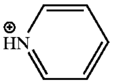 |
| D-33 | 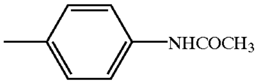 | H | 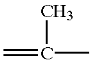 | $K^{\oplus}$ |
| D5-34 | 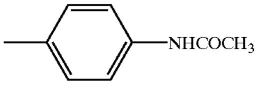 | | =CH— | $Li^{\oplus}$ |
| D5-35 | $—CH_3$ | $—CONH_2$ | 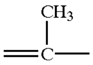 | $Na^{\oplus}$ |
| D5-36 | $—C_2H_5$ | $—CONH_2$ | =CH— | $Li^{\oplus}$ |
| D5-37 | $—C_2H_5$ | H | 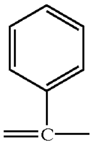 | $\oplus$ $HNEt_3$ |

-continued
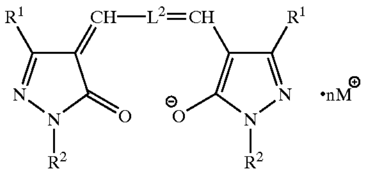
(k = 1)
| Exemplified compound No. | $R^1$ | $R^2$ | —$L^2$= | n | $M^\oplus$ |
|---|---|---|---|---|---|
| D5-38 | —$CH_3$ | 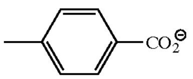 | 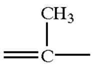 | 3 | $K^\oplus$ |
| D5-39 | —$CONH_2$ | 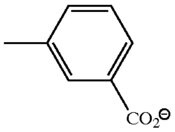 | —CH= | 3 | $K^\oplus$ |
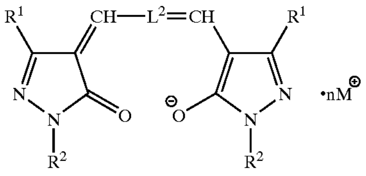
(k = 1)
| Exemplified compound No. | $R^1$ | $R^2$ | —$L^2$= | n | $M^\oplus$ |
|---|---|---|---|---|---|
| D5-40 | 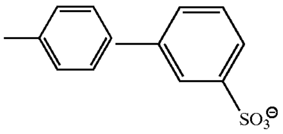 | | —CH= | 3 | $Li^\oplus$ |
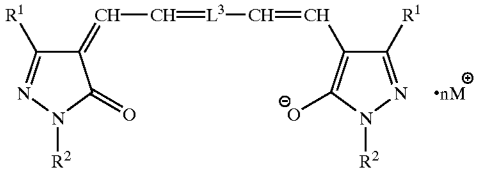
(k = 1)
| Exemplified compound No. | $R^1$ | $R^2$ | =$L^3$— | n | $M^\oplus$ |
|---|---|---|---|---|---|
| D5-41 | —$CH_3$ | 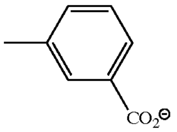 | 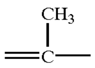 | 3 | $K^\oplus$ |
| D5-42 | —$CONH_2$ | 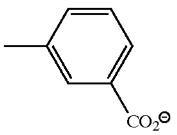 | =CH— | 3 | $Na^\oplus$ |
| D5-43 | 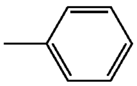 | 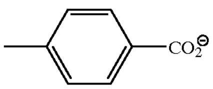 | 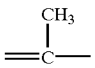 | 3 | 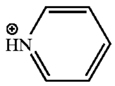 |

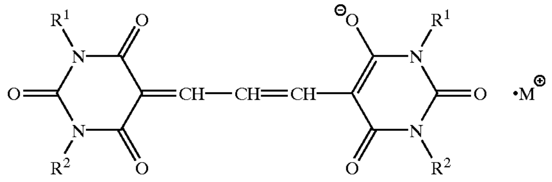
(n = 1, k = 1)
| Exemplifed compound No. | $R^1$ | $R^2$ | $M^{\oplus}$ |
|---|---|---|---|
| D6-1 | 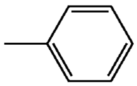 | H | $Li^{\oplus}$ |
| D6-2 | 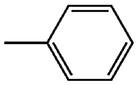 | $—CH_3$ | $Na^{\oplus}$ |
| D6-3 | 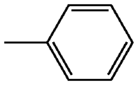 | 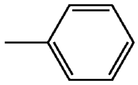 | 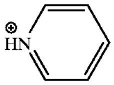 |
| D6-4 | $—CH_3$ | H | $Li^{\oplus}$ |
| D6-5 | $—CH_3$ | $—CH_3$ | $K^{\oplus}$ |
| D6-6 | H | H | $Na^{\oplus}$ |
| D6-7 | 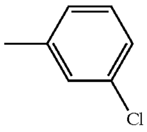 | H | 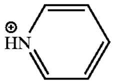 |
| D6-8 | 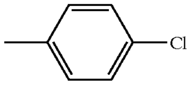 | H | $Na^{\oplus}$ |
| D6-9 | 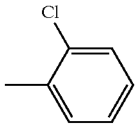 | H | $K^{\oplus}$ |
| D6-10 | 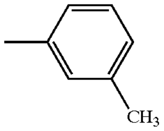 | H | $Li^{\oplus}$ |
| D6-11 | 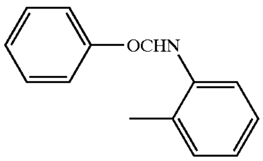 | H | $Na^{\oplus}$ |
| D6-12 | 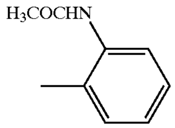 | H | $Na^{\oplus}$ |

-continued
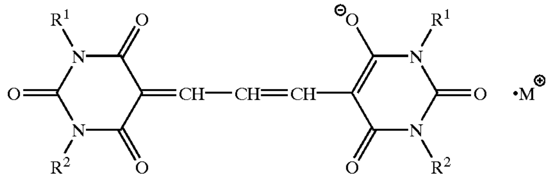
(n = 1, k = 1)
| Exemplifed compound No. | $R^1$ | $R^2$ | $M^{\oplus}$ |
| --- | --- | --- | --- |
| D6-13 | 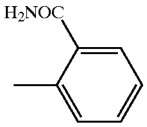 | H | $Na^{\oplus}$ |
| D6-14 | 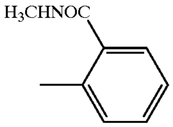 | H | $Li^{\oplus}$ |
| D6-15 | 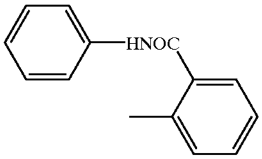 | H | 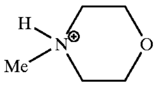 |
| D6-16 | 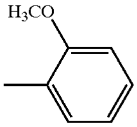 | H | 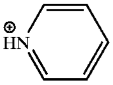 |
| D6-17 | 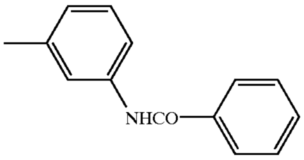 | 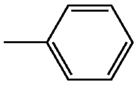 | $\overset{\oplus}{HNEt_3}$ |
| D6-18 |  | 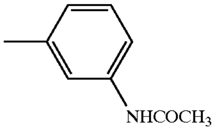 | 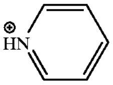 |
| D6-19 | 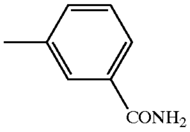 | $—CH_3$ | $Na^{\oplus}$ |
| D6-20 | 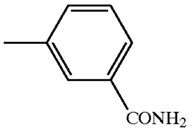 | 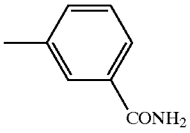 | $H^{\oplus}$ |

-continued
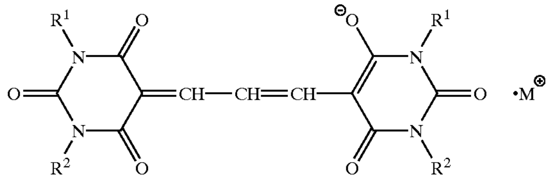
(n = 1, k = 1)
| Exemplifed compound No. | $R^1$ | $R^2$ | $M^\oplus$ |
|---|---|---|---|
| D6-21 | 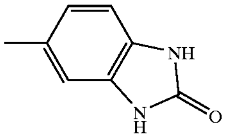 | H | $Na^\oplus$ |
| D6-22 | 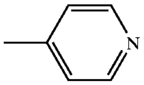 | H | $Li^\oplus$ |
| D6-23 | 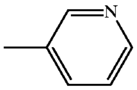 | H | $K^\oplus$ |
| D6-24 | 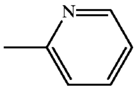 | H | $Na^\oplus$ |
| D6-25 | 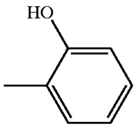 | H | $Li^\oplus$ |
| D6-26 | 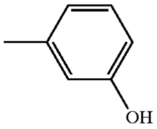 | H | $Na^\oplus$ |
| D6-27 | 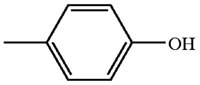 | H | $H^\oplus$ |
| D6-28 | 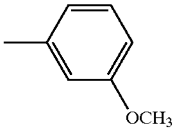 | H | $Na^\oplus$ |
| D6-29 | 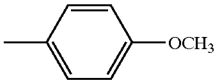 | H | $K^\oplus$ |
| D6-30 | 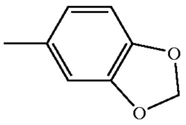 | H | 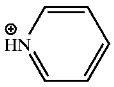 |

-continued
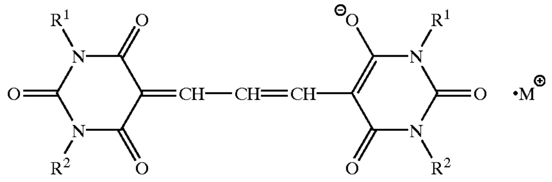
(n = 1, k = 1)
| Exemplifed compound No. | $R^1$ | $R^2$ | $M^{\oplus}$ |
|---|---|---|---|
| D6-31 | 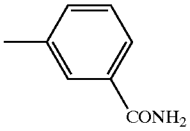 | H | $Li^{\oplus}$ |
| D6-32 | 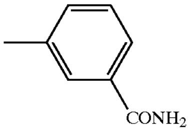 | H | $Na^{\oplus}$ |
| D6-33 | 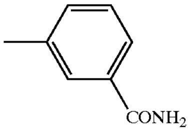 | H | $H^{\oplus}$ |
| D6-34 | 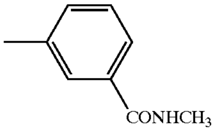 | H | $Na^{\oplus}$ |
| D6-35 | 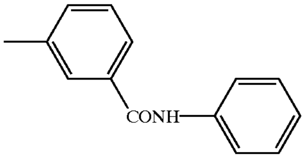 | H | $Na^{\oplus}$ |
| D6-36 | 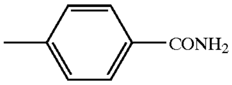 | H | $Li^{\oplus}$ |
| D6-37 | 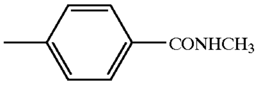 | H | 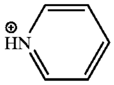 |
| D6-38 | 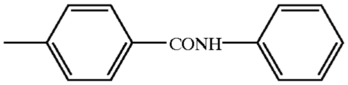 | H | 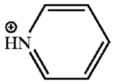 |
| D6-39 | 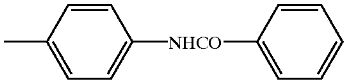 | H | $Li^{\oplus}$ |
| D6-40 | 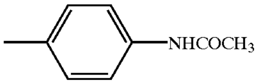 | H | $Na^{\oplus}$ |

-continued
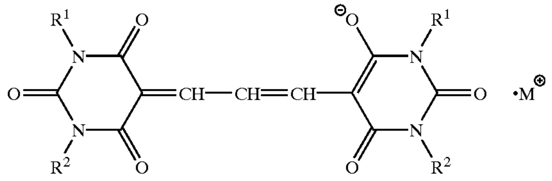
(n = 1, k = 1)
| Exemplifed compound No. | $R^1$ | $R^2$ | $M^{\oplus}$ |
|---|---|---|---|
| D6-41 | 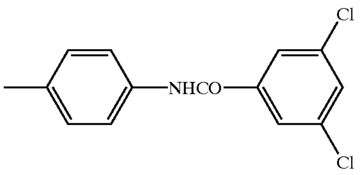 | H | $Li^{\oplus}$ |
| D6-42 | 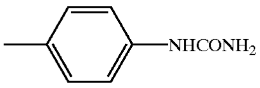 | H | $Li^{\oplus}$ |
| D6-43 | 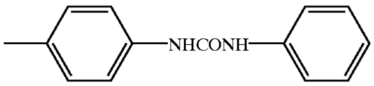 | H | $Na^{\oplus}$ |
| D6-44 |  | H | $Na^{\oplus}$ |
| D6-45 | 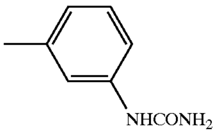 | H | 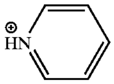 |
| D6-46 | 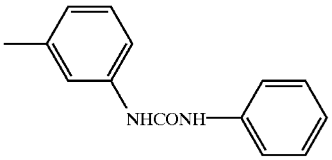 | H | $\overset{\oplus}{H}NEt_3$ |
| D6-47 | 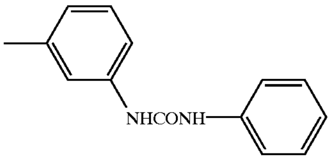 | H | 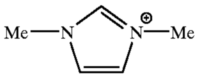 |
| D6-48 | 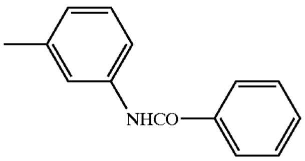 | H | $Li^{\oplus}$ |

-continued
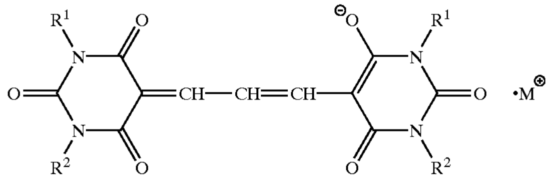
(n = 1, k = 1)
| Exemplifed compound No. | $R^1$ | $R^2$ | $M^{\oplus}$ |
|---|---|---|---|
| D6-49 | 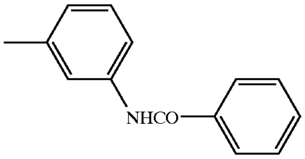 | H | $Na^{\oplus}$ |
| D6-50 | 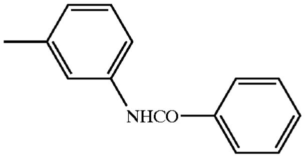 | H | $K^{\oplus}$ |
| D6-51 | 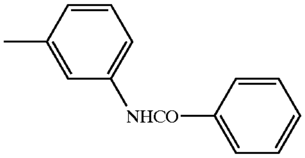 | H | 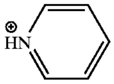 |
| D6-52 | 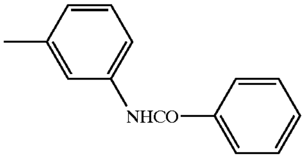 | H | 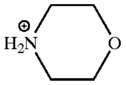 |
| D6-53 | 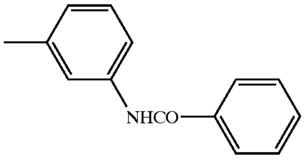 | H | $\overset{\oplus}{HNEt_3}$ |
| D6-54 | 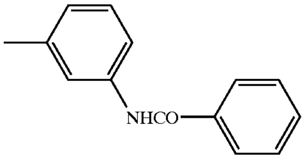 | H | 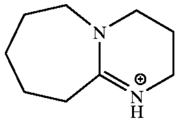 |
| D6-55 | 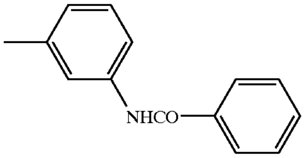 | H | 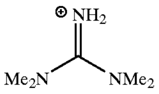 |

-continued
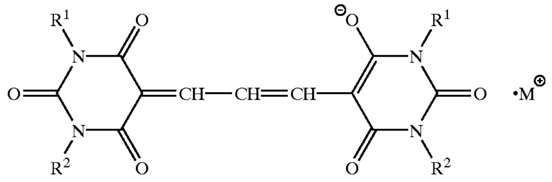
(n = 1, k = 1)
| Exemplifed compound No. | $R^1$ | $R^2$ | $M^{\oplus}$ |
|---|---|---|---|
| D6-56 | 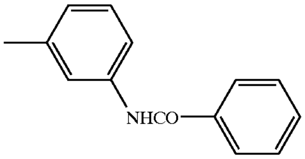 | H | 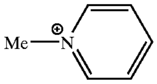 |
| D6-57 | 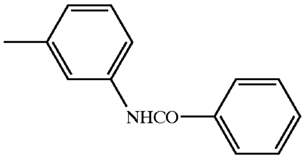 | H | $H^{\oplus}$ |
| D6-58 | 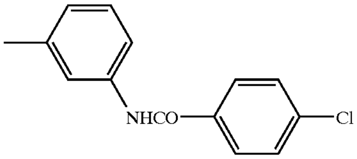 | H | $Li^{\oplus}$ |
| D6-59 | 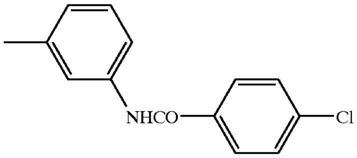 | H | $Na^{\oplus}$ |
| D6-60 | 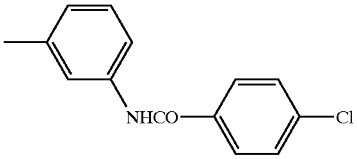 | H | $H^{\oplus}$ |
| D6-61 | 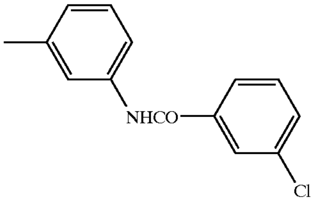 | H | $Li^{\oplus}$ |
| D6-62 | 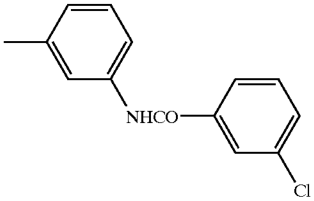 | H | $Na^{\oplus}$ |

-continued
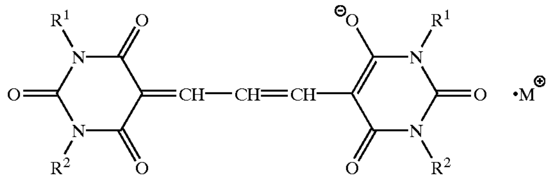
(n = 1, k = 1)
| Exemplifed compound No. | $R^1$ | $R^2$ | $M^\oplus$ |
|---|---|---|---|
| D6-63 | 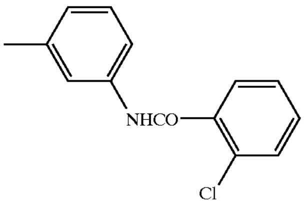 | H | $Li^\oplus$ |
| D6-64 | 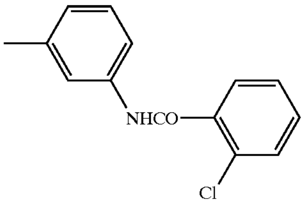 | H | $Na^\oplus$ |
| D-65 | 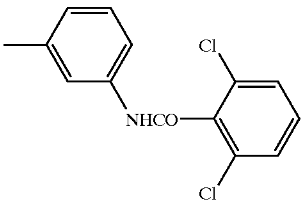 | H | $Li^\oplus$ |
| D6-66 | 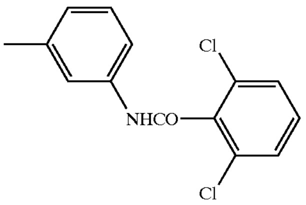 | H | $Na^\oplus$ |
| D6-67 | 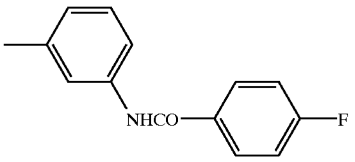 | H | $Li^\oplus$ |
| D6-68 | 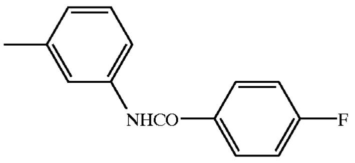 | H | $Na^\oplus$ |

-continued
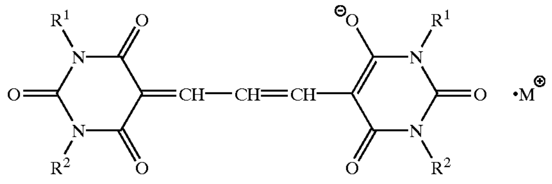
(n = 1, k = 1)
| Exemplifed compound No. | $R^1$ | $R^2$ | M⊕ |
|---|---|---|---|
| D6-69 | 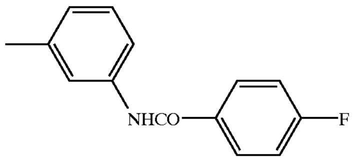 | H | H⊕ |
| D6-70 | 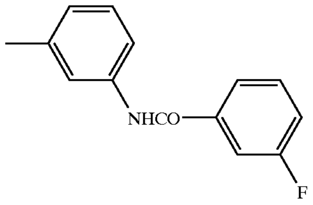 | H | Li⊕ |
| D6-71 | 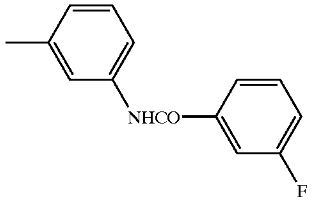 | H | Na⊕ |
| D6-72 | 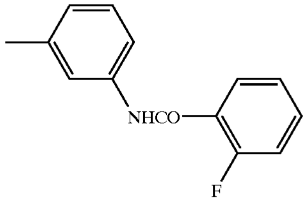 | H | Na⊕ |
| D6-73 | 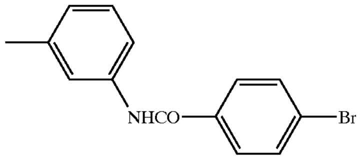 | H | Na⊕ |
| D6-74 | 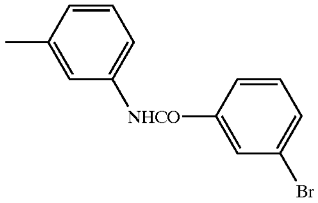 | H | Na⊕ |

-continued
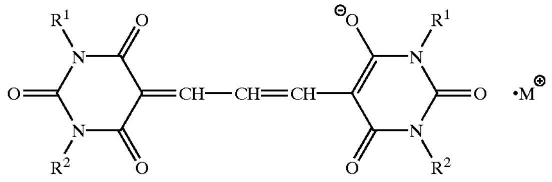
(n = 1, k = 1)
| Exemplifed compound No. | $R^1$ | $R^2$ | $M^{\oplus}$ |
|---|---|---|---|
| D6-75 | 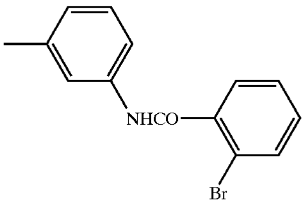 | H | $Li^{\oplus}$ |
| D6-76 |  | H | $Na^{\oplus}$ |
| D6-77 |  | H | $Li^{\oplus}$ |
| D6-78 |  | H | 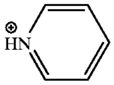 |
| D6-79 | 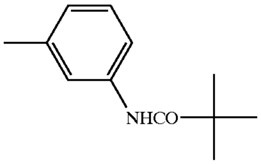 | H | $Na^{\oplus}$ |
| D6-80 | 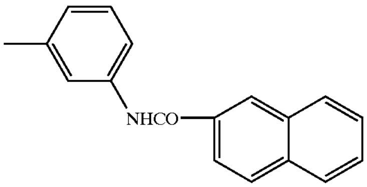 | H | 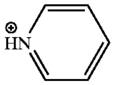 |
| D6-81 | 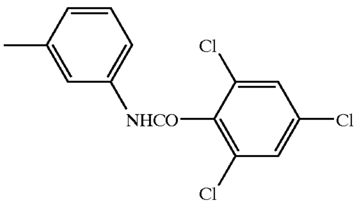 | H | 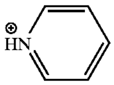 |

-continued
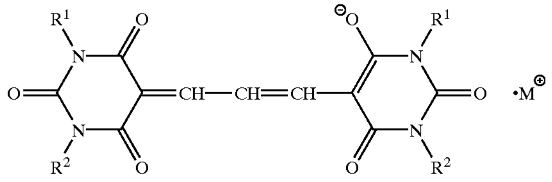
(n = 1, k = 1)
| Exemplifed compound No. | $R^1$ | $R^2$ | $M^\oplus$ |
|---|---|---|---|
| D6-82 |  | H | $Na^\oplus$ |
| D6-83 | 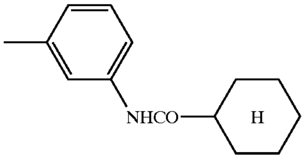 | H | $Na^\oplus$ |
| D6-84 | 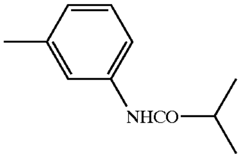 | H | $Na^\oplus$ |
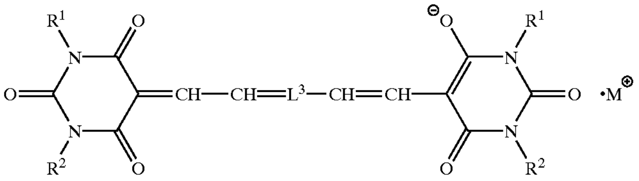
(n = 1, k = 1)
| Exemplified compound No. | $R^1$ | $R^2$ | $=L^3-$ | $M^\oplus$ |
|---|---|---|---|---|
| D6-85 | 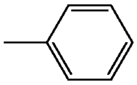 | H | $=CH-$ | $Li^\oplus$ |
| D6-86 | 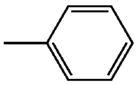 | 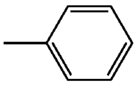 | $=CH-$ | $Na^\oplus$ |
| D6-87 | 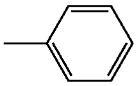 | H | 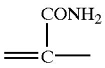 | $H^\oplus$ |
| D6-88 | 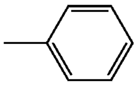 | H | 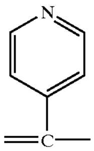 | $K^\oplus$ |

-continued
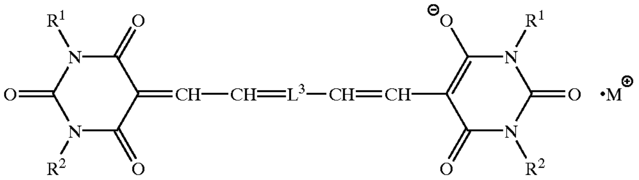
(n = 1, k = 1)
| Exemplified compound No. | $R^1$ | $R^2$ | $=L^3-$ | $M^{\oplus}$ |
|---|---|---|---|---|
| D6-89 | 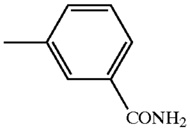 | H | =CH— | $Na^{\oplus}$ |
| D6-90 | 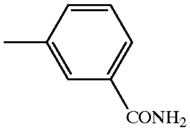 | H | 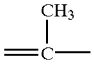 | $Na^{\oplus}$ |
| D6-91 | 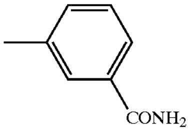 | H | 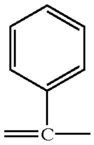 | 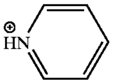 |
| D6-92 | 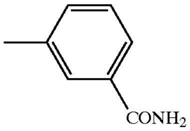 | H | 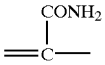 | $Li^{\oplus}$ |
| D6-93 | 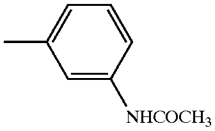 | H | =CH— | $Na^{\oplus}$ |
| D6-94 | 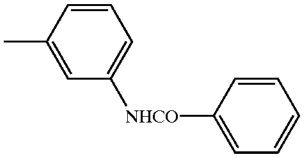 | H | =CH— | $Li^{\oplus}$ |
| D6-95 | 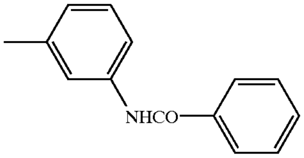 | H | 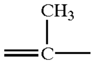 | $Na^{\oplus}$ |
| D6-96 | 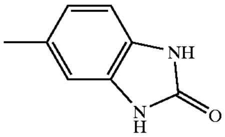 | H | =CH— | $Na^{\oplus}$ |

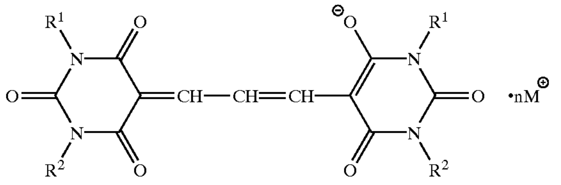
(k = 1)
| Exmplified compound No. | $R^1$ | $R^2$ | n | $M^{\oplus}$ |
|---|---|---|---|---|
| D6-97 | 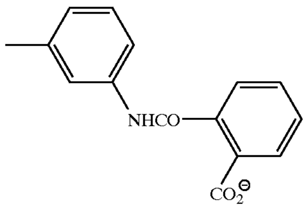 | H | 3 | $Na^{\oplus}$ |
-continued
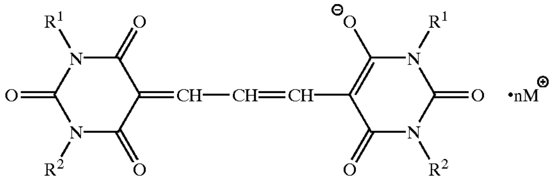
(k = 1)
| Exmplified compound No. | $R^1$ | $R^2$ | n | $M^{\oplus}$ |
|---|---|---|---|---|
| D6-98 | 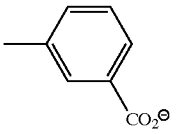 | H | 3 | $K^{\oplus}$ |
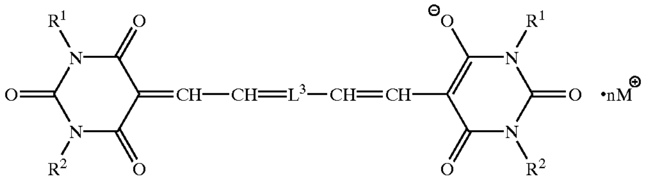
(k = 1)
| Exemplified compound No. | $R^1$ | $R^2$ | $=L^3-$ | n | $M^{\oplus}$ |
|---|---|---|---|---|---|
| D6-99 | 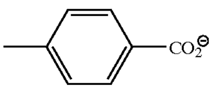 | H | 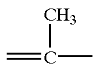 | 3 | $Na^{\oplus}$ |
| D6-100 | 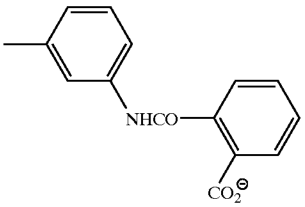 | H | 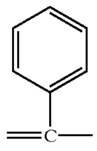 | 3 | $Li^{\oplus}$ |

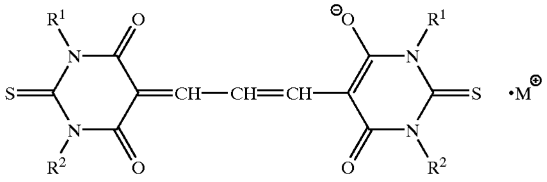
(n = 1, k = 1)
| Exemplified compound No. | $R^1$ | $R^2$ | $M^{\oplus}$ |
|---|---|---|---|
| D7-1 | 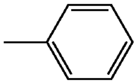 | H | $Li^{\oplus}$ |
| D7-2 | 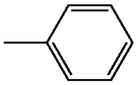 | H | $Na^{\oplus}$ |
| D7-3 |  | H | $Na^{\oplus}$ |
| D7-4 | 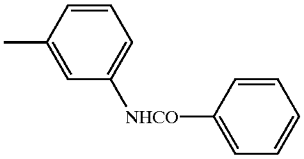 | H | $Na^{\oplus}$ |
| D7-5 | 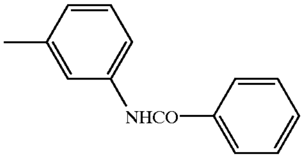 | H | 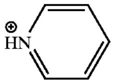 |
| D7-6 | 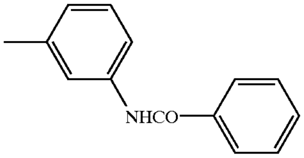 | H | 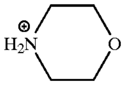 |
| D7-7 | 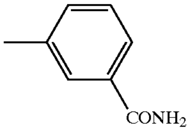 | H | $Li^{\oplus}$ |
| D7-8 | 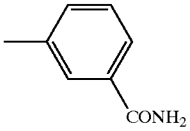 | H | $Na^{\oplus}$ |
| D7-9 | 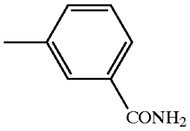 | H | $K^{\oplus}$ |

-continued
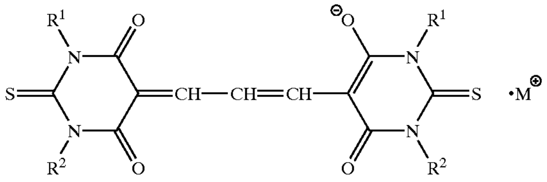
(n = 1, k = 1)
| Exemplified compound No. | $R^1$ | $R^2$ | $M^{\oplus}$ |
|---|---|---|---|
| D7-10 | 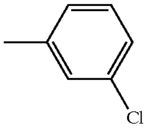 | H | $Na^{\oplus}$ |
| D7-11 | 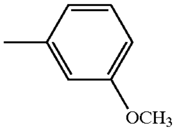 | H | $Li^{\oplus}$ |
| D7-12 | 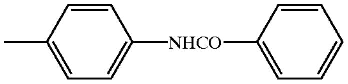 | H | $Li^{\oplus}$ |
| D7-13 | 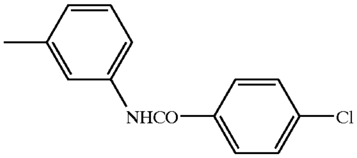 | H | $Na^{\oplus}$ |
| D7-14 | 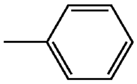 | 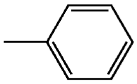 | $\overset{\oplus}{H}NEt_3$ |
| D7-15 | 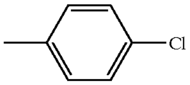 | H | 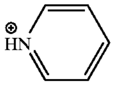 |
| D7-16 | $—CH_3$ | H | $K^{\oplus}$ |
| D7-17 | $—CH_3$ | $—CH_3$ | $Na^{\oplus}$ |
| D7-18 | 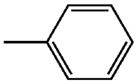 | $—CH_3$ | $Na^{\oplus}$ |
| D7-19 |  |  | $Li^{\oplus}$ |
| D7-20 | 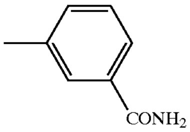 | 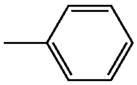 | $Na^{\oplus}$ |

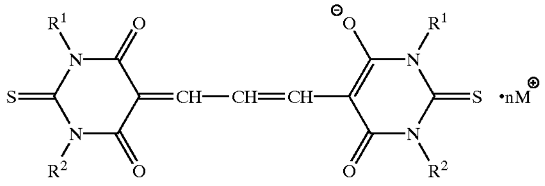
(k = 1)
| Exemplified compound No. | $R^1$ | $R^2$ | n | $M^{\oplus}$ |
|---|---|---|---|---|
| D7-21 | 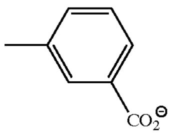 | H | 3 | $Na^{\oplus}$ |
| D7-22 | 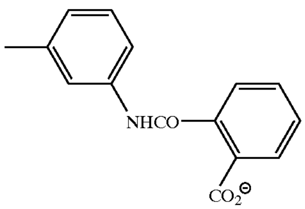 | H | 3 | $K^{\oplus}$ |
| D7-23 | 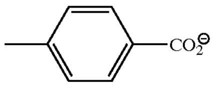 | H | 3 | 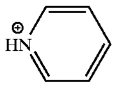 |
(D8-1)
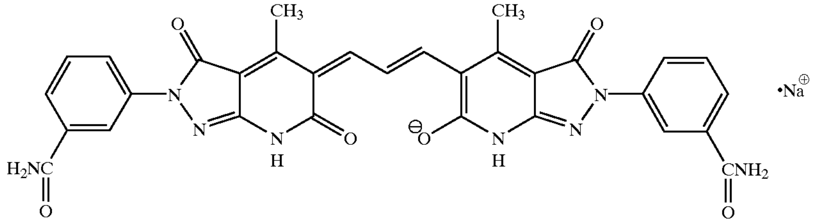
(D8-2)
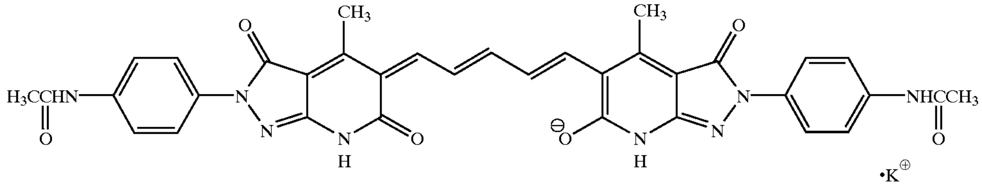
(D9-1)
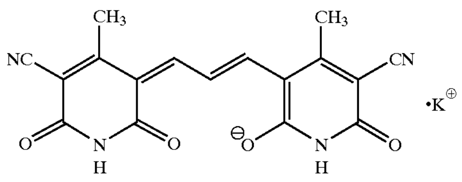
(D9-2)
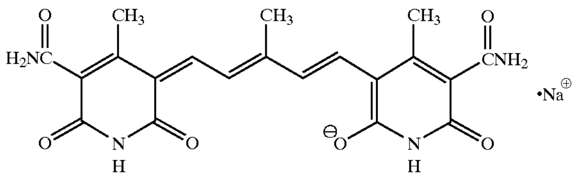

-continued
(D9-3)
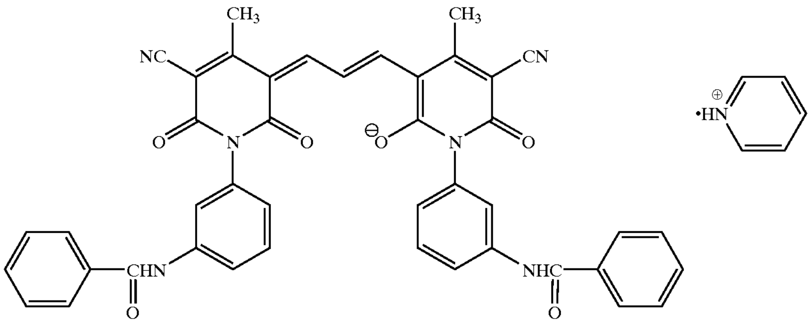
(D10-1)
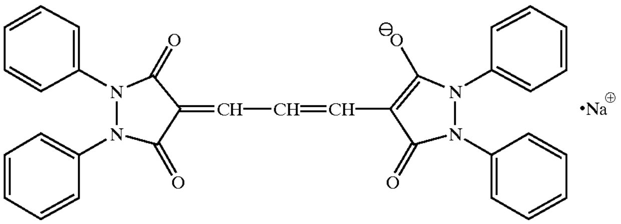
(D10-2)
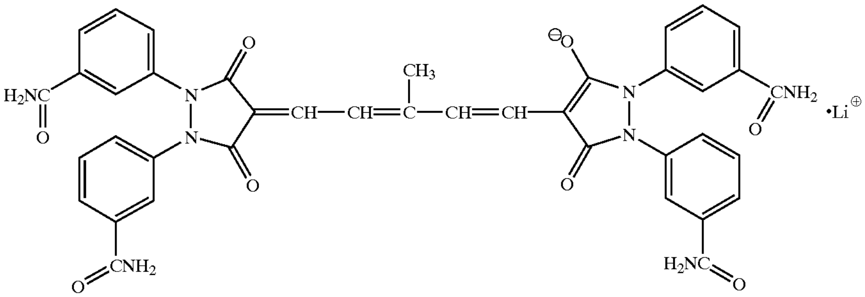
(D11-1)
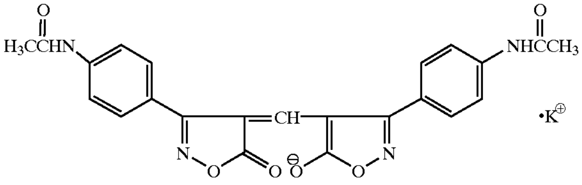
(D11-2)
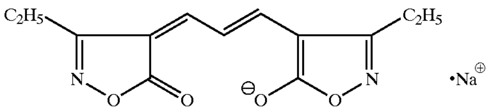
(D11-3)
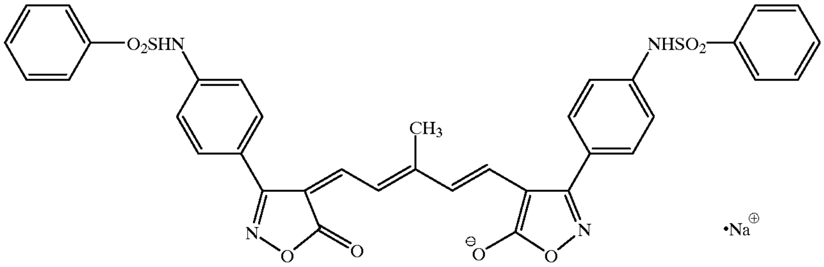

-continued
(D12-1)
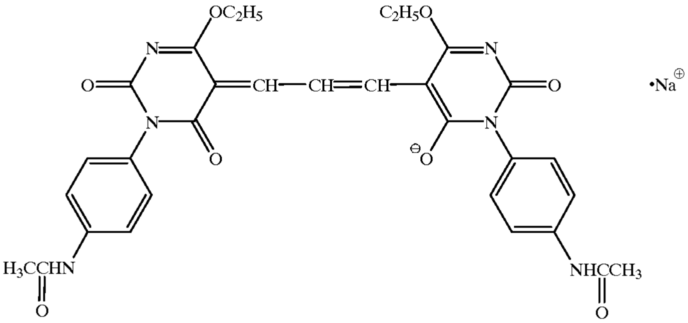
(D12-2)
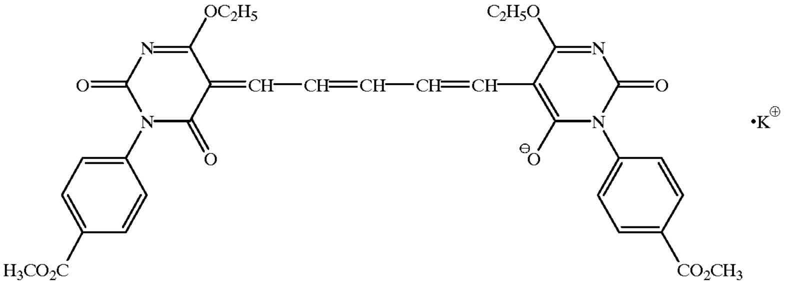
(D12-3)
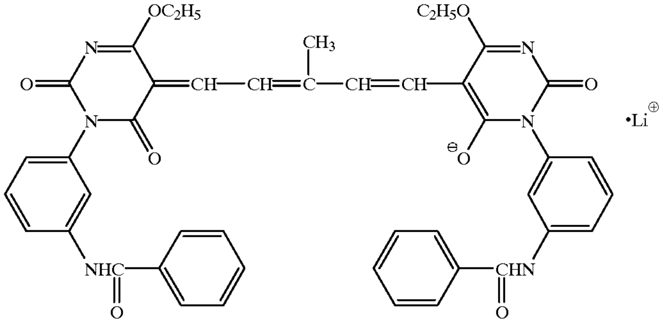
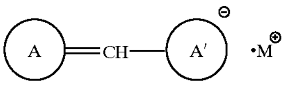
(n = 1, k = 1)
| Exemplified compound No. | 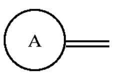 | 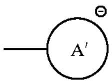 | M⊕ |
|---|---|---|---|
| D13-1 | 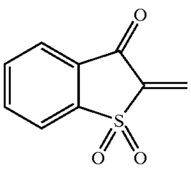 | 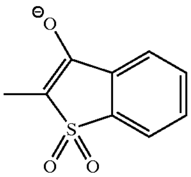 | Li⊕ |

-continued
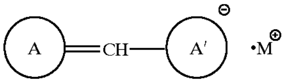
(n = 1, k = 1)
| Exemplified compound No. | 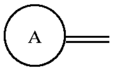 | 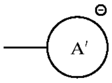 | $M^{\oplus}$ |
|---|---|---|---|
| D13-2 | 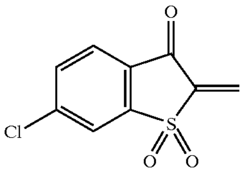 | 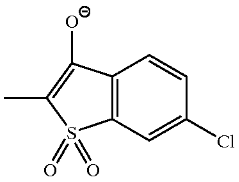 | $Na^{\oplus}$ |
| D13-3 | 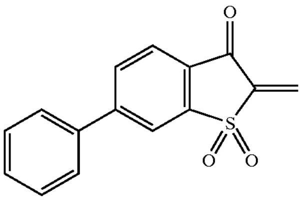 | 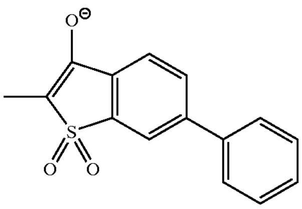 | $Na^{\oplus}$ |
| D13-4 | 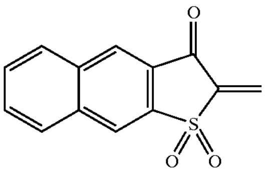 | 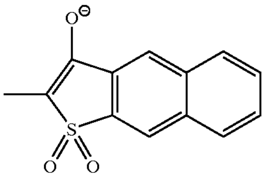 | $K^{\oplus}$ |
| D14-1 | 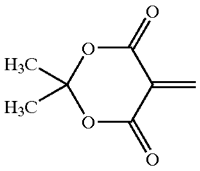 | 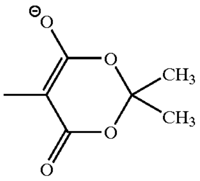 | $Na^{\oplus}$ |
| D15-1 | 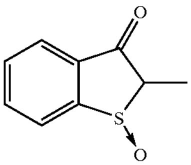 | 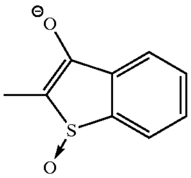 | $Na^{\oplus}$ |
| D16-1 | 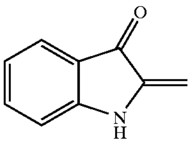 | 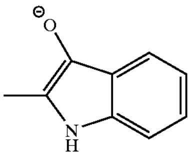 | $K^{\oplus}$ |

-continued
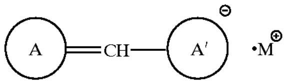
(n = 1, k = 1)
| Exemplified compound No. | 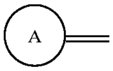 | 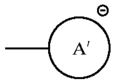 | M⊕ |
|---|---|---|---|
| D18-1 | 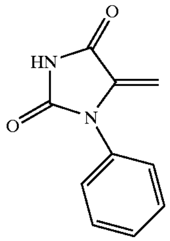 | 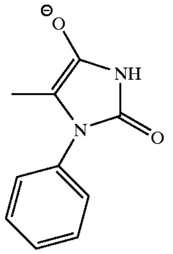 | K⊕ |
| D19-1 | 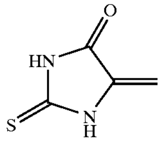 | 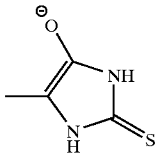 | Na⊕ |
| D20-1 | 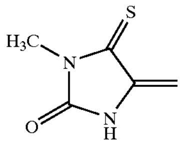 | 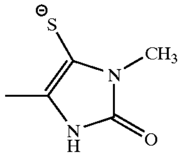 | K⊕ |
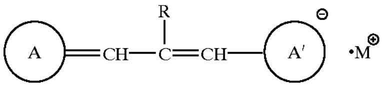
(n = 1, k = 1)
| Exemplified compound No. | 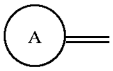 | 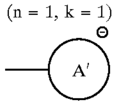 | R | M⊕ |
|---|---|---|---|---|
| D13-5 | 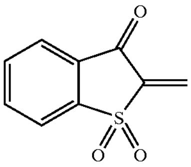 | 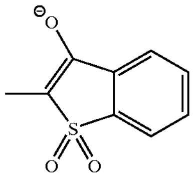 | —H | Na⊕ |
| D13-6 | 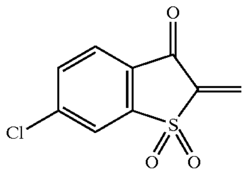 | 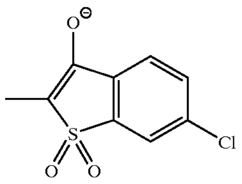 | —H | Li⊕ |

-continued
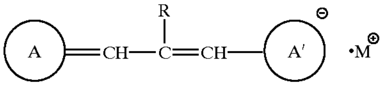
(n = 1, k = 1)
| Exemplified compound No. | 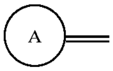 | 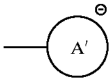 | R | $M^{\oplus}$ |
|---|---|---|---|---|
| D13-7 | 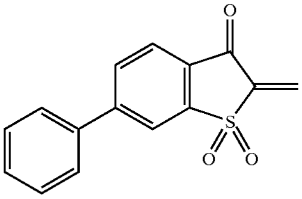 | 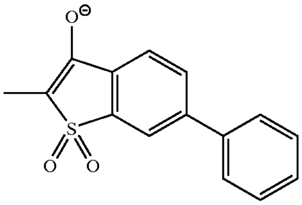 | —H | $K^{\oplus}$ |
| D13-8 | 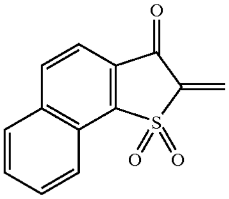 | 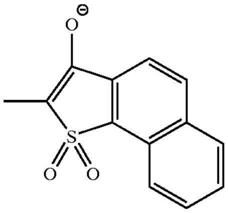 | —H | $\overset{\oplus}{\text{H}}\text{NEt}_3$ |
| D14-2 | 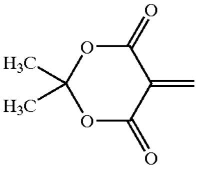 | 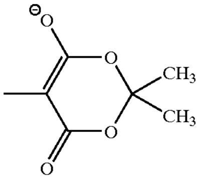 | —H | $Li^{\oplus}$ |
| D15-2 | 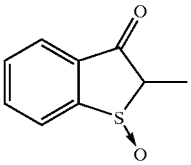 | 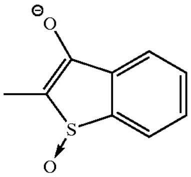 | $—CH_3$ | $Na^{\oplus}$ |
| D16-2 | 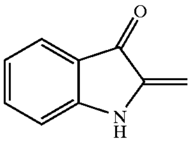 | 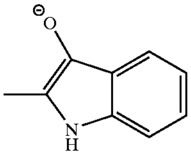 | 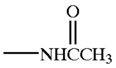 | $Na^{\oplus}$ |
| D18-2 | 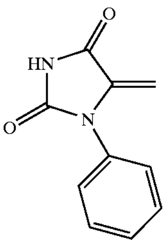 | 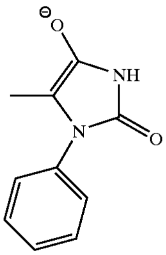 | 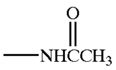 | $Na^{\oplus}$ |

-continued
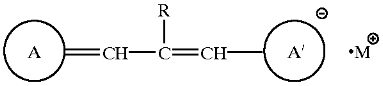
(n = 1, k = 1)
| Exemplified compound No. | 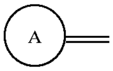 | 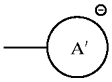 | R | $M^{\oplus}$ |
|---|---|---|---|---|
| D19-2 | 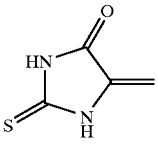 | 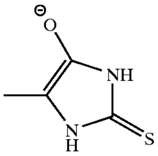 | $—CH_3$ | $Na^{\oplus}$ |
| D20-2 | 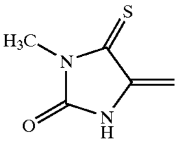 | 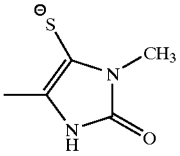 | —H | $Na^{\oplus}$ |
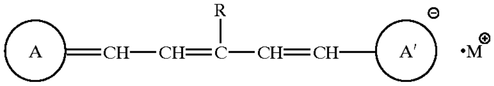
(n = 1, k = 1)
| Exemplified compound No. | 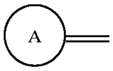 | 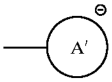 | R | $M^{\oplus}$ |
|---|---|---|---|---|
| D13-9 | 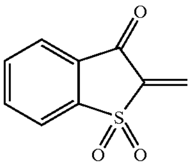 | 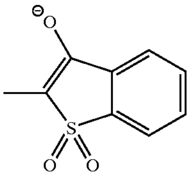 | $—CH_3$ | $K^{\oplus}$ |
| D13-10 | 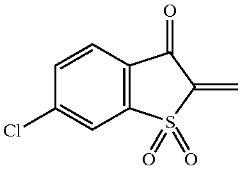 | 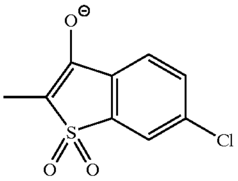 | —H | $Na^{\oplus}$ |
| D13-11 | 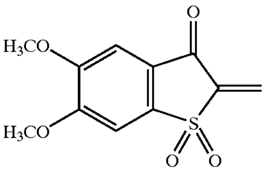 | 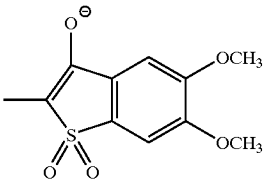 | $—CH_3$ | $Li^{\oplus}$ |

-continued
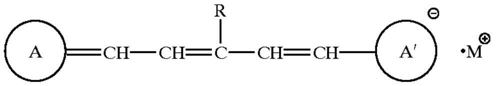
(n = 1, k = 1)
| Exemplified compound No. | 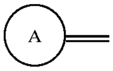 | 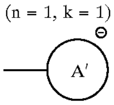 | R | $M^{\oplus}$ |
|---|---|---|---|---|
| D13-12 | 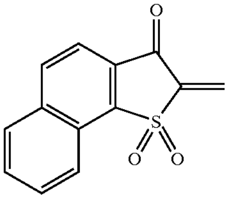 | 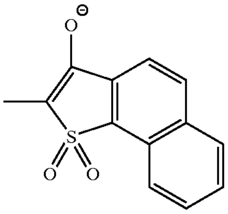 | $-CH_3$ | 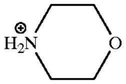 |
| D14-3 | 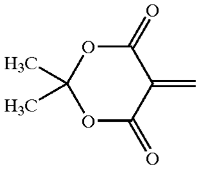 | 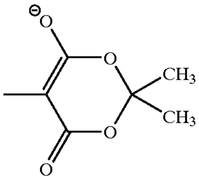 | —H | $Li^{\oplus}$ |
| D15-3 | 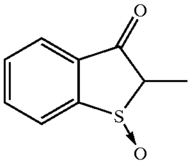 | 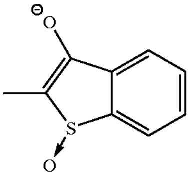 | $-CH_3$ | $Na^{\oplus}$ |
| D16-3 | 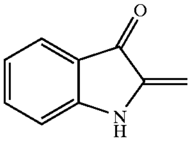 | 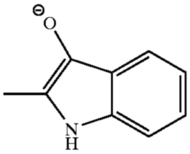 | 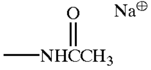 | $Na^{\oplus}$ |
| D18-3 | 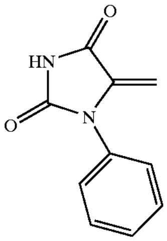 | 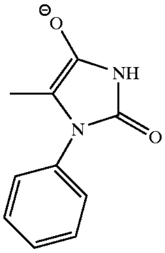 | $-CH_3$ | $Na^{\oplus}$ |
| D19-3 | 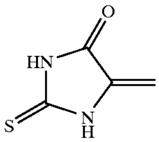 | 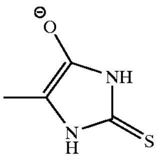 | —H | $Na^{\oplus}$ |
| D20-3 | 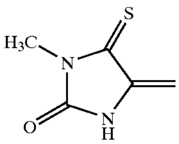 | 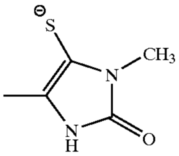 | —H | $Na^{\oplus}$ |

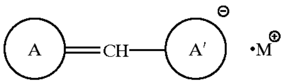
(n = 1, k = 1)
| Exemplified compound No. | 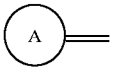 | 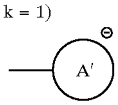 | M⊕ |
|---|---|---|---|
| D23-1 | 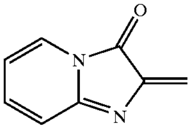 | 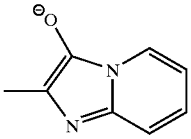 | Li⊕ |
| D28-1 | 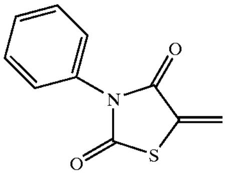 | 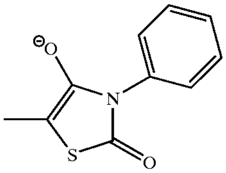 | K⊕ |
| D33-1 | 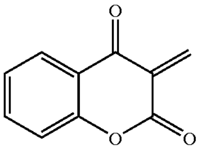 | 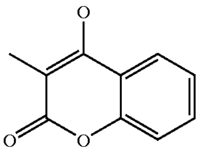 | Na⊕ |
| D35-1 | 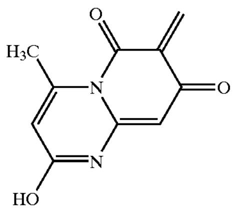 | 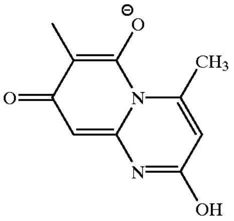 | 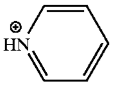 |
| D38-1 | 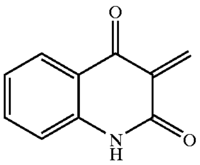 | 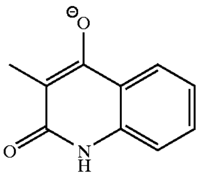 | Na⊕ |
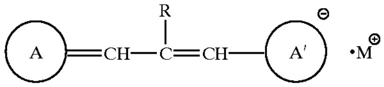
(n = 1, k = 1)
| Exemplified compound No. | 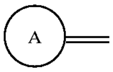 | 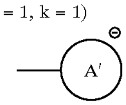 | —R | M⊕ |
|---|---|---|---|---|
| D23-2 | 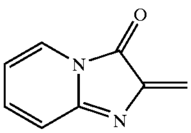 | 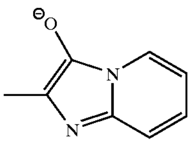 | —H | Na⊕ |

-continued
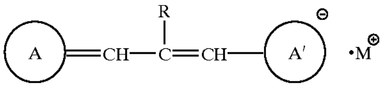
(n = 1, k = 1)
| Exemplified compound No. | 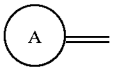 | 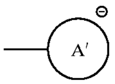 | —R | $M^{\oplus}$ |
|---|---|---|---|---|
| D28-2 | 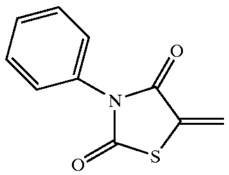 | 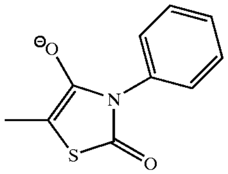 | $—CH_3$ | $K^{\oplus}$ |
| D33-2 | 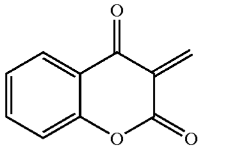 | 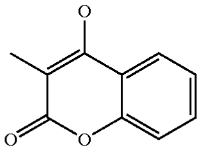 | —H | $\overset{\oplus}{H}NEt_3$ |
| D35-2 | 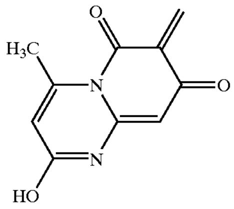 | 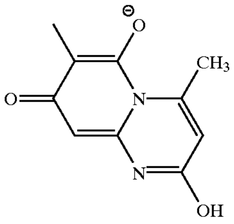 | —H | $Na^{\oplus}$ |
| D38-2 | 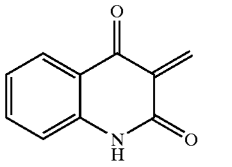 | 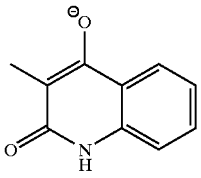 | —H | $Na^{\oplus}$ |
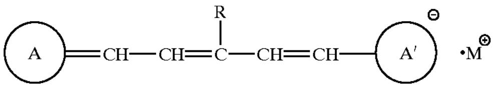
(n = 1, k = 1)
| Exemplified compound No. | 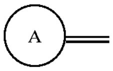 | 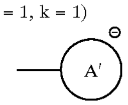 | —R | $M^{\oplus}$ |
|---|---|---|---|---|
| D23-3 | 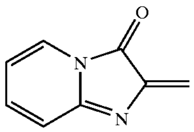 | 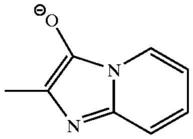 | —H | $Na^{\oplus}$ |

-continued
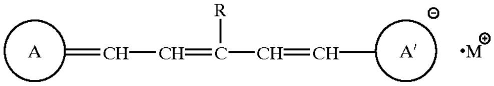
(n = 1, k = 1)
| Exemplified compound No. | 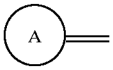 | 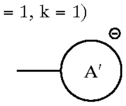 | —R | $M^{\oplus}$ |
|---|---|---|---|---|
| D28-3 | 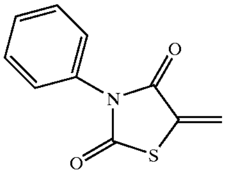 | 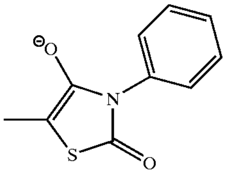 | $—CH_3$ | $K^{\oplus}$ |
| D33-3 | 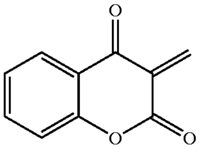 | 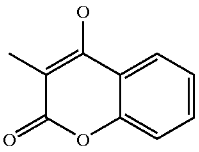 | $—CH_3$ | $Na^{\oplus}$ |
| D35-3 | 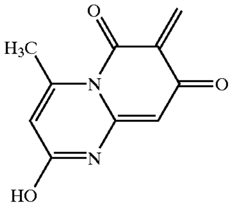 | 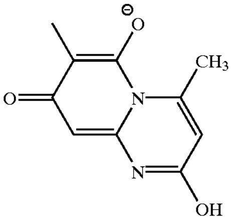 | —H | $Li^{\oplus}$ |
| D38-3 | 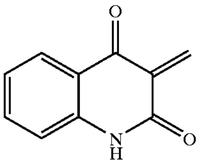 | 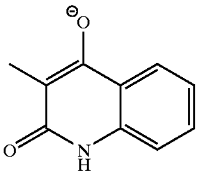 | 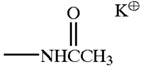 | $K^{\oplus}$ |
(D1-101)
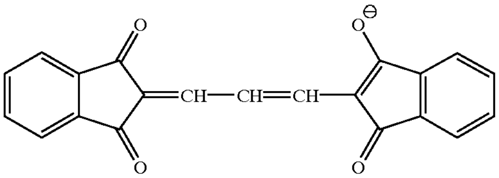
•1/2 $Ca^{2\oplus}$
(D1-102)
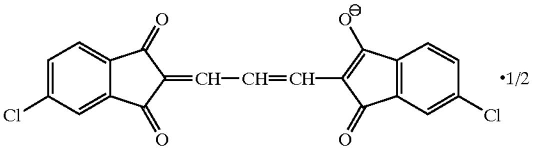
•1/2 $Mg^{2\oplus}$
(D1-103)
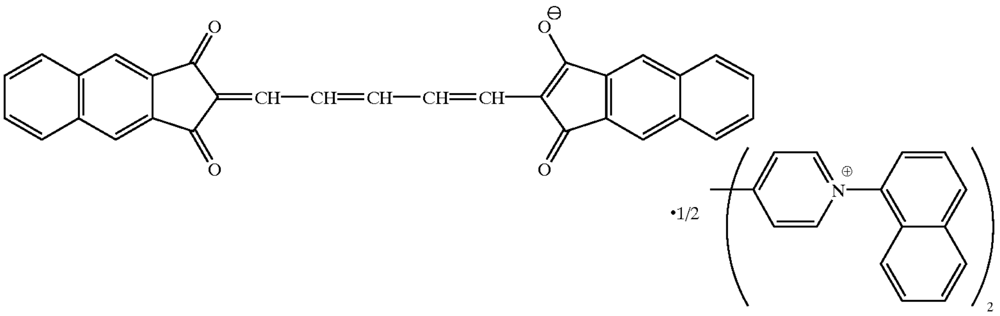

-continued
(D4-101)
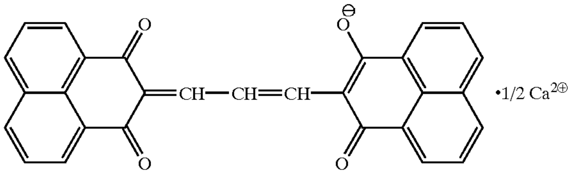
(D2-101)
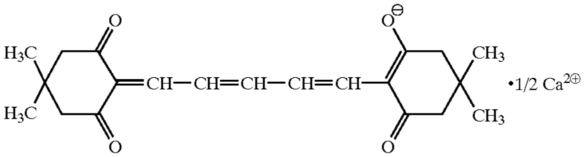
(D3-101)
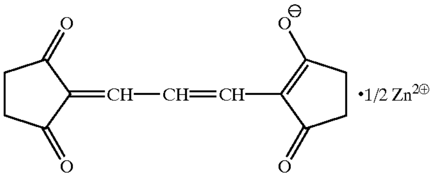
(D3-102)
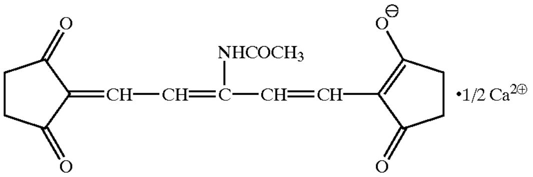
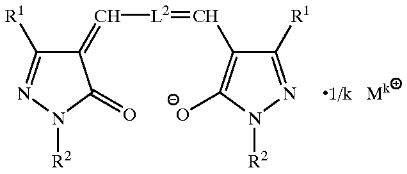
(n = 1)
| Exemplified compound No. | $R^1$ | $R^2$ | $—L^2═$ | k | $M^{k\oplus}$ |
|---|---|---|---|---|---|
| D5-101 | $—CH_3$ | H | —CH═ | 2 | $Mg^{2\oplus}$ |
| D5-102 | $—CH_3$ | $—CONH_2$ | —CH═ | 2 | $Ca^{2\oplus}$ |
| D5-103 | $—CH_3$ | $—CONH_2$ | 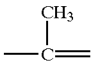 | 3 | $Al^{3\alpha}$ |
| D5-104 | $—C_2H_5$ | $—CONH_2$ | 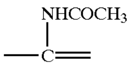 | 2 | $Ca^{2\oplus}$ |
| D5-105 | $—C_2H_5$ | $—CONH_2$ | —CH═ | 2 | 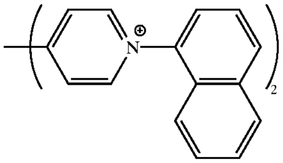 |
| D5-106 | 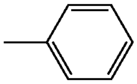 | $—CONH_2$ | 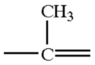 | 2 | $Ca^{2\oplus}$ |
| D5-107 | 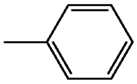 | $—CONH_2$ | —CH═ | 2 | $Ba^{2\oplus}$ |
| D5-108 | 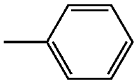 | H | —CH═ | 3 | $Al^{3\oplus}$ |
| D5-109 | 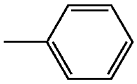 | $—CH_3$ | 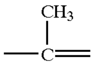 | 2 | $Ca^{2\oplus}$ |

-continued
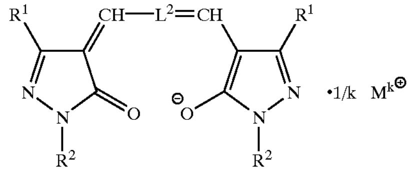
(n = 1)
| Exemplified compound No. | $R^1$ | $R^2$ | $—L^2═$ | k | $M^{k\oplus}$ |
|---|---|---|---|---|---|
| D5-110 | 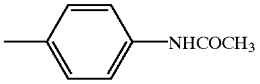 | H | 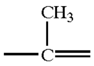 | 2 | $Mg^{2\oplus}$ |
| D5-111 | 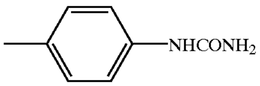 | $—CH_3$ | —CH═ | 2 | 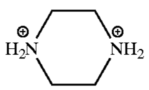 |
| D5-112 | $—CONH_2$ | H | 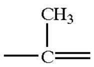 | 2 | $Ca^{2\oplus}$ |
| D5-113 | $—CONH_2$ | $—CH_3$ | —CH═ | 3 | $Al^{3\oplus}$ |
| D5-114 | $—CONH_2$ | 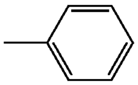 | —CH═ | 2 | $Ca^{2\oplus}$ |
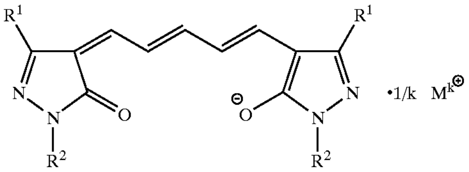
(n = 1)
| Exemplified compound No. | $R^1$ | $R^2$ | k | $M^{k\oplus}$ |
|---|---|---|---|---|
| D5-115 | $—CONH_2$ | H | 2 | $Ca^{2\oplus}$ |
| D5-116 | 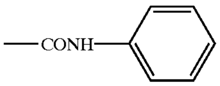 | H | 2 | 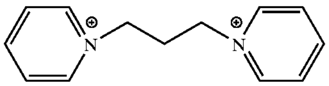 |
| D5-117 | 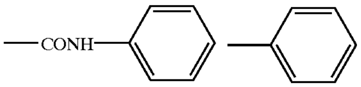 | | 2 | $Mg^{2\oplus}$ |
| D5-118 | $—CO_2C_2H_5$ | H | 2 | $Ca^{2\oplus}$ |
| D5-119 | $—CO_2C_2H_5$ | 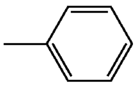 | 2 | $Ca^{2\oplus}$ |
| D5-120 | $—CO_2C_2H_5$ | 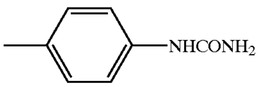 | 2 | $Zn^{2\oplus}$ |

-continued
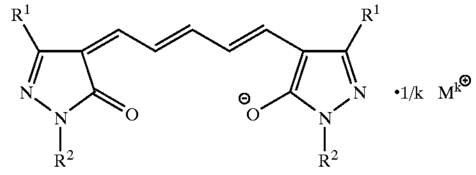
(n = 1)
| Exemplified compound No. | $R^1$ | $R^2$ | k | $M^{k\oplus}$ |
|---|---|---|---|---|
| D5-121 | —CN | H | 2 | 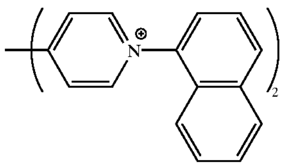 |
| D5-122 | —CN | 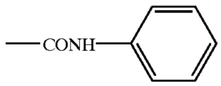 | 2 | $Ca^{2\oplus}$ |
| D5-123 | —CN | —$CONHCH_3$ | 3 | $Al^{3\oplus}$ |
| D5-124 | —$COCH_3$ | H | 2 | $Ca^{2\oplus}$ |
| D5-125 | —$CF_3$ | 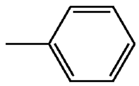 | 2 | $Ca^{2\oplus}$ |
| D5-126 | —$CONHCH_3$ | H | 2 | $Mg^{2\oplus}$ |
| D5-127 | 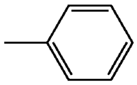 | —$CONH_2$ | 2 | $Ca^{2\oplus}$ |
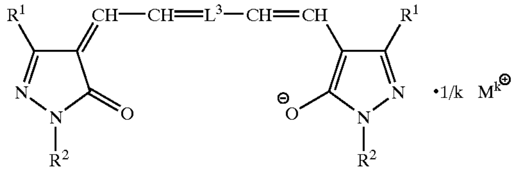
(n = 1)
| Exemplified compound No. | $R^1$ | $R^2$ | —$L^2$= | k | $M^{k\oplus}$ |
|---|---|---|---|---|---|
| D5-128 | 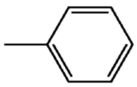 | H | =CH— | 2 | $Ca^{2\oplus}$ |
| D5-129 | 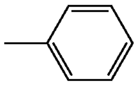 | 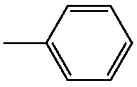 | 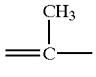 | 2 | 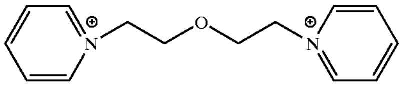 |
| D5-130 | 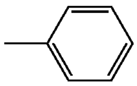 | —$CONH_2$ | 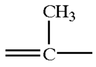 | 2 | $Ca^{2\oplus}$ |

-continued
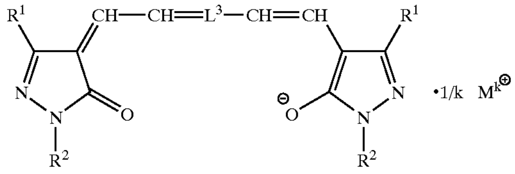
(n = 1)
| Exemplified compound No. | $R^1$ | $R^2$ | $—L^2═$ | k | $M^{k\oplus}$ |
|---|---|---|---|---|---|
| D5-131 | 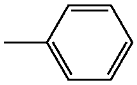 | $—CH_3$ | 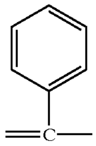 | 2 | $Mg^{2\oplus}$ |
| D5-132 | 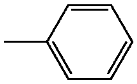 | H | 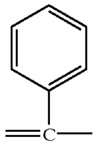 | 2 | $Zn^{2\oplus}$ |
| D5-133 | 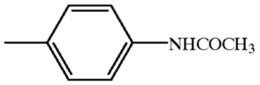 | H | 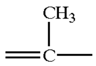 | 2 | $Ca^{2\oplus}$ |
| D5-134 | 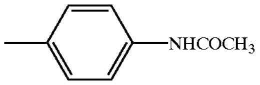 | 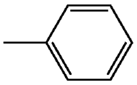 | ═CH— | 2 | $Mg^{2\oplus}$ |
| D5-135 | $—CH_3$ | $—CONH_2$ | 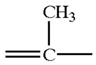 | 2 | $Ca^{2\oplus}$ |
| D5-136 | $—C_2H_5$ | $—CONH_2$ | ═CH— | 2 | 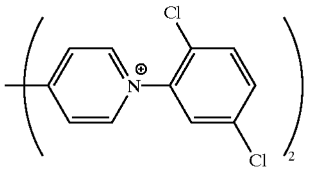 |
| D5-137 | $—C_2H_5$ | H | 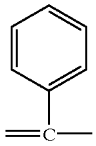 | 2 | $Sr^{2\oplus}$ |

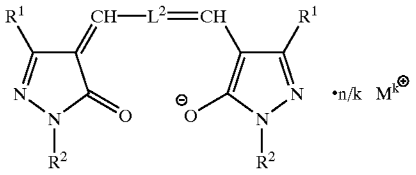
| Exemplified compound No. | $R^1$ | $R^2$ | $—L^2═$ | n | k | $M^{k\oplus}$ |
|---|---|---|---|---|---|---|
| D5-138 | $—CH_3$ | 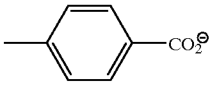 | 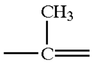 | 3 | 2 | $Ca^{2\oplus}$ |
| D5-139 | $—CONH_2$ | 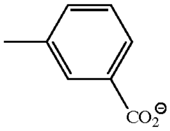 | —CH═ | 3 | 2 | $Ca^{2\oplus}$ |
| D5-140 | 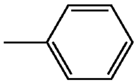 | 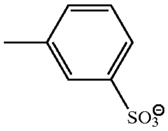 | —CH═ | 3 | 2 | $Ba^{2\oplus}$ |
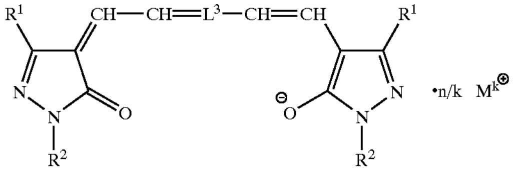
| Exemplified compound No. | $R^1$ | $R^2$ | $—L^3═$ | n | k | $M^{k\oplus}$ |
|---|---|---|---|---|---|---|
| D5-141 | $—CH_3$ | 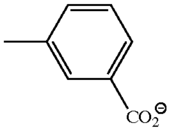 | 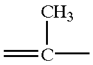 | 3 | 2 | $Ca^{2\oplus}$ |
| D5-142 | $—CONH_2$ | 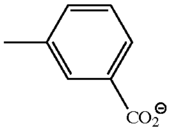 | ═CH— | 3 | 2 | $Ca^{2\oplus}$ |
| D5-143 | 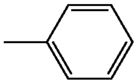 | 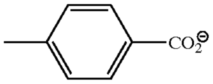 | 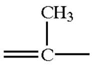 | 3 | 3 | $Al^{3\oplus}$ |

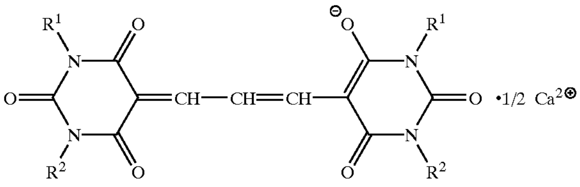
| Exemplified compound No. | $R^1$ | $R^2$ |
|---|---|---|
| D6-101 | 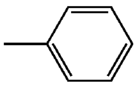 | H |
| D6-102 | 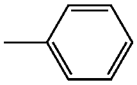 | $-CH_3$ |
| D6-103 | 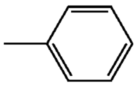 | 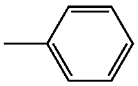 |
| D6-104 | $-CH_3$ | H |
| D6-105 | $-CH_3$ | $-CH_3$ |
| D6-106 | H | H |
-continued
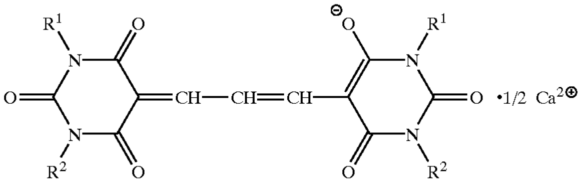
| Exemplified compound No. | $R^1$ | $R^2$ |
|---|---|---|
| D6-107 | 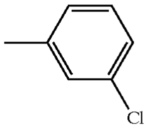 | H |
| D6-108 | 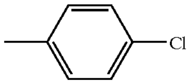 | H |
| D6-109 | 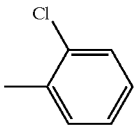 | H |
| D6-110 | 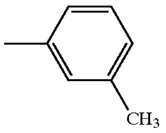 | H |
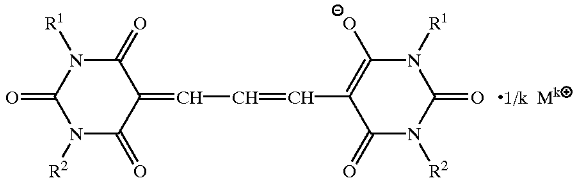
(n = 1)
| Exemplified compound No. | $R^1$ | $R^2$ | k | $M^{k\oplus}$ |
|---|---|---|---|---|
| D6-111 | 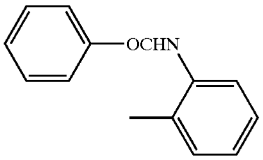 | H | 2 | $Ca^{2\oplus}$ |
| D6-112 | 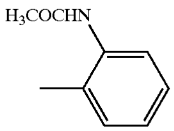 | H | 2 | $Mg^{2\oplus}$ |

-continued
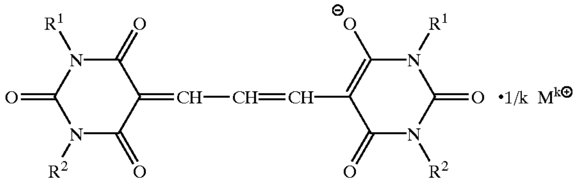
(n = 1)
| Exemplified compound No. | $R^1$ | $R^2$ | k | $M^{k\oplus}$ |
|---|---|---|---|---|
| D6-113 | 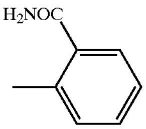 | H | 2 | $Ca^{2\oplus}$ |
| D6-114 | 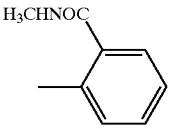 | H | 3 | $Al^{3\oplus}$ |
| D6-115 | 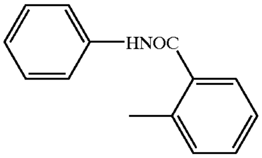 | H | 2 | 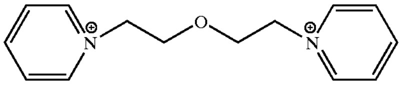 |
| D6-116 | 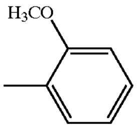 | H | 2 | $Ca^{2\oplus}$ |
| D6-117 | 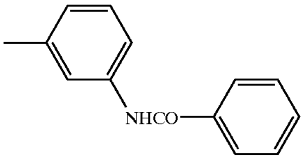 | 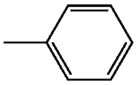 | 2 | $Ca^{2\oplus}$ |
| D6-118 |  |  | 2 | $Ca^{2\oplus}$ |
| D6-119 | 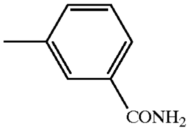 | $—CH_3$ | 2 | 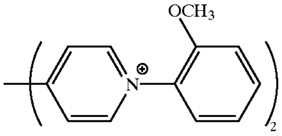 |
| D6-120 | 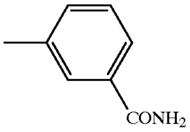 | 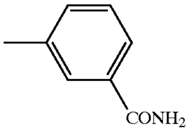 | 2 | $Ca^{2\oplus}$ |

-continued
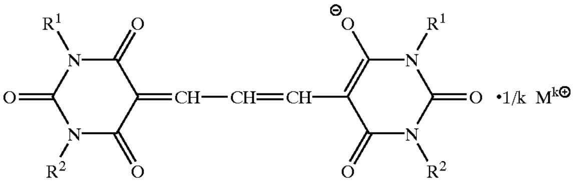
(n = 1)
| Exemplified compound No. | $R^1$ | $R^2$ | k | $M^{k\oplus}$ |
|---|---|---|---|---|
| D6-121 | 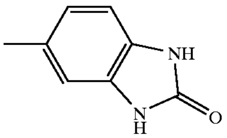 | H | 2 | $Ca^{2\oplus}$ |
| D6-122 | 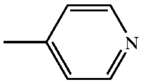 | H | 2 | $Ba^{2\oplus}$ |
| D6-123 | 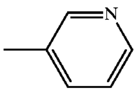 | H | 2 | $Ca^{2\oplus}$ |
| D6-124 | 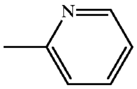 | H | 2 | $Zn^{2\oplus}$ |
| D6-125 | 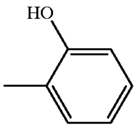 | H | 2 | $Zn^{2\oplus}$ |
| D6-126 | 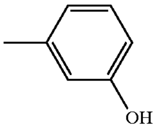 | H | 2 | $Ca^{2\oplus}$ |
| D6-127 | 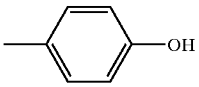 | H | 2 | 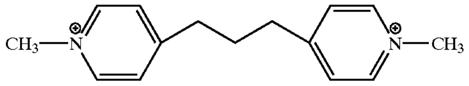 |
| D6-128 | 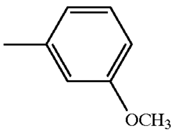 | H | 2 | $Ca^{2\oplus}$ |
| D6-129 | 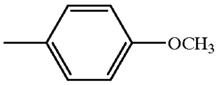 | H | 2 | $Sr^{2\oplus}$ |
| D6-130 | 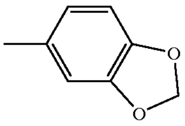 | H | 2 | $Ca^{2\oplus}$ |

-continued
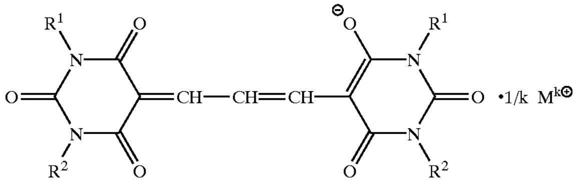
(n = 1)
| Exemplified compound No. | $R^1$ | $R^2$ | k | $M^{k\oplus}$ |
|---|---|---|---|---|
| D6-131 | 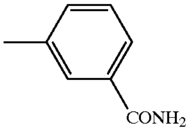 | H | 2 | $Ca^{2\oplus}$ |
| D6-132 | 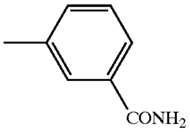 | H | 2 | $Ba^{2\oplus}$ |
| D6-133 | 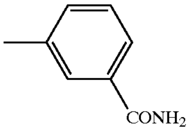 | H | 2 | 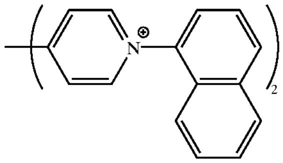 |
| D6-134 | 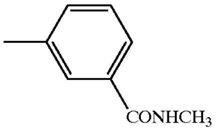 | H | 2 | $Ca^{2\oplus}$ |
| D6-135 | 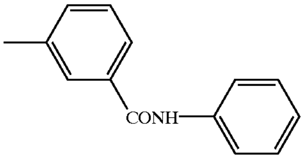 | H | 2 | $Mg^{2\oplus}$ |
| D6-136 | 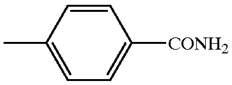 | H | 2 | 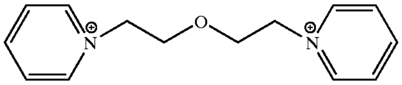 |
| D6-137 | 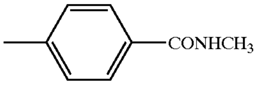 | H | 2 | $Ca^{2\oplus}$ |
| D6-138 | 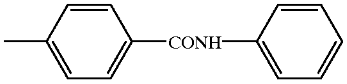 | H | 2 | $Mg^{2\oplus}$ |
| D6-139 | 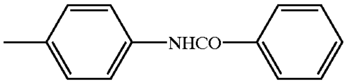 | H | 2 | $Ca^{2\oplus}$ |

-continued
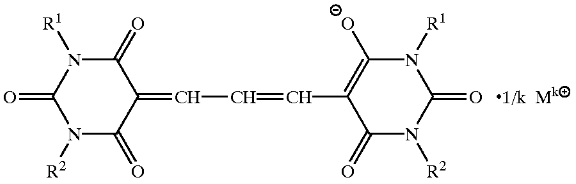
(n = 1)
| Exemplified compound No. | $R^1$ | $R^2$ | k | $M^{k\oplus}$ |
|---|---|---|---|---|
| D6-140 | 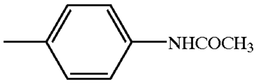 | H | 2 | 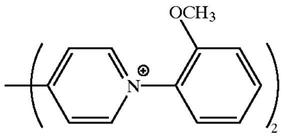 |
| D6-141 | 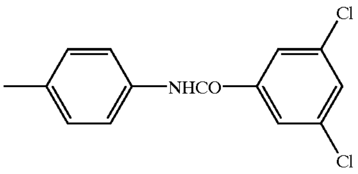 | H | 3 | $Al^{3\oplus}$ |
| D6-142 | 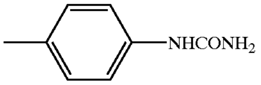 | H | 2 | $Ca^{2\oplus}$ |
| D6-143 | 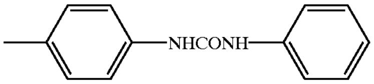 | H | 2 | $Zn^{2\oplus}$ |
| D6-144 | 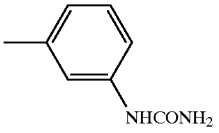 | H | 2 | $Ca^{2\oplus}$ |
| D6-145 |  | H | 2 | $Mg^{2\oplus}$ |
| D6-146 | 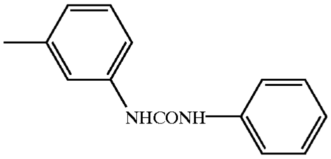 | H | 2 | $Mg^{2\oplus}$ |
| D6-147 | 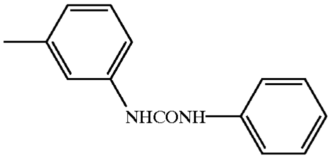 | H | 2 | 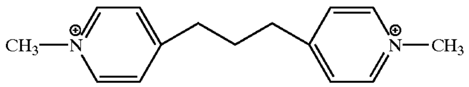 |

-continued
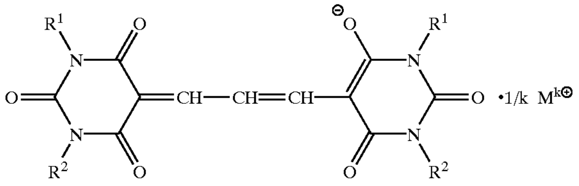
(n = 1)
| Exemplified compound No. | $R^1$ | $R^2$ | k | $M^{k\oplus}$ |
|---|---|---|---|---|
| D6-148 | 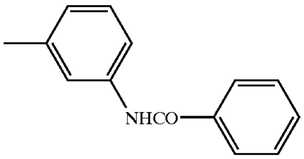 | H | 2 | $Ca^{2\oplus}$ |
| D6-149 | 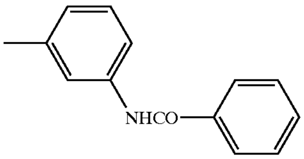 | H | 2 | $Mg^{2\oplus}$ |
| D6-150 | 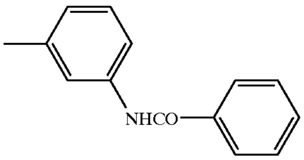 | H | 2 | $Zn^{2\oplus}$ |
| D6-151 | 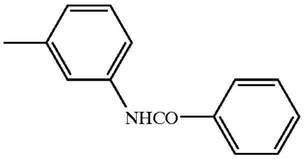 | H | 2 | 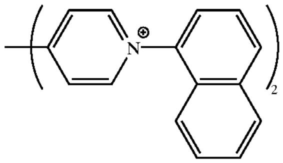 |
| D6-152 | 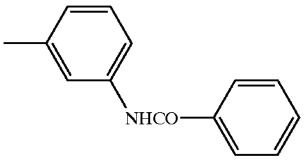 | H | 2 | 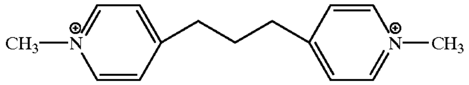 |
| D6-153 | 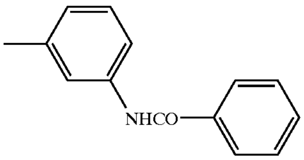 | H | 3 | $Al^{3\oplus}$ |
| D6-154 | 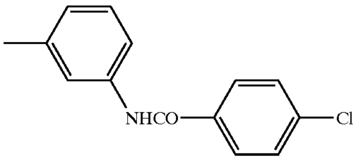 | H | 2 | $Ca^{2\oplus}$ |

-continued
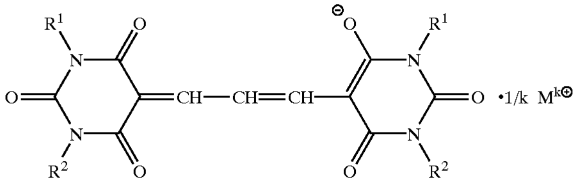
(n = 1)
| Exemplified compound No. | $R^1$ | $R^2$ | k | $M^{k\oplus}$ |
|---|---|---|---|---|
| D6-155 | 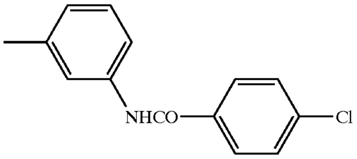 | H | 2 | $Mg^{2\oplus}$ |
| D6-156 | 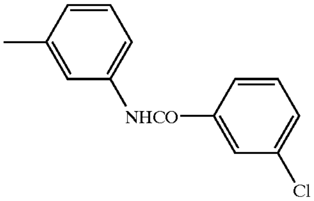 | H | 2 | $Ca^{2\oplus}$ |
| D6-157 | 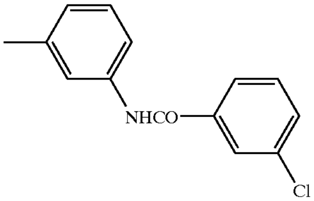 | H | 2 | $Zn^{2\oplus}$ |
| D6-158 | 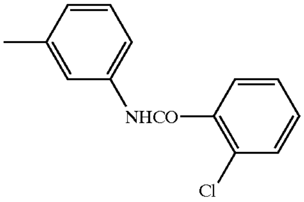 | H | 2 | $Ca^{2\oplus}$ |
| D6-159 | 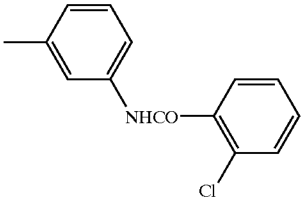 | H | 2 | $Mg^{2\oplus}$ |
| D6-160 | 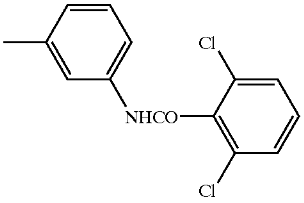 | H | 2 | $Ca^{2\oplus}$ |

-continued
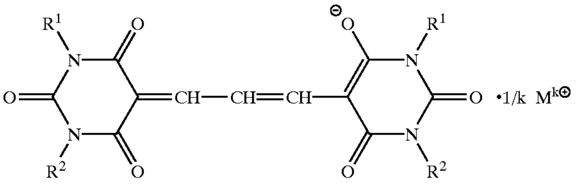
(n = 1)
| Exemplified compound No. | $R^1$ | $R^2$ | k | $M^{k\oplus}$ |
|---|---|---|---|---|
| D6-161 | 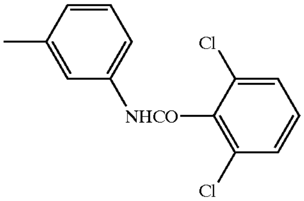 | H | 3 | $Al^{3\oplus}$ |
| D6-162 | 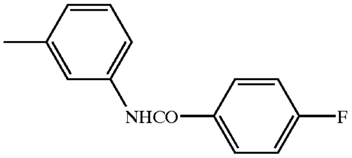 | H | 2 | $Ca^{2\oplus}$ |
| D6-163 | 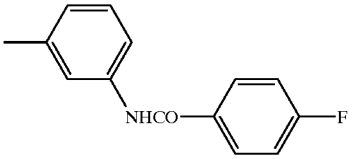 | H | 2 | $Mg^{2\oplus}$ |
| D6-164 | 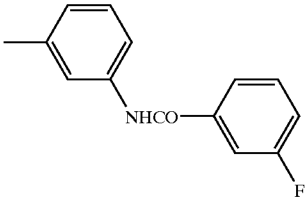 | H | 2 | $Ca^{2\oplus}$ |
| D6-165 | 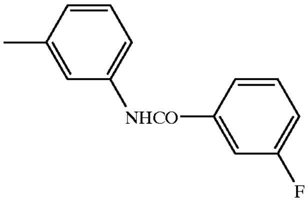 | H | 2 | $Mg^{2\oplus}$ |
| D6-166 | 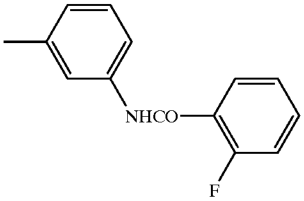 | H | 2 | $Ca^{2\oplus}$ |

-continued
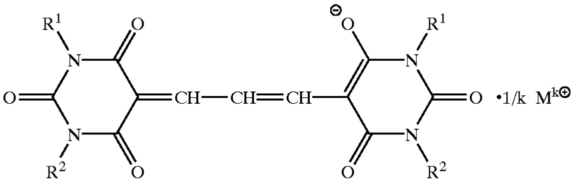
(n = 1)
| Exemplified compound No. | $R^1$ | $R^2$ | k | $M^{k\oplus}$ |
|---|---|---|---|---|
| D6-167 | 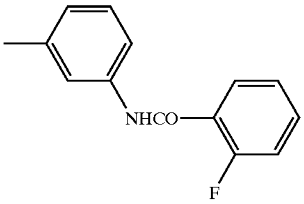 | H | 3 | $Al^{3\oplus}$ |
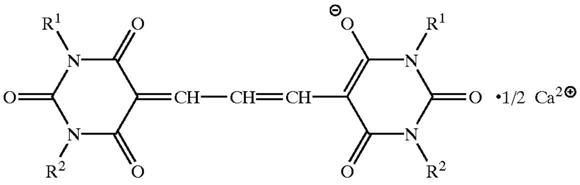
| Exemplified compound No. | $R^1$ | $R^2$ |
|---|---|---|
| D6-168 | 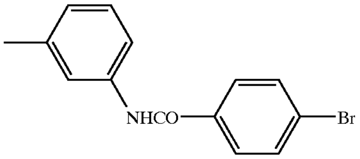 | H |
| D6-169 | 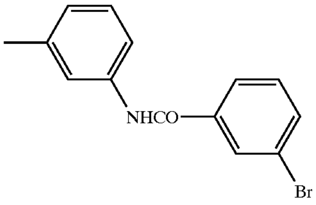 | H |
| D6-170 | 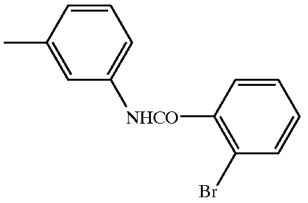 | H |
-continued
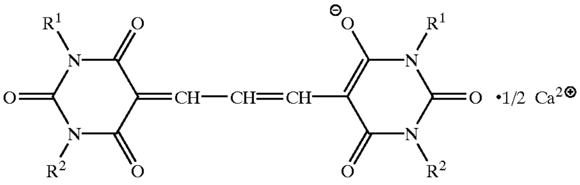
| Exemplified compound No. | $R^1$ | $R^2$ |
|---|---|---|
| D6-171 | 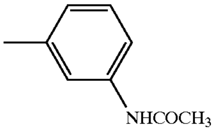 | H |
| D6-172 | 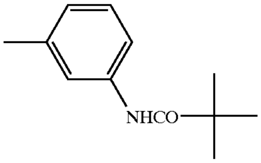 | H |
| D6-173 | 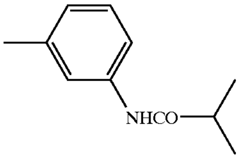 | H |
| D6-174 | 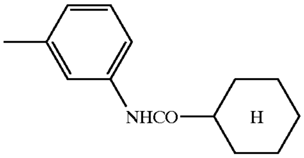 | H |

-continued
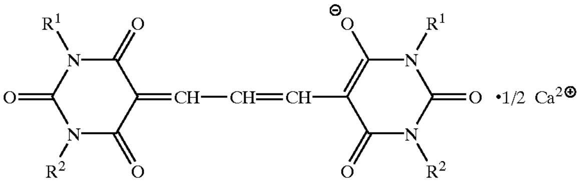
| Exemplified compound No. | $R^1$ | $R^2$ |
|---|---|---|
| D6-175 | 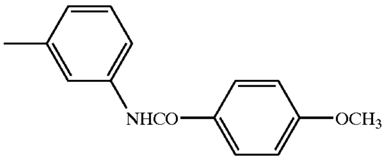 | H |
| D6-176 | 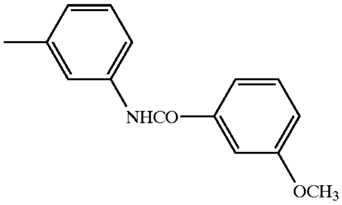 | H |
| D6-177 | 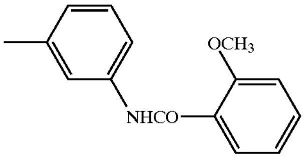 | H |
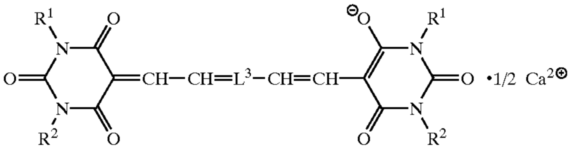
| Exemplified compound No. | $R^1$ | $R^2$ | $=L^3-$ |
|---|---|---|---|
| D6-178 | H | H | =CH— |
| D6-179 | 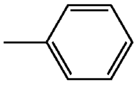 | H | =CH— |
| D6-180 | 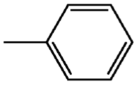 | 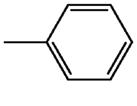 | =CH— |
| D6-181 | 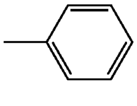 | H | 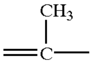 |
| D6-182 | 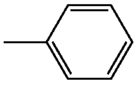 | H | 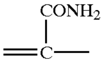 |
-continued
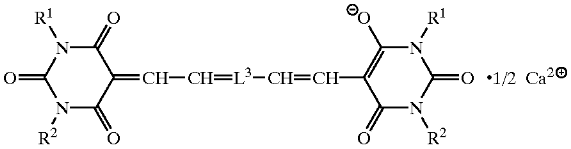
| Exemplified compound No. | $R^1$ | $R^2$ | $=L^3-$ |
|---|---|---|---|
| D6-183 | 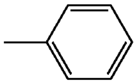 | H | 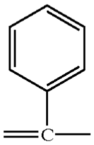 |
| D6-184 | 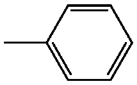 | H | 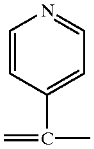 |
| D6-185 | 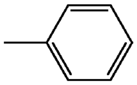 | H | 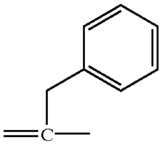 |
| D6-186 | 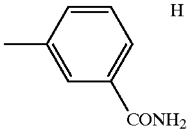 | H | =CH— |
| D6-187 | 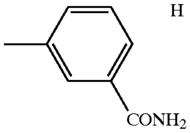 | H | 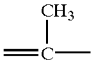 |
| D6-188 | 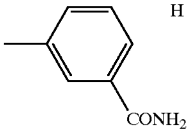 | H | 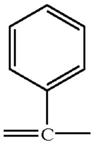 |
| D6-189 | 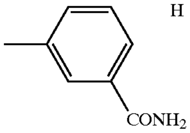 | H | 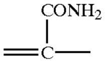 |

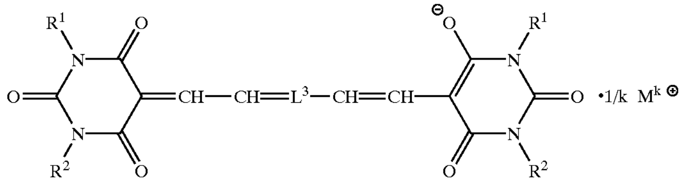
(n = 1)
| Exemplified compound No. | $R^1$ | $R^2$ | $=L^3-$ | k | $M^{k\oplus}$ |
|---|---|---|---|---|---|
| D6-190 |  | H | =CH— | 2 | $Ca^{2\oplus}$ |
| D6-191 | 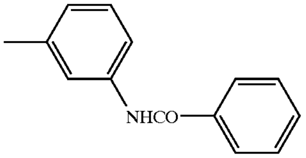 | H | =CH— | 2 | $Ca^{2\oplus}$ |
| D6-192 | 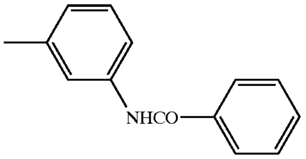 | H | 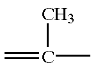 | 2 | $Ca^{2\oplus}$ |
| D6-193 | 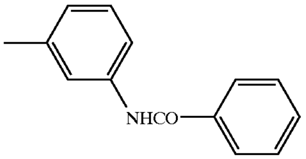 | H | 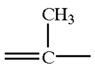 | 2 | 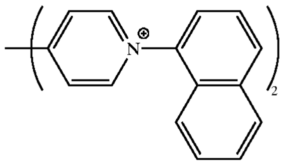 |
| D6-194 | 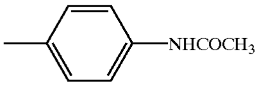 | H | 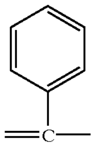 | 2 | $Zn^{2\oplus}$ |
| D6-195 | 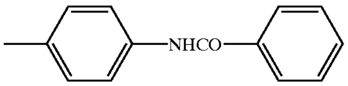 | H | 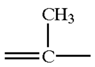 | 3 | $Al^{3\oplus}$ |
| D6-196 | 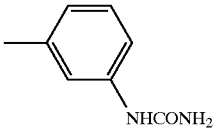 | H | =CH— | 2 | $Ca^{2\oplus}$ |
| D6-197 | 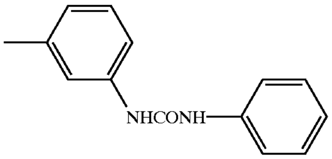 | H | =CH— | 2 | 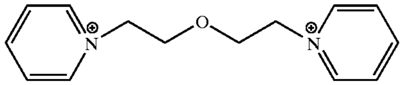 |

-continued
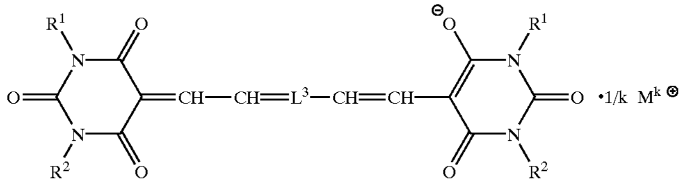
(n = 1)
| Exemplified compound No. | $R^1$ | $R^2$ | $=L^3-$ | k | $M^{k\oplus}$ |
|---|---|---|---|---|---|
| D6-198 | 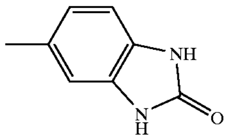 | H | $=CH-$ | 2 | $Ca^{2\oplus}$ |
-continued
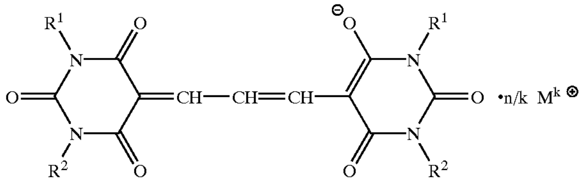
| Exemplified compound No. | $R^1$ | $R^2$ | n | k | $M^{k\oplus}$ |
|---|---|---|---|---|---|
| D6-199 | 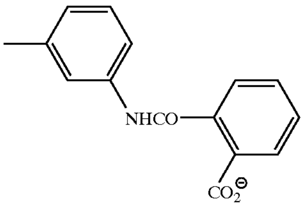 | H | 3 | 2 | $Ca^{2\oplus}$ |
-continued
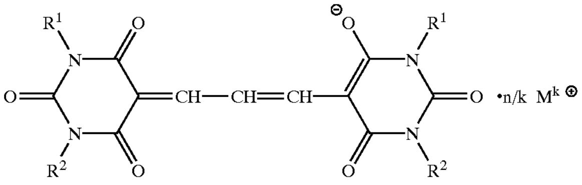
| Exemplified compound No. | $R^1$ | $R^2$ | n | k | $M^{k\oplus}$ |
|---|---|---|---|---|---|
| D6-200 | 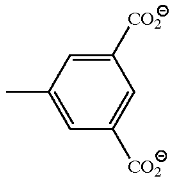 | H | 5 | 2 | $Mg^{2\oplus}$ |
| D6-201 | 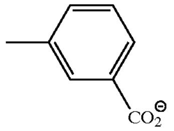 | H | 3 | 2 | $Ba^{2\oplus}$ |

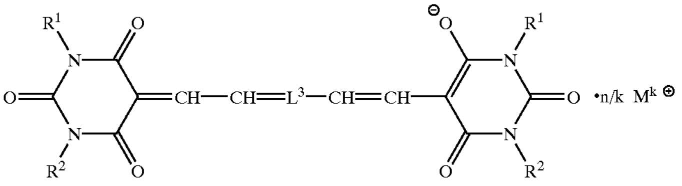
| Exemplified compound No. | $R^1$ | $R^2$ | $=L^3-$ | n | k | $M^{k\oplus}$ |
|---|---|---|---|---|---|---|
| D6-202 | 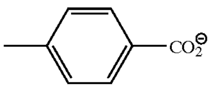 | H | 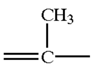 | 3 | 2 | $Ba^{2\oplus}$ |
| D6-203 | 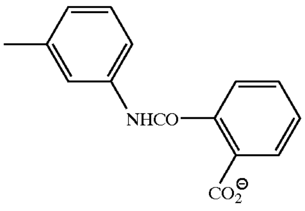 | H | 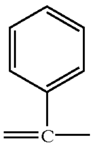 | 3 | 2 | $Ca^{2\oplus}$ |
| D6-204 | 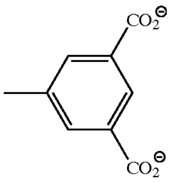 | H | 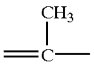 | 5 | 2 | $Mg^{2\oplus}$ |
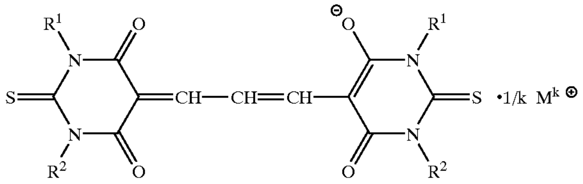
(n = 1)
| Exemplified compound No. | $R^1$ | $R^2$ | k | $M^{k\oplus}$ |
|---|---|---|---|---|
| D7-101 | 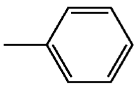 | H | 2 | $Mg^{2\oplus}$ |
| D7-102 | 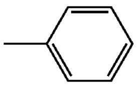 | H | 3 | $Al^{3\oplus}$ |
| D7-103 |  | H | 2 | $Ca^{2\oplus}$ |

-continued
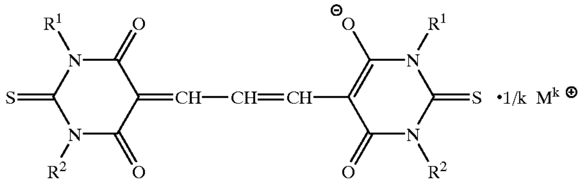
(n = 1)
| Exemplified compound No. | $R^1$ | $R^2$ | k | $M^{k\oplus}$ |
|---|---|---|---|---|
| D7-104 | 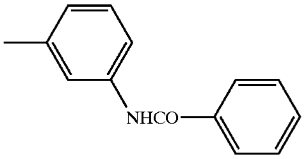 | H | 2 | $Ca^{2\oplus}$ |
| D7-105 | 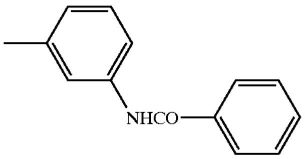 | H | 2 | $Zn^{2\oplus}$ |
| D7-106 | 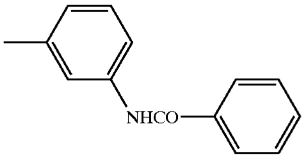 | H | 2 | 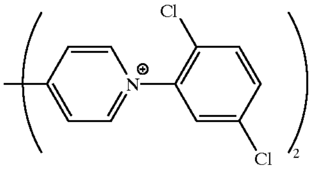 |
| D7-107 | 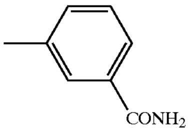 | H | 2 | $Ca^{2\oplus}$ |
| D7-108 | 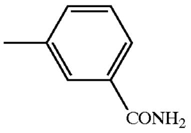 | H | 2 | $Mg^{2\oplus}$ |
| D7-109 | 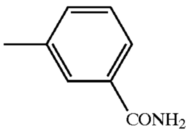 | H | 2 | 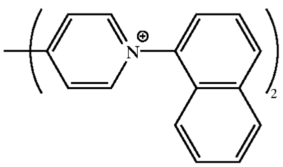 |
| D7-110 | 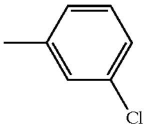 | H | 2 | $Ca^{2\oplus}$ |
| D7-111 | 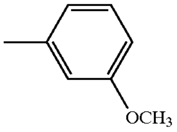 | H | 2 | $Ba^{2\oplus}$ |

-continued
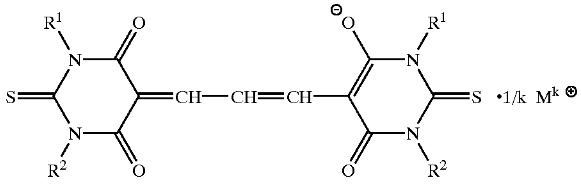
(n = 1)
| Exemplified compound No. | $R^1$ | $R^2$ | k | $M^{k\oplus}$ |
|---|---|---|---|---|
| D7-112 | 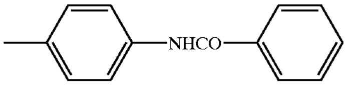 | H | 2 | $Ca^{2\oplus}$ |
| D7-113 | 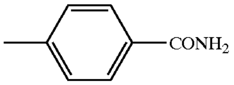 | H | 2 | $Ca^{2\oplus}$ |
| D7-114 | 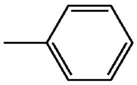 | 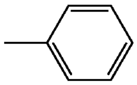 | 2 | 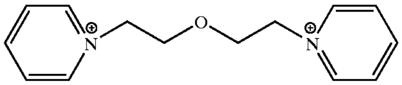 |
| D7-115 | 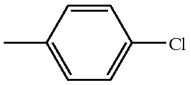 | H | 3 | $Al^{3\oplus}$ |
| D7-116 | $-CH_3$ | H | 2 | $Ca^{2\oplus}$ |
| D7-117 | $-CH_3$ | $-CH_3$ | 2 | $Sr^{2\oplus}$ |
| D7-118 | 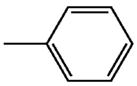 | $-CH_3$ | 2 | $Mg^{2\oplus}$ |
| D7-119 | 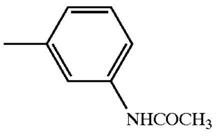 | 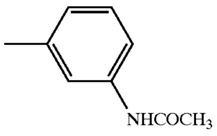 | 2 | $Ca^{2\oplus}$ |
| D7-120 | 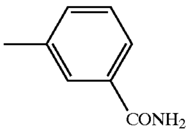 | 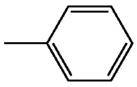 | 2 | 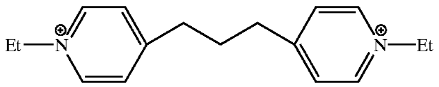 |

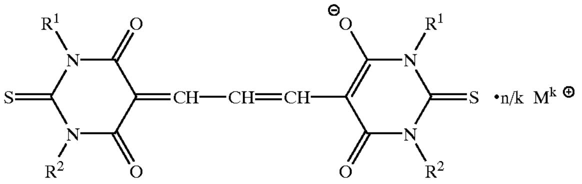
| Exemplified compound No. | $R^1$ | $R^2$ | n | k | $M^{k\oplus}$ |
|---|---|---|---|---|---|
| D7-121 | 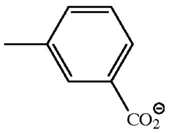 | H | 3 | 2 | $Ca^{2\oplus}$ |
| D7-122 | 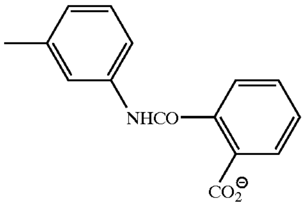 | H | 3 | 3 | $Al^{3\oplus}$ |
| D7-123 | 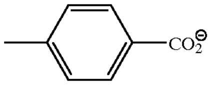 | H | 3 | 2 | $Ba^{2\oplus}$ |
(D8-101)
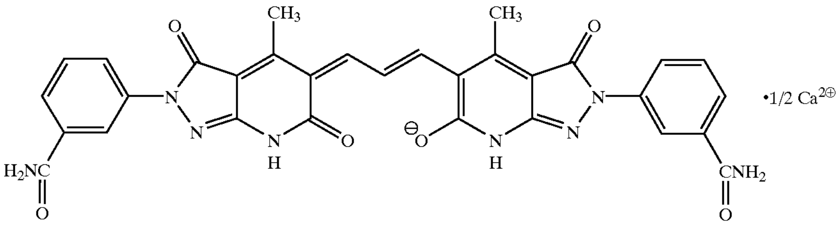
(D8-102)
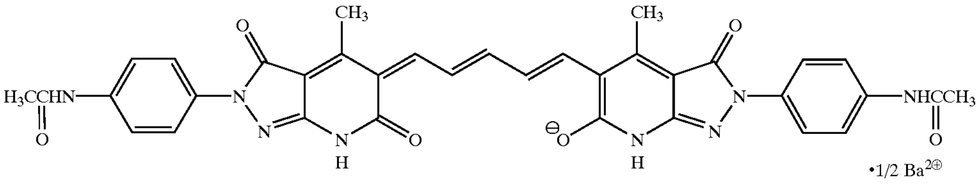
(D9-101)
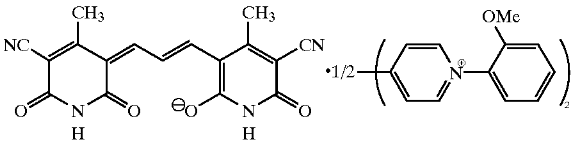
(D9-102)
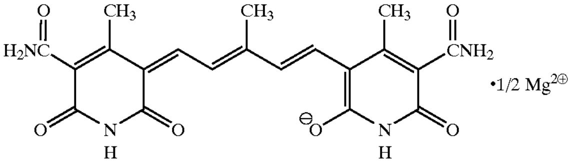

-continued
(D9-103)
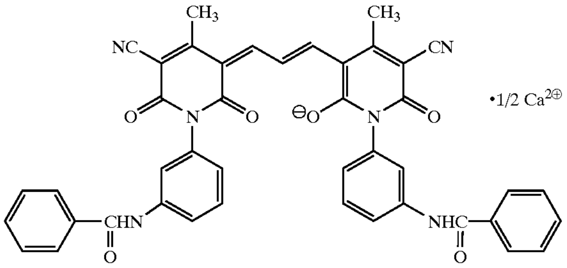
(D10-101)
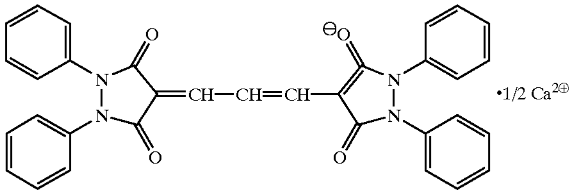
(D10-102)
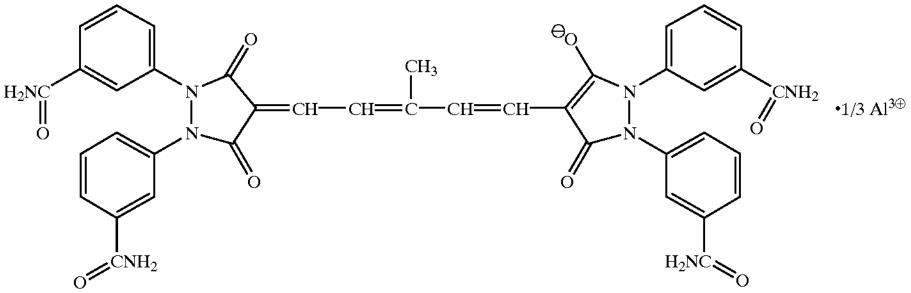
(D11-101)
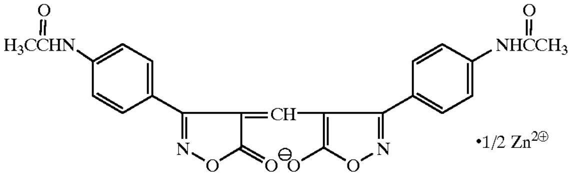
(D11-102)
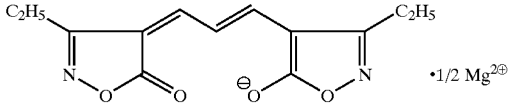
(D11-103)
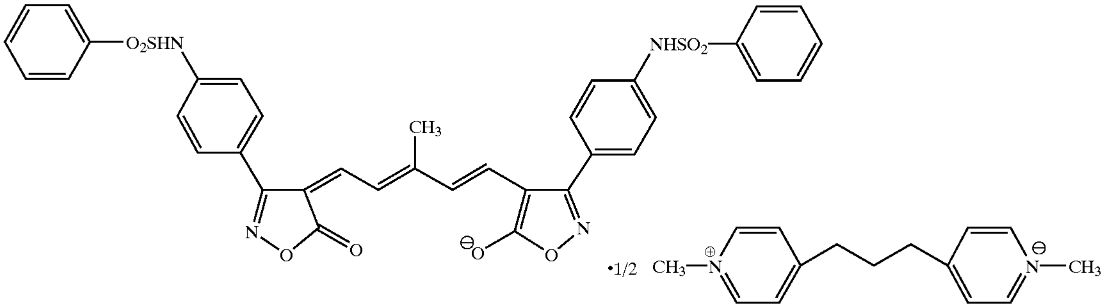
(D12-101)
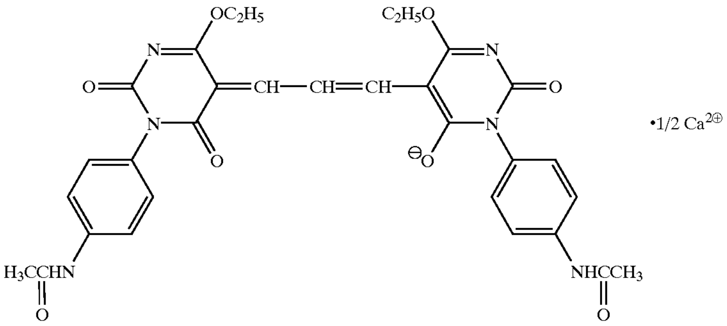

-continued
(D12-102)
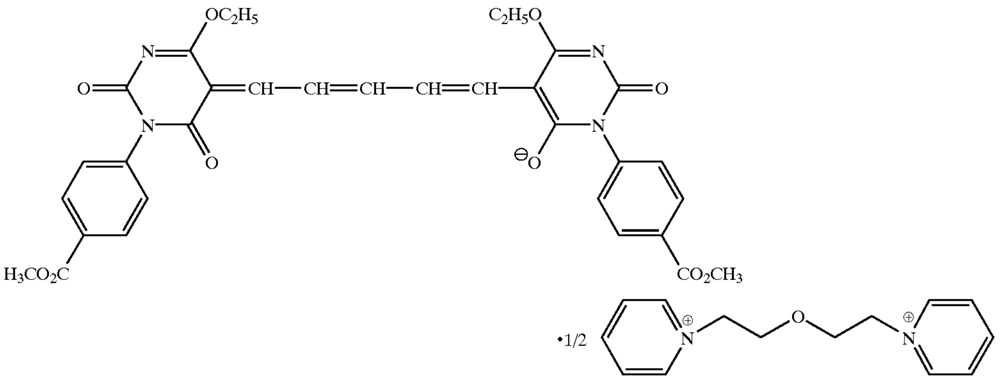
(D12-103)
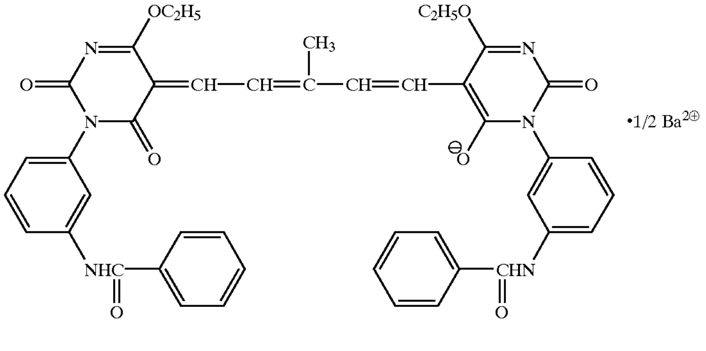
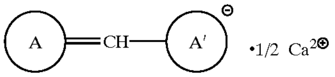
| Exemplified compound No. | 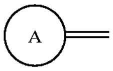 | 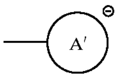 |
|---|---|---|
| D13-101 | 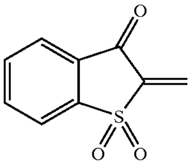 | 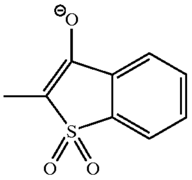 |
| D13-102 | 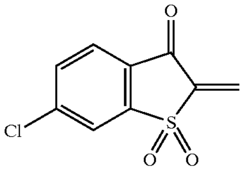 | 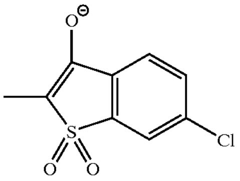 |
| D13-103 | 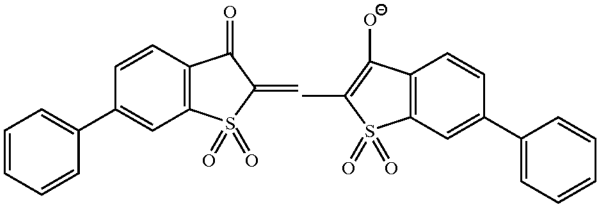 | |

-continued
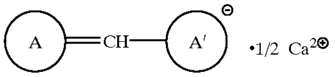
| Exemplified compound No. | 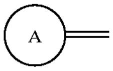 | 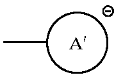 |
|---|---|---|
| D13-104 | 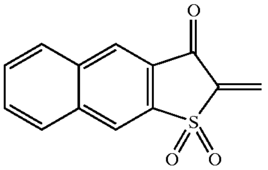 | 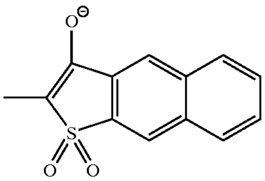 |
| D14-101 | 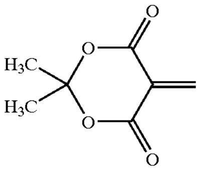 | 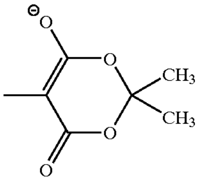 |
| D15-101 | 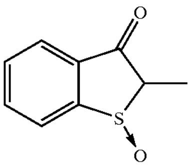 | 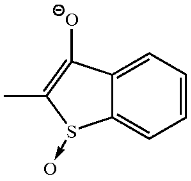 |
| D16-101 | 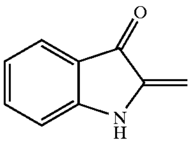 | 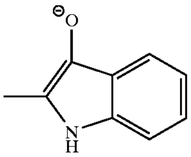 |
| D18-101 | 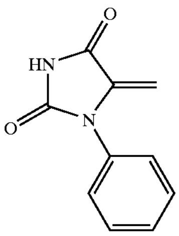 | 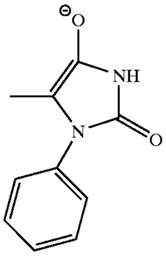 |
| D19-101 | 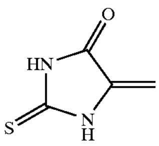 | 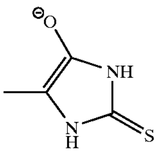 |
| D20-101 | 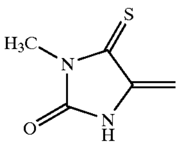 | 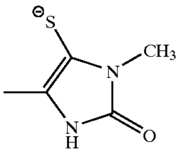 |

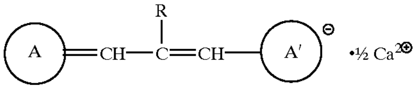
| Exemplified compound No. | 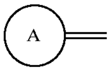 | 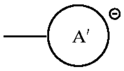 | R |
|---|---|---|---|
| D13-105 | 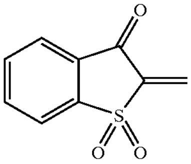 | 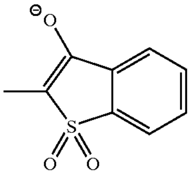 | —H |
| D13-106 | 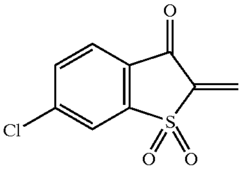 | 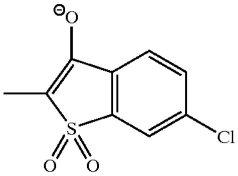 | —H |
| D13-107 | 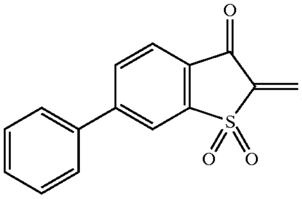 | 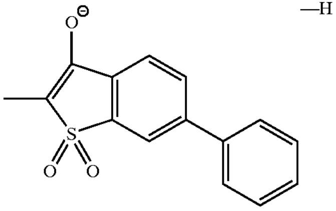 | —H |
| D13-108 | 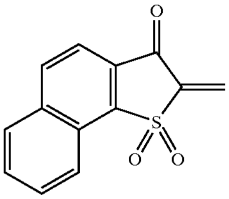 | 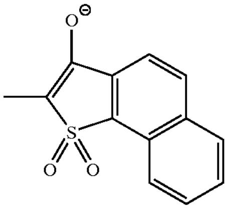 | —H |
| D14-102 | 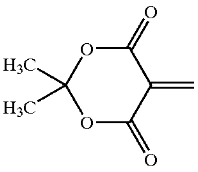 | 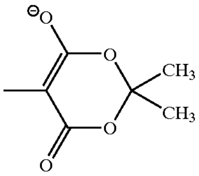 | —H |
| D15-102 | 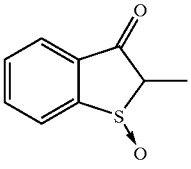 | 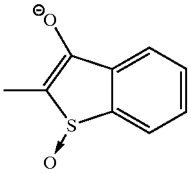 | $—CH_3$ |
| D16-102 | 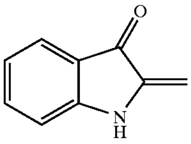 | 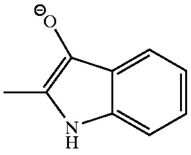 | 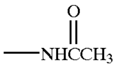 |

-continued
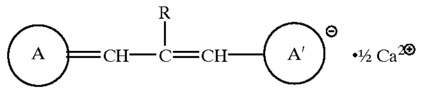
| Exemplified compound No. | 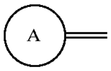 | 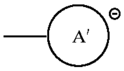 | R |
|---|---|---|---|
| D18-102 | 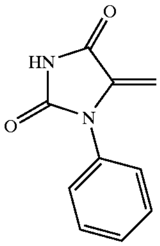 | 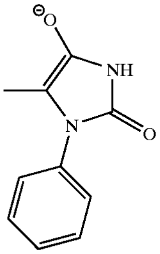 | 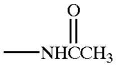 |
| D19-102 | 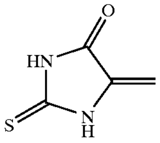 | 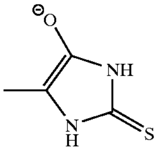 | —$CH_3$ |
| D20-102 | 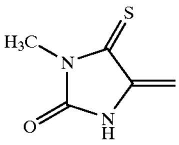 | 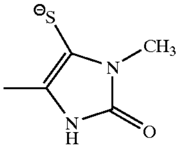 | —H |
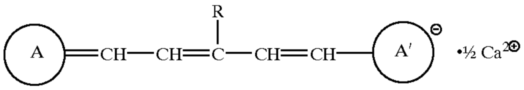
| Exemplified compound No. | 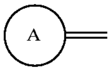 | 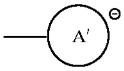 | R |
|---|---|---|---|
| D13-109 | 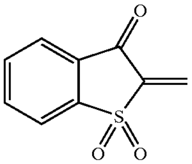 | 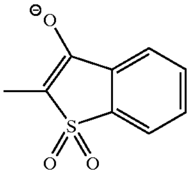 | —$CH_3$ |
| D13-110 | 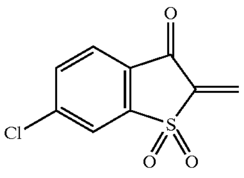 | 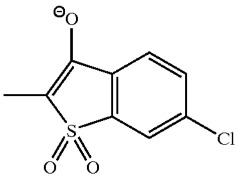 | —H |

-continued
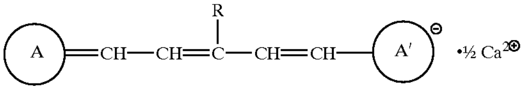
| Exemplified compound No. | 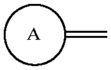 | 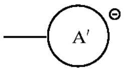 | R |
|---|---|---|---|
| D13-111 | 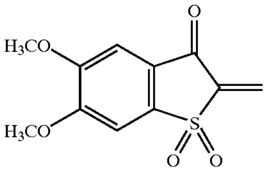 | 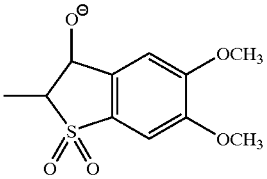 | —$CH_3$ |
| D13-112 | 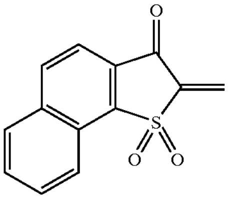 | 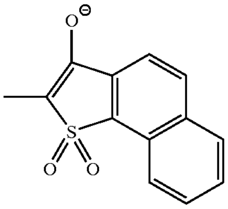 | —$CH_3$ |
| D14-103 | 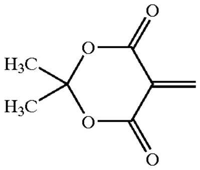 | 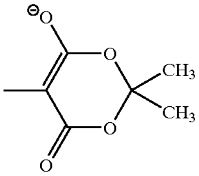 | —H |
| D15-103 | 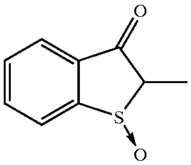 | 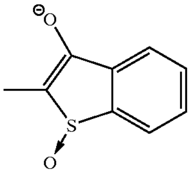 | —$CH_3$ |
| D16-103 | 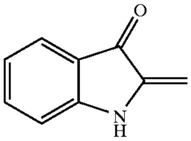 | 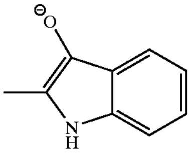 | 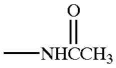 |
| D18-103 | 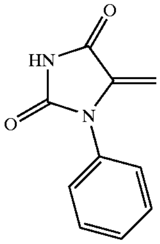 | 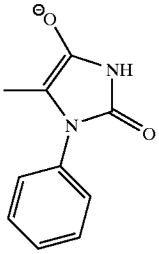 | —$CH_3$ |
| D19-103 | 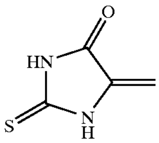 | 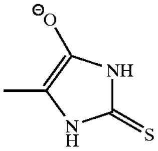 | —H |

-continued
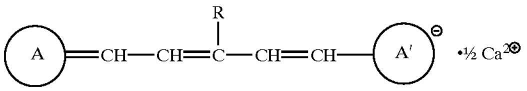
| Exemplified compound No. | 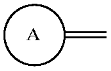 | 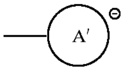 | R |
|---|---|---|---|
| D20-103 | 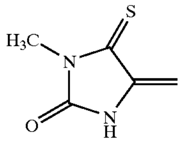 | 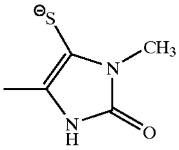 | —H |
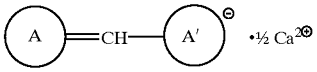
| Ex-emplified compound No. | 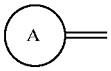 | 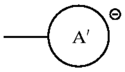 |
|---|---|---|
| D23-101 | 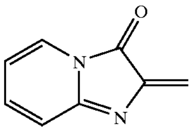 | 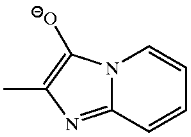 |
| D28-101 | 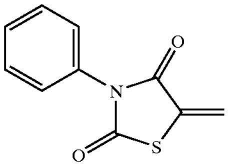 | 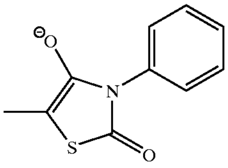 |
| D33-101 | 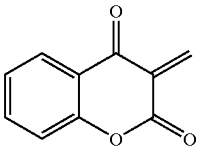 | 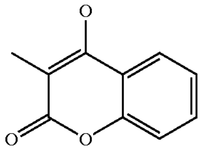 |
-continued
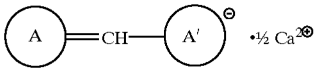
| Ex-emplified compound No. | 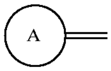 | 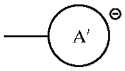 |
|---|---|---|
| D35-101 | 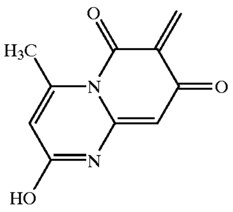 | 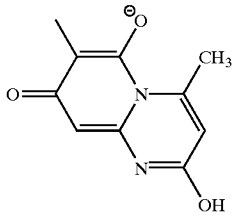 |
| D38-101 | 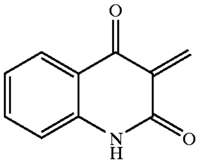 | 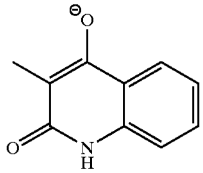 |
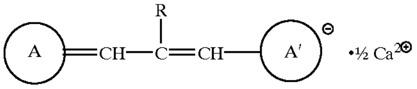
| Exemplified compound No. | 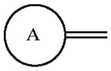 | 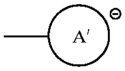 | —R |
|---|---|---|---|
| D23-102 | 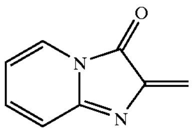 | 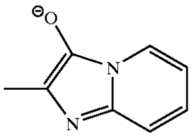 | —H |

-continued
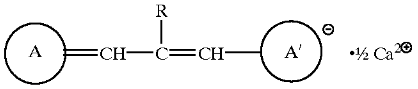
| Exemplified compound No. | 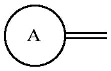 | 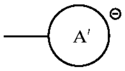 | —R |
| --- | --- | --- | --- |
| D28-102 | 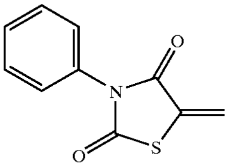 | 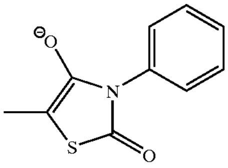 | $—CH_3$ |
| D33-102 | 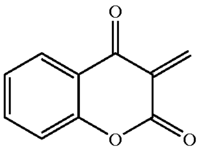 | 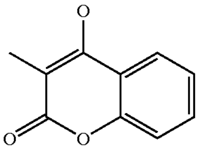 | —H |
| D35-102 | 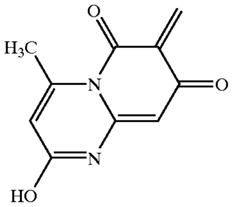 | 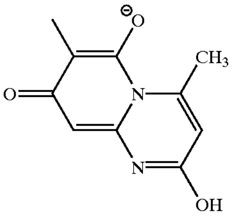 | —H |
| D38-102 | 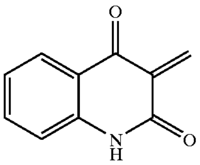 | 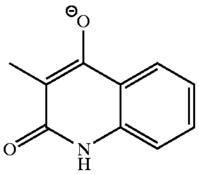 | —H |
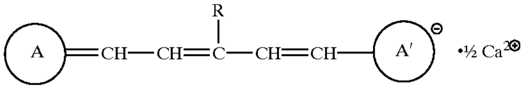
| Exemplified compound No. | 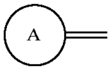 | 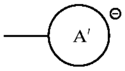 | —R |
| --- | --- | --- | --- |
| D23-103 | 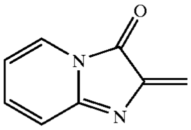 | 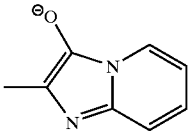 | —H |
| D28-103 | 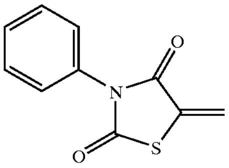 | 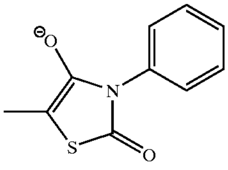 | $—CH_3$ |

-continued

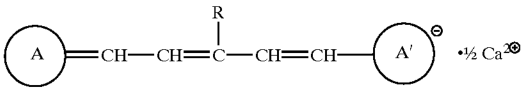

| Exemplified compound No. | 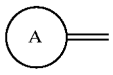 | 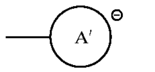 | —R |
|---|---|---|---|
| D33-103 | 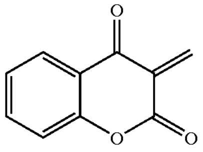 | 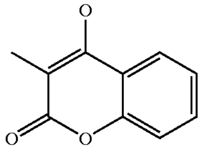 | $—CH_3$ |
| D35-103 | 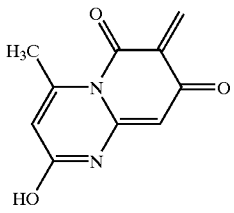 | 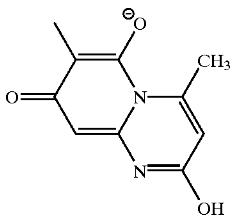 | —H |
| D38-103 | 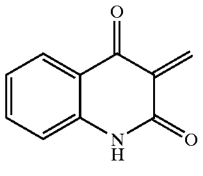 | 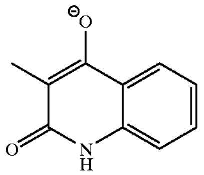 | 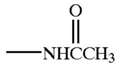 |

(D39-1)

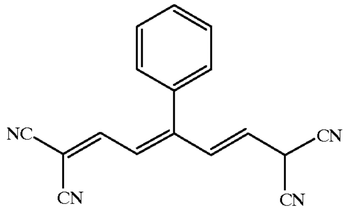

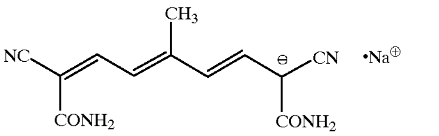

(D39-3)

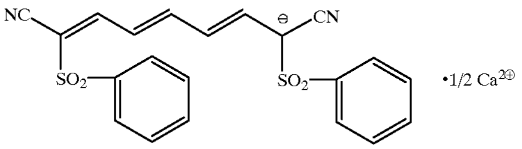

-continued (D39-4)

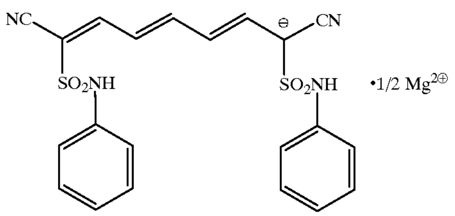

The synthetic method of the compound represented by the general formula (I) or (II).

(a) In Case of k=1

Generally, by a condensation reaction of the corresponding active methylene compounds ((thio)barbituric acid, pyrazolone, indanedione, isooxazolone and the like) with methine sources used for introducing a methine group or a polymethine group into methine colorants. Regarding details of synthesis of this kind of compounds, reference can be made to Japanese Patent Application Publication Nos. 39-22069, 43-3504, 52-38056, 54-38129, 55-10059, 58-35544, Japanese Patent Application Laid-Open Nos. 49-99620, 52-92716, 59-16834, 63-316853, 64-40827, GB-P No. 1133986, U.S. Pat. Nos. 3,247,127, 4,042,397, 4,181,225, 5,213,956, 5,260,179, and the like.

Specifically, for introduction of a monomethine group, ortho esters such as ethyl orthoformate, ethyl orthoacetate and the like, or N,N-diphenylformamidine hydrochloride and the like can be used, and for introduction of a trimethine group, trimethoxypropene, 1,1,3,3-tetramethoxypropane, malondialdehydedianil hydrochloride or derivatives thereof and the like can be used. Further, for introduction of a pentamethine group, glutaconaldehydedianyl hydrochloride, 1-(2,4-dinitrophenyl)-pyridinium chloride, 1-(2-benzothiazolyl)-pyridinium chloride or derivatives thereof, and the like can be used.

At this time, a compound in which a cation derived from the base used in the reaction and post-treatment is converted to $M^+$ is obtained. When an organic base such as pyridine and triethylamine is used, pyridinium ion and triethylammonium ion become $M^+$, and when an inorganic base such as sodium acetate, potassium acetate, and sodium carbonate is used, sodium ion and potassium ion become $M^+$.

The compound represented by the general formula (I) or (II) can be obtained by a salt exchange reaction between a desired cation and a colorant having a cation different from the desired cation in water and/or an organic solvent containing a salt of the desired cation. The preferable organic solvent includes methanol, ethanol, isopropanol, dimethylformamide, dimethylacetamide, dimethylsulfoxide and the like.

The salt exchange reaction includes the following embodiments.

① A reaction in which the powder of a colorant is added to an aqueous solution, an organic solution, or a mixture of water and an organic solvent, containing a salt of a desired cation.

② A reaction in which an aqueous solution, an organic solution, or a mixture of water and organic solvent, containing a colorant is added to an aqueous solution, an organic solution, or a mixture of water and an organic solvent, containing a salt of a desired cation.

③ A reaction in which the powder of a desired cation is added to an aqueous solution, an organic solution, or a mixture of water and an organic solvent, containing a colorant.

④ A reaction in which an aqueous solution, an organic solution, or a mixture or water and organic solvent, containing a salt of a desired cation is added to an aqueous solution, an organic solution, or mixture of water and an organic solvent, containing a salt of a colorant.

Further, the salt exchange reaction can also be conducted by mixing a solution containing a colorant and a solution containing a cation under a condition wherein both of a colorant and a salt of a cation are not completely dissolved in respective solution.

When a powder of a colorant is added, it is preferable that a colorant to be added is dissolved to a certain extent in a solvent containing a cation. When a colorant to be added has lower solubility in a solvent containing a cation, it is preferable that the colorant is added in the form of a solution.

Further, after separating a colorant in a form in which $M^+$ is a proton by carrying out acid treatment and the like after a reaction of making a colorant, $M^+$ can be introduced by the above-described method. Further, the salt of a desired cation may be added to the solution containing the colorant whose cation is different from the desired cation.

(b) In Case of $k \geqq 2$

It can be easily synthesized by a salt exchange reaction with the compound of k=1 obtained by the method described in (a) (hereinafter, referred to as "colorant(k=1)") in water and/or organic solvent (e.g., methanol, ethanol, isopropanol, dimethylformamide, dimethylacetamide, dimethylsulfoxide and the like) containing a salt of a metal cation ($M^{k+}$) having a valency of 2 or more. The salt exchange reaction includes the following embodiments.

① A reaction in which the powder of a colorant (k=1) is added to an aqueous solution, an organic solution, or a mixture of water and an organic solvent, containing a salt of a desired polyvalent cation.

② A reaction in which an aqueous solution, an organic solution, or a mixture of water and organic solvent, containing a colorant (k=1) is added to an aqueous solution, an organic solution, or a mixture of water and an organic solvent, containing a salt of a desired polyvalent cation.

③ A reaction in which the powder of a desired polyvalent cation is added to an aqueous solution, an organic solution, or a mixture of water and an organic solvent, containing a colorant (k=1).

④ A reaction in which an aqueous solution, an organic solution, or a mixture or water and organic solvent, containing a salt of a desired polyvalent cation is added to an aqueous solution, an organic solution, or mixture of water and an organic solvent, containing a salt of a colorant (k=1).

Further, the salt exchange reaction can also be conducted by mixing a solution containing a colorant(k=1) and a solution containing a polyvalent cation under a condition wherein both of a colorant(k=1) and a salt of a polyvalent cation are not completely dissolved in respective solution.

When a powder of a colorant(k=1) is added, it is preferable that a colorant(k=1) to be added is dissolved to a certain extent in a solvent containing a polyvalent cation. When a colorant to be added has lower solubility in a solvent containing a polyvalent cation, it is preferable that the colorant(k=1) is added in the form of a solution.

The synthetic method of the compound represented by the general formula (III) or (IV).

The compound represented by the feneral formula (III) or (IV) can be synthesized by the same method as the method illustrated in (b) of the synthetic method of the general formula (I) or (II), except that a salt of a polyvalent metal cation ($M^{k+}$) is used in place of a salt of a cation ($M^{k+}$).

The compound represented by the general formulae (I) to (IV) has good hue. Accordingly, the above-described compound can be used for image formation, a filter, an ink, a toner, a paint and the like, as a colorant.

In the compound represented by the general formula (I) or (II), the compound of $k \geqq 2$ and the compound represented by the general formula (III) or (IV) have a characteristic that solubility thereof in water is low.

Solid Fine Particle Dispersion

A solid fine particle dispersion of the present invention is obtained by dispersing either of the compound represented by the general formulae (I) and (II) (hereinafter, occasionally referred to as "the compound of the present invention") in a medium. Compounds of the present invention can be utilized as various colorants by being dispersed in an aqueous medium. When the compounds of the present invention are dispersed in an aqueous medium, it is preferable to disperse compounds of the present invention in the form of fine particles by using a dispersing machine (e.g., a ball mill, a sand mill, an attritor, a roll mill, an agitator mill, a Henschel mixer, a colloid mill, an ultrasonic homogenizer, a pearl mill, a jet mill, an angstrom mill). Further, a fine particle dispersion can also be produced by dissolving the compound of the present invention in a suitable organic solvent, and then, adding the resultant solution to an aqueous medium.

In the present invention, since the compound represented by the general formula (I) or (II) forms an aggregate, an image having λ max which is shifted by 20 nm or more with respect to that of the compound when its molecules are dispersed in the medium can be obtained. The aggregate is preferably a J-aggregate.

A method of contacting an aqueous medium with a solution in which a methine compound capable of forming a J-aggregate was dissolved, may be a method of adding one of the solution to another solution, or a method of simultaneously feeding both solutions and then mixing them by stirring. Addition speed and the strength of stirring can be suitably decided in accordance with the object. Further, the solvent dissolving a dye is preferably water-miscible.

The fore-mentioned solid fine particle dispersion can be used as various colorants, and can be utilized in a recording liquid to record images. Since the compound of the present invention is not dissolved in a medium and thus present in a solid state, light fastness of a formed image is improved. Particularly, it is preferably utilized in a recording liquid for inkjet recording.

Recording Liquid

Recording liquids of the present invention, particularly, recording liquids (inks) for ink jet will be described below.

Regarding a method of preparing an aqueous inkjet ink, details are described in JP-A Nos. 5-148436, 5-295312, 7-97541, 7-82515 and 7-118584, and the detailed descriptions can also be used for preparing an inkjet ink of the present invention.

When a solid fine particle dispersion of the present invention is an inkjet ink, an aqueous medium is preferable as the medium in which a compound of the present invention is dispersed. The above-mentioned aqueous medium is composed mainly of water, and if desired, a mixture prepared by adding a water-miscible organic solvent can be used. Examples of the water-miscible organic solvent include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, aceton). The above-mentioned water-miscible organic solvents may be used in combination of two or more.

It is preferably that a compound of the present invention is contained in an amount of 0.2 parts by weight to 10 parts by weight for 100 parts by weight of an inkjet ink of the present invention. In another preferred embodiment, the recording liquid can contain 0.2 parts by mass or more and 10 parts by mass or less of the solid fine particle dispersion. An inkjet ink of the present invention may also contain other colorants together with a compound of the present invention. When two or more colorants are used together, it is preferable that the total content of colorants is in the above-mentioned range.

An inkjet ink of the present invention preferably has a viscosity of 40 cp or less. Further, the surface tension thereof is preferably 20 dyn/cm to 100 dyn/cm. The viscosity and surface tension can be controlled by, for example, adding an additive such as a viscosity controlling agent, surface tension controlling agent, specific resistance controlling agent, film controlling agent, ultraviolet ray absorber, antioxidant, discoloration-preventing agent, antifungus agent, anticorrosive agent, dispersing agent or a surfactant.

An inkjet ink of the present invention can be used not only in a monochrome image formation but also in full color image formation. For forming full color images, magenta tone ink, cyan tone ink and yellow tone ink can be used, and for regulating tone, further a black tone ink may also be used. It is preferable that at least one of these inks of various tones is an inkjet recording ink of the present invention, since then full color images having excellent hue can be formed. Further, it is more preferable that all of these inks of various hues are inkjet inks of the present invention, since then full color images having excellent hue can be formed.

An inkjet ink of the present invention can form images on various image-receiving materials. Examples of the above-mentioned image-receiving material include: plain paper, coated paper, plastic films and the like. Use of coated paper as the image-receiving material is preferable since then image quality and image storage durability are improved.

As the above-mentioned image-receiving material, recording paper containing a polymer mordant is preferably used. Regarding the polymer mordant, descriptions are found in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, U.S. Pat. Nos. 2,484,430, 2,548,564, 3,148,061, 3,309,690, 4,115,124, 4,124,386, 4,193,800, 4,273,853, 4,282,305 and 4,450,224. Among them, use of image-receiving materials containing a polymer mordant described in JP-A No. 1-161236, pp. 212 to 215 is particularly preferable since then images of more excellent quality are obtained and the light resistance of images are improved.

Image-receiving materials containing an inorganic pigment can also be used. Examples of the inorganic pigment include a silica pigment, alumina pigment, titanium dioxide pigment, zinc oxide pigment, zirconium oxide pigment, mica-like iron oxide, white lead, lead oxide pigment, cobalt oxide pigment, strontium chromate, pigment containing molybdenum, smectite, magnesium oxide pigment, calcium oxide pigment, calcium carbonate pigment and mullite. Two or more inorganic pigments may also be used in combination.

It is preferable that the above-mentioned image-receiving material has a hydrophilic layer containing a hydrophilic binder as an ink-accepting layer. As the above-mentioned hydrophilic binder, polymers having high water absorption are preferably used. Examples thereof include gelatin, gelatin derivatives, polyvinyl alcohol, polyvinyl alcohol derivatives, polyalkylene oxide and polyalkylene oxide derivatives. Further, hydrophilic polymers described in JP-A No. 1-161236, pp. 215 to 222 can be used. It is preferable to add a hardener to the above-mentioned ink-accepting layer and to cure the layer. As the hardener, materials described in JP-A No. 1-161236, p. 222 can be used.

It is preferable that the above-mentioned image-receiving material contains a mat agent. As the mat agent, materials described in JP-A No. 1-161236, pp. 263 to 264 can be used. Further, a surfactant may also be added to constituent layers of an image-receiving material. A surfactant functions as an coating aid, peeling property-improving agent, slipping property-improving agent or antistatic agent. As the surfactant, those described in JP-A Nos. 62-173463, 62-183457 can be used. Further, an organic fluoro compound may also be used instead of a surfactant. The organic fluoro compound is preferably hydrophobic. Examples of the organic fluoro compound include surfactants containing fluorine, oily compounds containing fluorine (e.g., fluorine oil) and solid fluorine compound resins (e.g., ethylene tetrafluoride resin). Regarding the organic fluoro compound, descriptions are found in JP-B No. 57-9053 (columns 8 to 17), JP-A Nos. 61-20994 and 62-135826.

Polymer latex may also be added to constituent layers, including a back layer, of an image-receiving material. Polymer latex is used for the purpose of improving film properties such as dimension stability, curl prevention, adhesion prevention and film-cracking prevention. Regarding polymer latex, descriptions are found in JP-A Nos. 62-245258, 62-1316648 and 62-110066. If polymer latex having low glass transition temperatures (of 40° C. or less) is added to a layer containing a mordant, cracking and curling of the layer can be prevented. Further, polymer latex having high glass transition temperatures can also be added to a back layer so as to prevent curl. A discoloration-preventing agent may also be added to constituent layers of an image-receiving material. The discoloration-preventing agent contains an antioxidant, ultraviolet absorber and a metal complex. As the discoloration-preventing agent, materials described in JP-A No. 1-161236, pp. 225 to 247 can be used. A fluorescent whitening agent may also be added to the image-receiving material. Further, a fluorescent whitening agent can also be added to an inkjet recording ink and fed to an image-receiving material from outside.

When the above-mentioned image-receiving material contains a support and an ink-accepting layer, paper whose both surfaces are laminated with a polyolefin (e.g., polyethylene, polystyrene, polyethylene terephthalate, polybutene and copolymers thereof) and plastic films are particularly preferably used as the support. It is preferable to add a white pigment (e.g., titanium oxide, zinc oxide) or coloring dye (e.g., cobalt blue, ultramarine, neodymium oxide) to a polyolefin.

An inkjet ink of the present invention can be used as an ink in various inkjet recording methods. Any of a continuous method and an on demand method are permissible. A method for feeding energy to an ink is not particularly restricted, and any of a bubble jet method, thermal jet method and method using ultrasonic waves are permissible.

The inkjet recording method includes a method in which an ink having low concentration called a photo ink is injected in the form of a large number of drops having low volume, a method in which image quality is improved by using a plurality of inks having substantially the same hue in different concentrations, and a method using a colorless transparent ink. The present invention is particularly effective in an inkjet recording method having high printing speed in which an ink having low concentration is injected in large amounts to form images which are similar to a photograph.

EXAMPLES

Synthesis examples of compounds of the general formula (I) are shown below. However, a method for synthesizing a compound of the present invention is not restricted to the following examples.

Example 1

Synthesis Example of Compound of the Present Invention

Synthesis Example 1 of Exemplary Compound (D6-53)

To 1.5 $dm^3$ of methanol was added 97.0 g of the following compound (D6-A), and to this was further added 125 $cm^3$ of triethylamine. 32.3 g of malondialdehydedianil hydrochloride was added and 36.8 g of acetic anhydride was added dropwise to this solution while stirring it at room temperature. Stirring of the solution was continued for 1 hour at room temperature without carrying out any other treatment. The deposited solid was filtrated under suction, washed with methanol, then, dried to obtain 83.0 g (yield: 85%) of the following compound (D6-53). The obtained compound had a $\lambda_{max}$ (dimethylformamide (DMF)) of 492.6 nm and an $\epsilon_{max}$ (DMF) of $1.45 \times 10^5$.

Compound (D6-53)

(D6-53)

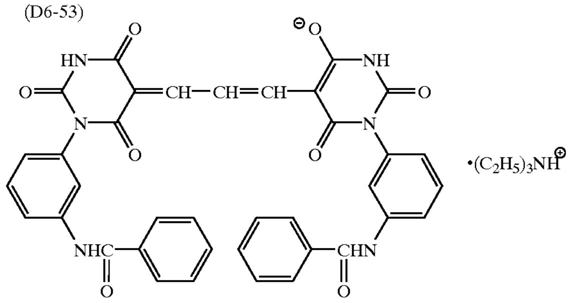

Compound (D6-A)

(D6-A)

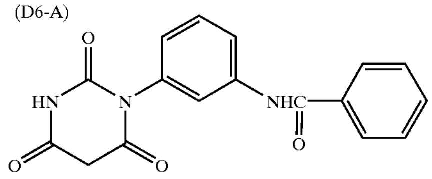

Synthesis of Exemplary Compound (D6-49)

110 g of the compound (D6-53) obtained above was pulverized, and added to a solution prepared by dissolving 81.8 g of sodium chloride in 1.4 $dm^3$ of water, and the solution was stirred while being heated for 1 hour on a vapor bath. The solution was cooled to room temperature and the obtained crystals were filtrated, washed with water, then, dried by an air blasting drier to obtain 97 g of the compound (D6-49).

Synthesis Example 1 of Exemplary Compound (D6-148)

7.84 g of the obtained compound (D6-53) was ground and added to a solution prepared by dissolving 5.0 g of calcium chloride in 500 ml of water, and the solution was stirred while being heated for 1 hour in a vapor bath. The solution was cooled to room temperature and the obtained crystals were filtrated, washed with water, then, dried by an air blasting drier to obtain 7.0 g of a compound (D6-48).

Element analysis showed that the molar ratio of colorant parts to calcium of the obtained compound was 2:1 and it contained 4 molecules of water. The obtained compound had a $\lambda_{max}$ (DMF)) of 492.5 nm and an $\epsilon_{max}$ (DMF) of $1.50 \times 10^5$ (value obtained by conversion in view of water content).

Synthesis Example 2 of Exemplary Compound (D6-148)

A solution prepared by dissolving 17.0 g of the obtained exemplary compound (D6-53) in 120 $cm^3$ of DMF, was added dropwise to a solution obtained by dissolving 19.4 g of calcium acetate monohydrate in 1.1 $dm^3$ of water and stirring while heating at 80° C. in a vapor bath. After the dropwise addition, the solution was further stirred while being heated for 45 minutes, and then cooled to room temperature. The crystals were filtrated, washed with water, then, dried by an air blasting drier to obtain 14.0 g of a compound (D6-148). Element analysis showed that the molar ratio of colorant parts to calcium of the obtained compound was 2:1 and it contained 3 molecules of water. The obtained compound had a $\lambda_{max}$ (DMF)) of 492.6 nm and an $\epsilon_{max}$ (DMF) of $1.51 \times 10^5$ (value obtained by conversion in view of water content).

The barbituric acid derivative (D6-A) used therein can be synthesized according to a general method of synthesizing barbituric acids such as by reacting a urea derivative with malonic acid in the presence of acetic anhydride, or with a malonate under basic condition. With respect to details of the synthesis method of these compounds, references can be made to "Shin Jikken Kagaku Koza" (14) (Maruzen), J. Am. Chem. Soc., 78, 6185 (1956), and the like.

Synthesis Example of Exemplary Compound (D6-149)

5.0 g of the exemplary compound (D6-53) which was obtained was ground, and added to a solution prepared by dissolving 3.85 g of magnesium sulfate in 350 $cm^3$ of water, and the solution was stirred while being heated for 30 minutes in a vapor bath. The solution was cooled to room temperature and the obtained crystals were filtrated, washed with water, then, dried by an air blasting drier to obtain 4.3 g of an exemplary compound (D6-149). Element analysis showed that the molar ratio of colorant parts to magnesium of the obtained compound was 2:1 and it contained 6 molecules of water. The obtained compound had a $\lambda_{max}$ (DMF)) of 492.6 nm and an $\epsilon_{max}$ (DMF) of $1.52 \times 10^5$ (value obtained by conversion in view of water content).

Synthesis Example of Exemplary Compound (D6-153)

5.0 g of the obtained exemplary compound (D6-A) was ground, and added to a solution prepared by dissolving 7.73 g of aluminum chloride hexahydrate in 350 $cm^3$ of water, and the solution was stirred while being heated for 30 minutes in a vapor bath. The solution was cooled to room temperature and the resultant crystals were filtrated, washed with water, then, dried by an air blasting drier to obtain 4.7 g of an exemplary compound (D6-153). Element analysis showed that the molar ratio of colorant parts to aluminum of the obtained compound was 3:1 and it contained 8 molecules of water. The obtained compound had a $\lambda_{max}$ (DMF)) of 492.5 nm and an $\epsilon_{max}$ (DMF) of $1.48 \times 10^5$ (value obtained by conversion in view of water content).

Example 2

Evaluation of Solubility of Compounds of the Present Invention in Water

Exemplary compounds of the present invention shown in the following Table 1 (about 100 mg of each) were ground on an agate mortar. 50 mg of each was charged in test tubes to which 10 $cm^3$ of distilled water were added. The test tubes were then shaken well, and capped. They were irradiated with ultrasonic waves for 3 hours at 25° C., and allowed to stand still overnight. After sufficient shaking, insoluble components were filtrated through a 0.45 μm micro filter, and DMF in a volume four times that of the filtrate was added. If necessary, they were diluted with a mixed solution of DMF and distilled water in a 4:1 ratio (by volume). The absorption spectra thereof were measured, and solubility was calculated from the absorbance. The results are shown in Table 1. From these results, it was proven that the compounds of the examples with a metal cation having a valency of 2 or more as a counter cation have solubility in water decreased.

TABLE 1

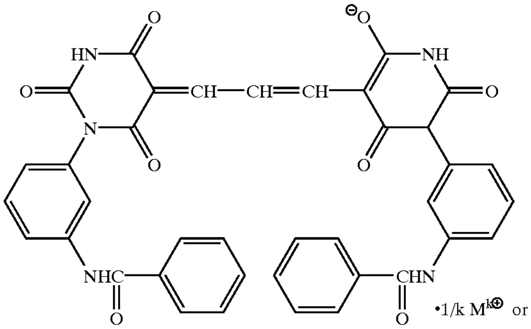

$\cdot 1/k\ M^{k\oplus}$ or $M^{1\oplus}$

| Exemplified compound No. | 1/k $M^{k+}$ or $M^{1+}$ | Solubility in water ($mol/dm^3$) | Remarks |
|---|---|---|---|
| D6-148 | 1/2 $Ca^{2+}$ | $2.5 \times 10^{-6}$ | Compound of the general formula (III) |
| D6-149 | 1/2 $Mg^{2+}$ | $1.3 \times 10^{-6}$ | Compound of the general formula (III) |
| D6-153 | 1/3 $Al^{3+}$ | $5.3 \times 10^{-7}$ | Compound of the general formula (III) |
| D6-53 | $(C_2H_5)_3NH^+$ | $3.6 \times 10^{-4}$ | Compound of the general formula (I) |
| D6-50 | $K^+$ | $1.7 \times 10^{-4}$ | Compound of the general formula (I) |

Example 3

Production and Evaluation of Inkjet Ink

Preparation of Solid Fine Particle Dispersion of Exemplary Compound (D6-148)

2 g of an exemplary compound (D6-148), 0.5 g of sodium p-tert-octylphenylpolyoxyethylenesulfonate and 70 g of water were combined to give a slurry. Then, 450 g of 0.5 mm zirconia silicate beads was prepared, and placed in a vessel together with the slurry, and dispersed for 5 hours by a dispersing machine (sand grinder mill: manufactured by Eyemex) to obtain a solid fine particle dispersion of the exemplary compound (D6-148). The obtained solid fine particles contained 80% by weight of particles having a particle size of 0.17 μm to 0.54 μm.

Solid fine particle dispersions of the exemplary compounds (D6-49) and (D6-58) and a comparative compound (C. I. Pigment Red 122) were respectively prepared in the same manner as for the solid fine particle dispersion of the exemplary compound (D6-148) except that the equal amounts of the exemplary compounds (D6-49) and (D6-58) and a comparative compound (C. I. Pigment Red 122) were used instead of the exemplary compound (D6-148). The diameters of the obtained solid fine particles containing 80% by weight of the respective solid fine particle dispersions of the exemplary compounds (D6-49), (D6-58) and a comparative compound (C. I. Pigment Red 122) were respectively 0.11 μm or more to 0.51 μm or less, 0.14 μm or more to 0.55 μm or less, and 0.11 μm or more to 0.50 μm or less.

Preparation of Ink Liquids 1 to 4

0.8 g of each of the solid fine particle dispersions of the obtained exemplary compounds (D6-148), (D6-49) and (D6-58), and the comparative compound (C. I. Pigment Red 122) were added to 2.3 $cm^3$ of water so as to give ink liquids 1 to 4.

Preparation of Dispersion Solution of Exemplary Compound D6-49

A solution in which 1 g of the exemplary compound D6-49 was dissolved in 10 g of dimethylformamide was added dropwise for 5 minutes to 50 g of water stirred, and the dispersion solution of the fine J-aggregate particles of the exemplary compound D6-49 was obtained.

Solid fine particle dispersions containing J-aggregates of the exemplary compounds (D6-53), (D6-148) and (D6-60) were respectively prepared in the same manner as for the solid fine particle dispersion of the exemplary compound (D6-49) except that the equal amounts of the exemplary compounds (D6-53), (D6-148) and (D6-60) were used instead of the exemplary compound (D6-49).

Preparation of Ink Liquids 5 to 8

0.8 g of each of the solid fine particle dispersions containing J-aggregates of the obtained exemplary compounds (D6-49), (D6-53), (D6-148) and (D6-60) were added to 2.3 $cm^3$ of water so as to give ink liquids 5 to 8.

Preparation of Ink Liquid 9

A composition of the following formulation was stirred for 1 hour while being heated at 30 to 40° C., then, filtrated under pressure using a micro filter having an average pore diameter of 0.8 μm and a diameter of 47 mm, to give an ink liquid 9.

| | |
|---|---|
| Colorant (colorant A for comparison) | 4 parts by weight |
| Diethylene glycol | 9 parts by weight |
| Tetraethylene glycol monobutyl ether | 9 parts by weight |
| Glycerin | 7 parts by weight |
| Diethanolamine | 1 part by weight |
| Water | 70 parts by weight |

Colorant A for comparison

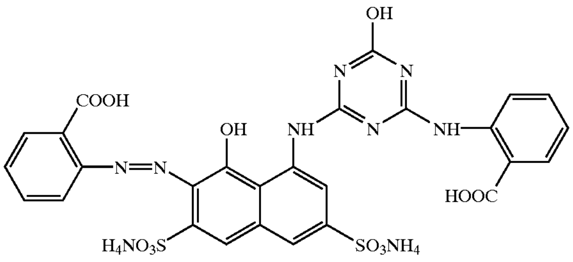

A colorant A for comparison corresponds to a compound having a colorant No. 1 described in JP-A No. 11-209673.

Image Recording and Evaluation

Images were respectively recorded on a photo glossy paper (Photo glossy paper EX, ink jet paper manufactured by Fuji Photo Film Co., Ltd.) by an ink jet printer ("PM-770C", manufactured by Seiko Epson Co., Ltd.) using the obtained ink liquids 1 to 9. Hue, light fastness, humidity and heat fastness and ozone gas resistance of the obtained images were evaluated.

Hue was relatively evaluated by visual observation.

Regarding light fastness, an image-receiving material on which images were recorded was irradiated with xenon light (85000 lux) for 7 days using a weather meter (Atlas C. 165), the image densities before and after xenon irradiation were measured by using a reflection densitometer (X-Rite310TR), and the light fastness was evaluated in terms of the percentage of colorant remaining.

Further, regarding humidity and heat fastness, image densities before and after storage at a temperature of 80° C. and a humidity of 70% for 7 days were measured in the same manner, and evaluated in terms of the percentage of colorant remaining.

Reflection density was measured at three points which were 1, 1.5 and 2.0, and the case in which the percentage of colorant remaining were 90% or more at any of the three densities was evaluated as A, the case in which the percentage of colorant remaining was less than 90% at one or two points was evaluated as B, and the case in which the percentage of colorant remaining was less than 90% at all densities was evaluated as C.

Regarding ozone gas resistance, the photo glossy papers on which the above-described images were formed were stood alone for 7 days in a box having an ozone gas concentration of 0.5±0.1 ppm in which were set at room temperature and in a dark room, and image densities before and after storage under ozone gas atmosphere were measured by using a reflection densitometer (X-Rite310TR), and evaluated in terms of the percentage of colorant remaining. The fore-mentioned reflection density was measured at three points which were 1, 1.5 and 2.0. The ozone gas concentration in the box was measured using an ozone gas monitor manufactured by APPLICS (Model OZG-EM-01). The case in which the percentage of colorant remaining were 70% or more at any of the densities was evaluated as A, the case in which the percentage of colorant remaining was less than 70% at one or two points was evaluated as B, and the case in which the percentage of colorant remaining was less than 70% at all densities was evaluated as C. It was evaluated at three stages.

The evaluation results above are shown in Table 2. In Table 2, "○" in the hue column means that hue was favorable as magenta, and "×" means that hue was not favorable as magenta because the hue described in Table is obtained.

TABLE 2

| Ink | Colorant | Hue | Light fastness | Humidity and heat fastness | ozone resistance |
|---|---|---|---|---|---|
| 1 | D6-148 | ○ | A | A | A |
| 2 | D6-49 | ○ | A | A | A |
| 3 | D6-58 | ○ | A | A | A |
| 4 | Colorant for comparison (C.I. Pigment red 122) | X (dull magenta) | A | A | A |

TABLE 2-continued

| Ink | Colorant | Hue | Light fastness | Humidity and heat fastness | ozone resistance |
|---|---|---|---|---|---|
| 5 | D6-49 | ○ | A | A | A |
| 6 | D6-53 | ○ | A | A | A |
| 7 | D6-148 | ○ | A | A | A |
| 8 | D6-60 | ○ | A | A | A |
| 9 | Colorant A for comparison | ○ | B | C | C |

From these results, it has become apparent that image formed by inks of the examples had excellent hue and had excellent stability with respect to light and, humidity and heat.

The λ max of absorption spectrum of the colorant contained in the ink liquid in dimethylformamide (DMF) and the λ max of reflection spectrum of the above-described image portion formed by the respective ink liquids are shown in Table 3.

TABLE 3

| Ink | Colorant | λ max in DMF (nm) | λ max in image portion (nm) |
|---|---|---|---|
| 1 | D6-148 | 493 | 542 |
| 2 | D6-49 | 493 | 546 |
| 3 | D6-58 | 493 | 558 |
| 5 | D6-49 | 493 | 540 |
| 6 | D6-53 | 493 | 550 |
| 7 | D6-148 | 493 | 543 |
| 8 | D6-60 | 493 | 542 |
| 9 | Colorant A for comparison | 551 | 559 |

Namely, λ max of the compounds of the present invention contained in the ink liquids 1 to 3 and 5 to 8 on the image-receiving material (photo glossy paper), shifts by 47 to 65 nm to a longer wave than that of the molecules of the compound dispersed in DMF. Accordingly, it was confirmed that those colorants form the J-aggregate on the image-receiving material. On the other hand, regarding colorant A for comparison contained in the ink liquid 5, the difference between λ max in DMF and λ max of reflection spectrum of the image portion was 8 nm (551 nm in DMF, and 559 nm on the image-receiving material), and the colorant A for comparison did not form the aggregate.

What is claimed is:

1. A recording liquid for ink jet containing a solid fine particle dispersion obtained by dispersing in a medium a compound represented by the general formula (I) or (II):

General formula (I)

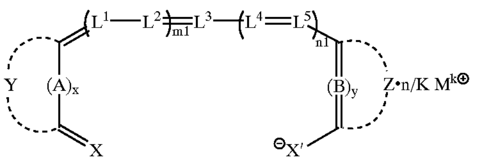

wherein each of A and B represents an atomic group required to complete a conjugated double bond chain, and each of Y and Z represents an atomic group required to form a carbocyclic ring or heterocyclic ring; each of $L^1$, $L^2$, $L^3$, $L^4$ and $L^5$ represents a methine group which may be substituted, and each of X and X' represents an oxygen atom, a sulfur atom or —$C(CN)_2$; each of m1 and n1 represents 0, 1 or 2, and each of x and y represents 0 or 1; $M^{k+}$ represents a k-valent cation, k represents an integer of 1 or more, and n represents a figure required to equalize the positive charge number with the negative charge number in the general formula (I);

General formula (II)

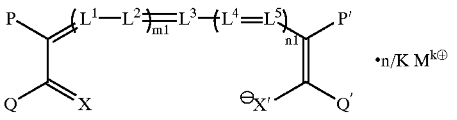

wherein each of $L^1$, $L^2$, $L^3$, $L^4$ and $L^5$ represents a methine group which may be substituted, each of P, P', Q, and Q' represents a substituted group, and each of X and X' represents an oxygen atom, a sulfur atom or —$C(CN)_2$; each of m1 and n1 represents 0, 1 or 2; $M^{k+}$ represents a k-valent cation, k represents an integer of 1 or more, and n represents a figure required to equalize the positive charge number with the negative charge number in the general formula (II).

2. A recording liquid for ink jet according to claim 1, wherein a compound represented by the general formula (I) or (II) is dispersed in a medium as a solid fine particle dispersion and forms an aggregate, therefore an image having λ max shifted by 20 nm or more against λ max of molecular dispersion condition in a solution can be formed.

3. A recording liquid for ink jet according to claim 2 in which the aggregate is a J-aggregate.

4. A recording liquid for ink jet according to claim 3 containing the J-aggregate which was precipitated by contacting a solution dissolving the compound represented by the general formula (I) or (II) with an aqueous medium.

5. A recording liquid for ink jet according to claim 1, wherein the solid fine particle dispersion is dispersed in an aqueous medium.

6. A recording liquid for ink jet according to claim 1, containing 0.2 parts by mass or more and 10 parts mass or less of the solid fine particle dispersion.

7. A recording liquid for ink jet according to claim 1 wherein $M^{k+}$ of a compound represented by the general formula (I) or (II) is selected from the group consisting of a metal ion of the Group I, the Group II, and the Group XII to the Group XV, a transition metal ion of the Group III to the Group XI, and an organic cation.

8. A recording liquid for ink jet according to claim 1 wherein substituted groups represented by Y and Z of the general formula (I), and substituted groups represented by P, P', Q and Q' of the general formula (II) are selected from the group consisting of substituted groups of carbocyclic rings (I-1 to I-4) having a resonance structure shown below and substituted groups of heterocyclic rings (I-5 to I-41), wherein each of $R^1$, $R^2$, $R^3$, $R^4$, $R^5$ and $R^6$ represents a hydrogen atom or a substituent;
I-1
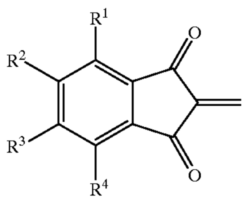
I-2
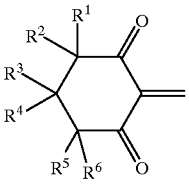
I-3
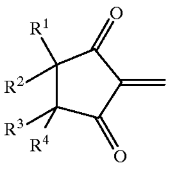
I-4
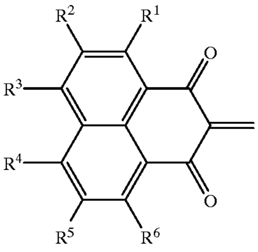
I-5
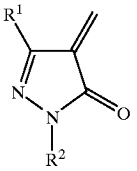
I-6
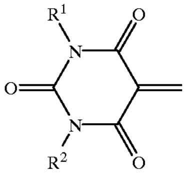
I-7
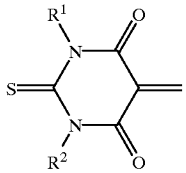
-continued
I-8
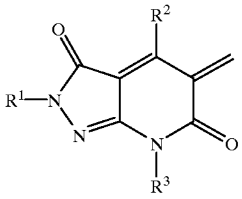
I-9
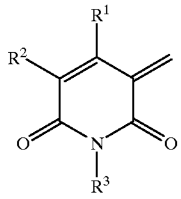
I-10
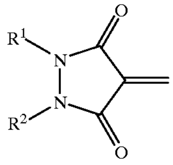
I-11
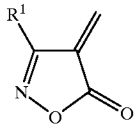
I-12
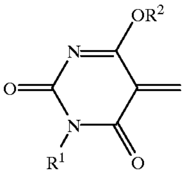
I-13
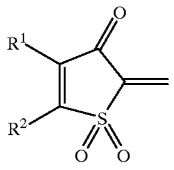
I-14
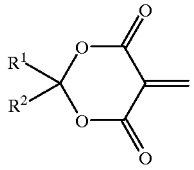
I-15
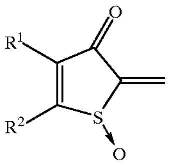

-continued
I-16
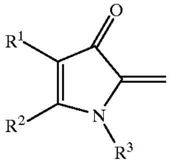
I-17
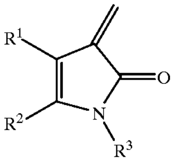
I-18
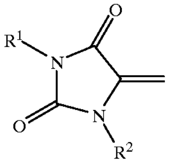
I-19
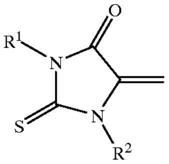
I-20
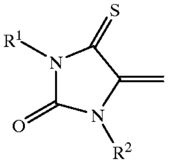
I-21
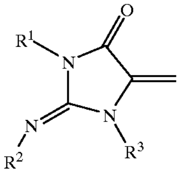
I-22
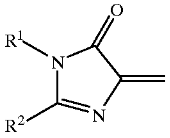
I-23
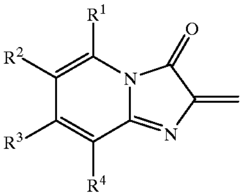
-continued
I-24
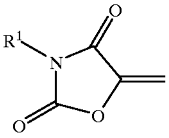
I-25
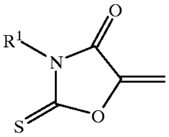
I-26
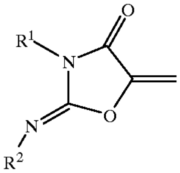
I-27
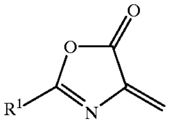
I-28
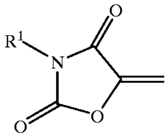
I-29
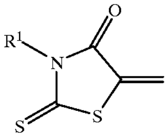
I-30
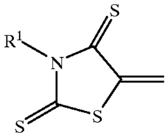
I-31
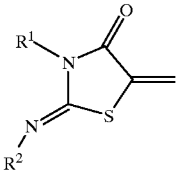
I-32
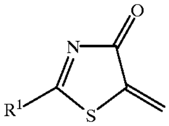

-continued

I-33

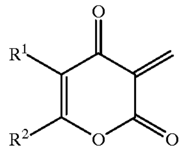

I-34

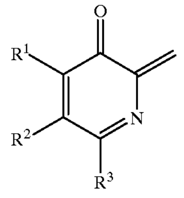

I-35

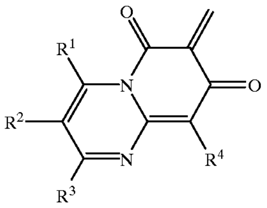

I-36

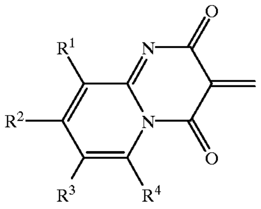

I-37

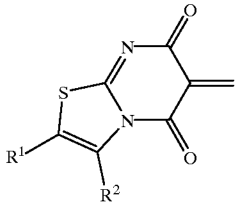

I-38

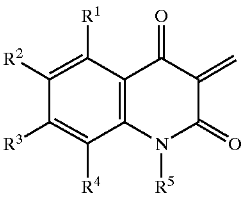

I-39

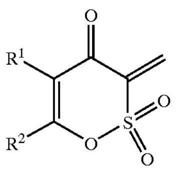

-continued

I-40

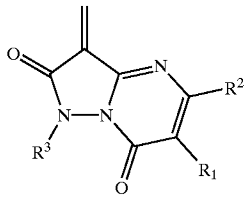

I-41

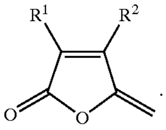

9. A recording liquid for ink jet according to claim 8, wherein the substituted groups of heterocyclic rings are substituted groups selected from the group consisting of I-5, I-6, I-7, I-8, I-9, I-13, I-18, I-35, I-36, and I-40.

10. A recording liquid for ink jet according to claim 8, wherein the substituted group of the carbocyclic ring or the substituted group of the heterocyclic ring represented by Y and Z of the general formula (I) is selected from the group consisting of I-1 to I-4, and I-6 to I-41.

11. A recording liquid for ink jet according to claim 1, wherein the compound is represented by the general formula (II), and wherein P and P' are substituents having a Hammett's substituent constant σ of at least 0.2.

12. A recording liquid for ink jet according to claim 11, wherein P and P' are independently selected from the group consisting of a cyano group, a nitro group, an alkoxycarbonyl group, an acyl group, a carbamoyl group, a sulfamoyl group and a sulfonyl group.

13. An ink jet recording method comprising applying to an image-receiving material the recording liquid of claim 10.

14. An ink jet recording method comprising applying to an image-receiving material a recording liquid for ink jet containing a solid fine particle dispersion obtained by dispersing a compound represented by the general formula (I) or (II) in an aqueous medium;

General formula (I)

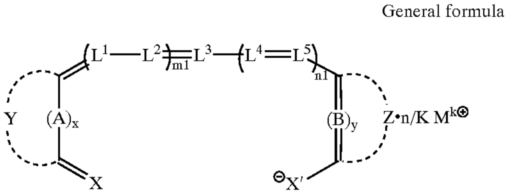

wherein each of A and B represents an atomic group required to complete a conjugated double bond chain, and each of Y and Z represents an atomic group required to form a carbocyclic ring or heterocyclic ring; each of $L^1$, $L^2$, $L^3$, $L^4$ and $L^5$ represents a methine group which may be substituted, and each of X and X' represents an oxygen atom, a sulfur atom or —$C(CN)_2$; each of m1 and n1 represents 0, 1 or 2, and each of x and y represents 0 or 1; $M^{k+}$ represents a k-valent cation, k represents an integer of 1 or more, and n represents a figure required to equalize the positive charge number with the negative charge number in the general formula (I);

General formula (II)

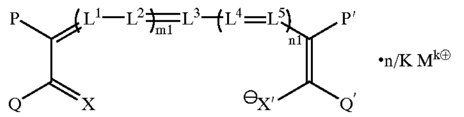

wherein each of $L^1$, $L^2$, $L^3$, $L^4$ and $L^5$ represents a methine group which may be substituted, each of P, P', Q, and Q' represents a substituted group, and each of X and X' represents an oxygen atom, a sulfur atom or —$C(CN)_2$; each of m1 and n1 represents 0, 1 or 2; $M^{k+}$ represents a k-valent cation, k represents an integer of 1 or more, and n represents a figure required to equalize the positive charge number with the negative charge number in the general formula (II).

15. An ink jet recording method according to claim 14, wherein a compound represented by the general formula (I) or (II) is dispersed in a medium as a solid fine particle dispersion and forms an aggregate, therefore an image having λ max shifted by 20 nm or more against λ max of molecular dispersion condition in a solution can be formed.

16. An ink jet recording method according to claim 15, wherein the aggregate is a J-aggregate.

17. An ink jet recording method according to claim 16, containing the J-aggregate particle which was precipitated by contacting a solution dissolving the compound represented by the general formula (I) or (II) with an aqueous medium.

18. An ink jet recording method according to claim 14, wherein the solid fine particle dispersion is dispersed in an aqueous medium.

* * * * *